United States Patent
Takahashi et al.

(10) Patent No.: US 8,550,728 B2
(45) Date of Patent: Oct. 8, 2013

(54) METHOD CONNECTING OPTICAL FIBER OF OPTICAL CONNECTOR WITH OPTICAL TRANSMISSION ELEMENT, CONNECTOR-ATTACHED OPTICAL TRANSMISSION ELEMENT, OPTICAL CONNECTOR, AND ASSEMBLING METHOD OF OPTICAL CONNECTOR

(75) Inventors: Shigeo Takahashi, Sakura (JP); Kazuhiro Takizawa, Sakura (JP); Masaaki Miyamoto, Sakura (JP); Yoshinori Iwashita, Sakura (JP); Noriyuki Kawanishi, Sakura (JP); Toshiki Kubo, Sakura (JP); Khee Yen Serin Tan, Sakura (JP)

(73) Assignee: Fujikura Ltd., Tokyo (JP)

( * ) Notice: Subject to any disclaimer, the term of this patent is extended or adjusted under 35 U.S.C. 154(b) by 891 days.

(21) Appl. No.: 12/711,766

(22) Filed: Feb. 24, 2010

(65) Prior Publication Data

US 2010/0158452 A1    Jun. 24, 2010

Related U.S. Application Data

(63) Continuation-in-part of application No. 12/029,867, filed on Feb. 12, 2008, now abandoned.

(30) Foreign Application Priority Data

| Feb. 13, 2007 | (JP) | 2007-032617 |
| Feb. 12, 2008 | (JP) | 2008-030980 |
| Sep. 28, 2009 | (JP) | 2009-222439 |

(51) Int. Cl.
| G02B 6/255 | (2006.01) |
| H05B 3/44 | (2006.01) |
| H05B 3/50 | (2006.01) |
| H05B 3/02 | (2006.01) |
| H05B 3/20 | (2006.01) |
| F24D 19/02 | (2006.01) |
| F24H 9/00 | (2006.01) |

(52) U.S. Cl.
USPC ............... 385/99; 385/86; 219/544; 219/478; 392/432

(58) Field of Classification Search
USPC .................... 385/99, 134; 219/478; 392/432
See application file for complete search history.

(56) References Cited

U.S. PATENT DOCUMENTS

| 5,557,697 A * | 9/1996 | Yoshie | 385/99 |
| 5,748,819 A | 5/1998 | Szentesi et al. | |
| 6,152,609 A * | 11/2000 | Dzyck et al. | 385/86 |
| 6,437,299 B1 * | 8/2002 | Watanabe et al. | 219/478 |

FOREIGN PATENT DOCUMENTS

| JP | 57-191611 A | 11/1982 |
| JP | 58-171011 A | 10/1983 |
| JP | 64-18113 A | 1/1989 |
| JP | 02-061602 A | 3/1990 |
| JP | 9-297243 A | 11/1997 |
| JP | 10-186180 A | 7/1998 |
| JP | 11-287928 A | 10/1999 |
| JP | 2002-082257 A | 3/2002 |
| JP | 2008-225461 A | 9/2008 |

OTHER PUBLICATIONS

Notice of Allowance issued by the Japanese Patent Office in Japanese Application No. 2008-030980 dated Sep. 4, 2012.
Office Action issued by the Japanese Patent Office in Japanese Patent Application No. 2009-222439 dated Jan. 29, 2013.
Office Action issued May 8, 2012 by the Japanese Patent Office in counterpart Japanese Application No. 2008-030980.

* cited by examiner

*Primary Examiner* — Ryan Lepisto
*Assistant Examiner* — Erin Chiem
(74) *Attorney, Agent, or Firm* — Sughrue Mion, PLLC

(57) ABSTRACT

A connection method connects an optical connector and an optical transmission element. The optical connector includes a connector housing, a stop-ring structure, and an optical fiber which protrudes from an end part of the stop-ring structure. The optical transmission element includes a tensile-strength fiber body. The connection method includes fuse-connecting a first end of the optical fiber with a second end of an optical fiber protruding from a transmission element terminal part of the optical transmission element; inserting a fuse-connected optical fiber part and the tensile strength fiber body inside a reinforcing sleeve provided with a hot melt body, and covering and bridging the transmission element terminal part and at least the end part of the stop-ring structure; and integrating the fuse-connected optical fiber part, the tensile strength fiber body, the transmission element terminal part, and the stop-ring structure, by a hot melt resin melted from the hot melt body.

19 Claims, 39 Drawing Sheets

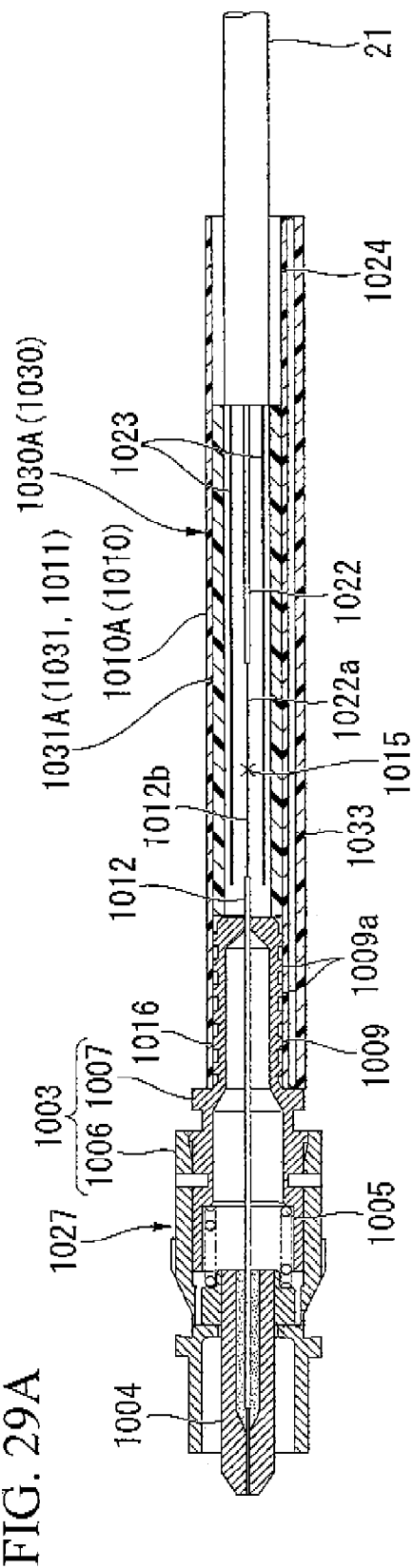

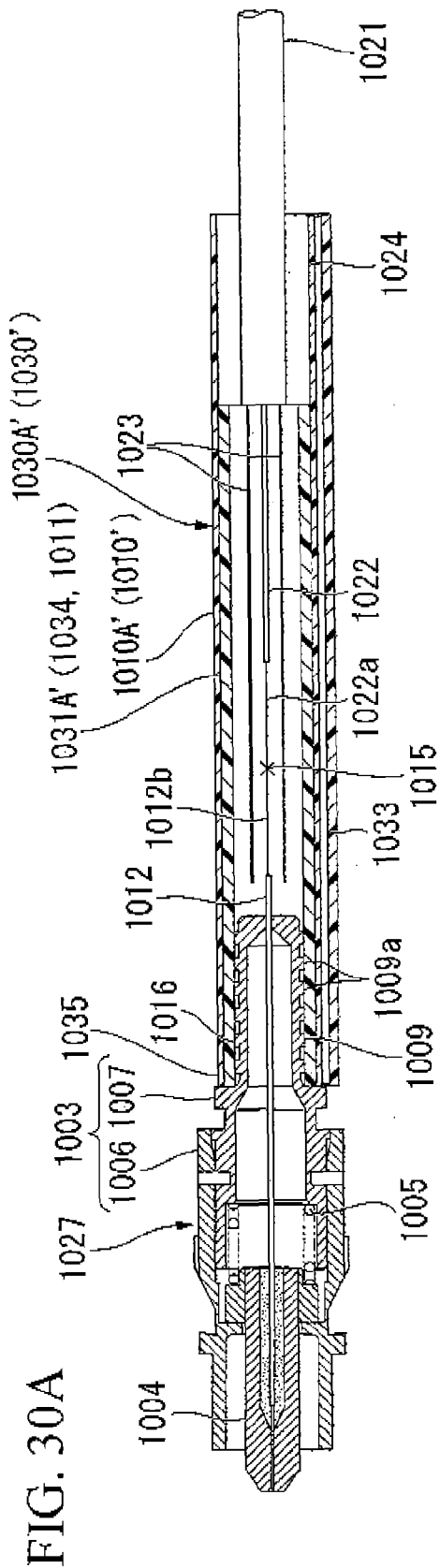
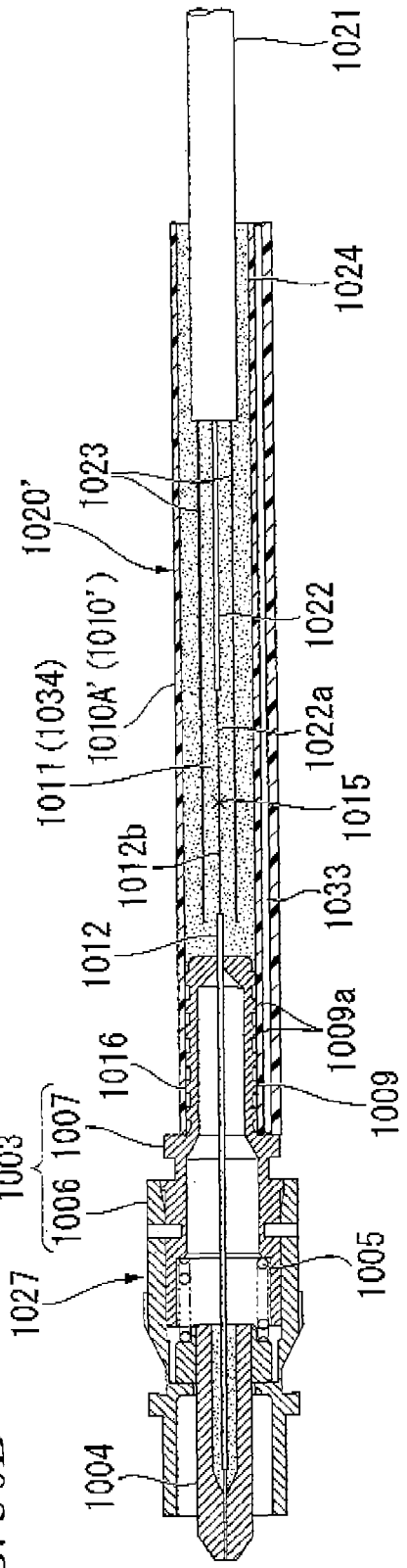
FIG. 30A
FIG. 30B

METHOD CONNECTING OPTICAL FIBER OF OPTICAL CONNECTOR WITH OPTICAL TRANSMISSION ELEMENT, CONNECTOR-ATTACHED OPTICAL TRANSMISSION ELEMENT, OPTICAL CONNECTOR, AND ASSEMBLING METHOD OF OPTICAL CONNECTOR

BACKGROUND OF THE INVENTION

The present application claims priority on Japanese Patent Application No. 2007-032617, filed Feb. 13, 2007; Japanese Patent Application No. 2008-030980, filed Feb. 12, 2008; and Japanese Patent Application No. 2009-222439, filed Sep. 28, 2009; the contents of which are incorporated herein by reference. In addition, the present application is a continuation-in-part application of U.S. patent application Ser. No. 12/029,867.

FIELD OF THE INVENTION

The present invention relates to a connecting method of an optical connector, and a structure produced by using the same. More specifically, the present invention relates to a method and a structure connecting an optical fiber of an optical connector with an optical fiber of an optical fiber cord. In addition, the present invention relates to an optical transmission element provided with a connector. The present invention also relates to an optical connector. The optical transmission element provided with a connector is produced by installing a field-installable optical connector to a terminal of an optical transmission element. The optical connector is assembled by storing a fused connection portion connecting an optical fiber of the optical transmission element with a shorter optical fiber inserted and fixed in a ferrule (in other words, an embedded optical fiber). The optical transmission element is formed by covering an optical fiber and a tensile-strength body with an external covering. The tensile-strength body extends along the longitudinal direction of the optical fiber. Examples of the optical transmission element include an optical fiber cord and an optical fiber cable. Furthermore, the present invention relates to a field-installable optical fiber cable provided with a connector. The present invention also relates to an assembling method of an optical connector. In particular, the present invention relates to an optical fiber cable provided with a connector, which employs a fused connection.

DESCRIPTION OF THE RELATED ART

In the related art, as a fused connection structure in which an optical fiber of an optical connector and an optical fiber cord are connected by fusion, the structure (1) in which a bare optical fiber extended from a fine hole of a ferrule and an optical fiber are fused outside the ferrule and the thus-fused connection portion is covered with a heat-shrinkable tube (see, e.g., Japanese Unexamined Patent Application, First Publication No. S64-18113); the structure (2) in which optical fibers are inserted from opposed directions into an optical connector, and then the tip ends thereof are fused inside a hollow portion of the optical connector (see, e.g., U.S. Pat. No. 5,748,819); and the structure (3) in which an optical fiber extended from an optical connector and an optical fiber of an optical fiber cable are connected and reinforced by a reinforcing tube (see, e.g., U.S. Pat. No. 6,152,609) have been proposed.

In the above-described, related art structure (1), a bare optical fiber extending outside is inserted in a heat-shrinkable tube, the bare optical fiber and an optical fiber are then fused or spliced, and thereafter, the heat-shrinkable tube is contracted by heating. There is an inconvenience in that an existing fusion-splicing apparatus cannot be used and thus, a new apparatus is necessary.

Furthermore, in this related art structure, when a sheath or cover of the optical fiber cord is removed or peeled, a process for aramid fiber is necessarily carried out, thereby resulting in a long processing time.

In the above-described, related art structure (2), a connection point is maintained in a hollow portion of an optical connector. Thus, there is a problem in that, when external force is applied, the force is transmitted to the connection point.

Furthermore, when the tips of optical fibers are fused or connected, it is necessary to carry out an electrical discharging in response to the widths of slits. Thus, there is a problem in that a dedicated fusion-splicing apparatus is necessary.

According to this structure, when a sheath or cover of the optical fiber is removed or peeled, a process for aramid fiber is also carried out, thereby resulting in a long processing time.

According to the above-identified, related art structure (3), a connection point is protected by a reinforcing tube. As a result, the number of processes increases, and the production cost becomes high as well. In addition, an existing fusion-splicing apparatus cannot be used. Thus, a new apparatus dedicated thereto is necessary.

Further, in order to insert the aramid fiber, it is necessary that the aramid fiber be cut precisely to a predetermined length. In addition, there is a problem in that a special tool is required to insert the aramid fiber. Moreover, there is also a problem in that the aramid fiber cannot be tightly attached to the optical fiber because a space is always produced between the aramid fiber and the optical fiber.

Incidentally, an example of an optical connector, structured so that the optical connector can be attached to the tip of an optical fiber when the connection of the connector is being made, is an optical connector produced by storing a fused reinforcing portion inside a housing. The fused reinforcing portion is produced by using a heat-shrinkable tube to reinforce the fused connection portion between the optical fiber and a shorter optical fiber (hereinafter may be referred to as an embedded optical fiber) inserted and fixed inside a ferrule. (See, for example, Japanese Unexamined Patent Application, First Publication No. 2002-82257, hereinafter referred to as "Patent Document 1.") Paragraph [0026] and FIG. 5 of Patent Document 1 disclose a structure in which an optical connector is attached to a terminal of an optical fiber code by crimping and fixing a tensile-strength body, exposed on the terminal of the optical fiber, to a rear terminal of the housing a calking ring.

In addition, the specification of U.S. Pat. No. 5,748,819 (hereinafter referred to as "Patent Document 2") discloses an optical connector structured so that a fused connection portion is placed on a slot formed on a ferrule.

According to Patent Document 1, the fused reinforcing portion of the optical connector is structured so as to reinforce a fused connection portion by covering the fused connection portion with a heat-shrinkable tube. This fused connection portion is produced by fusing and connecting an optical fiber with a portion of an embedded optical fiber protruding toward the rear of the ferrule (in a side opposite to an apical surface for butting). The fused reinforcing portion of this optical connector is placed at a position distanced from the ferrule toward the rear side of the ferrule. Furthermore, the inner space of the housing of the optical connector is produced to be somewhat larger than the estimated size of the fused reinforcing portion. The size of the inner space is determined in this manner so that the fused reinforcing portion can be stored, considering the discrepancy in the size and the shape of the fused reinforcing portion. This discrepancy occurs because, for example, a reinforcing resin (a thermoplastic resin), which is provided in the inner side of the heat-shrinkable tube and is used to embed the fused connection portion, is eccentrically-located. In addition, the size of the inner space is determined as described above so that the fused reinforcing portion can be stored in a manner such that the fused reinforcing portion can move along the center axis of the sleeve-shaped housing. The fused reinforcing portion is often stored so that the fused reinforcing portion can oscillate freely inside the housing. Thus, the embedded optical fiber might, for instance, be pulled or bent repeatedly due to the oscillation of the fused reinforcing portion. As a result, the embedded optical fiber might be damaged. In this way, there is a problem in that the fused reinforcing portion lacks long-term reliability.

In addition, according to the optical connector structured so that the fused reinforcing portion is stored inside the housing, as described above, it is assumed that the housing deforms, and that the fused reinforcing portion bends and deforms as well, due to the application of a so-called side-pull. A side-pull is a condition in which a tension is applied to the optical fiber, extending from a flexible boot at a rear end of the optical connector, toward a direction in which the inclination angle with respect to the central axis of the housing of the optical connector is large (for example, in an orthogonal direction with respect to the central axis). Here, when the degree of the bending and the deformation of the fused reinforcing portion is large, the optical fiber embedded in the fused reinforcing portion might be severed. For example, storing a part of the fused reinforcing portion inside the boot (see, for instance, FIG. 4 of Patent Document 1) is a structure which is effective in reducing the total length of the connector. However, according to this type of structure, the fused reinforcing portion is often bent and deformed due to the deformation of the boot. Thus, it is necessary to take measures to prevent the optical fiber inside the fused reinforcing portion from being severed.

According to the optical connector disclosed in Patent Document 2, it is necessary to performing the fusing operation at a position close to the ferrule. As a result, the ferrule might be adversely affected due to the fusing operation. Consequently, the fusing operation must be performed under difficult circumstances. Thus, the fusing operation cannot be performed with ease.

Incidentally, a conventional example of a structure, which allows an optical connector to be attached to a tip of an optical fiber at the time of connection (i.e., the optical connector is field-installable), is a structure such that the optical fiber is connected to an embedded optical fiber, inserted in a ferrule, through fusion (see, for example, Patent Documents 1 and 2).

Patent Document 1 discloses an optical connector structured so that a fused connection portion, reinforced by a reinforcing body such as resin, is stored inside a connector housing. According to this structure, the fused connection portion can be protected with the connector housing. Furthermore, the fused connection portion can be strengthened and be made robust.

Patent Document 2 discloses an optical connector structured so that a fused connection portion is positioned on a slot formed on a ferrule.

According to the optical connector disclosed in Patent Document 1, the fused connection portion is stored in the connector housing. This structure is effective in making the fused connection portion more robust. However, the size of the fused connection portion, reinforced by the reinforcing body, is large. Thus, since a large connector housing is used to store this fused connection portion, the overall size of the optical connector also increases. Therefore, when the optical connector is used inside an optical connection box, for example, ample space is needed for wiring. Thus, the above structure presents an issue in terms of saving space.

According to the optical connector disclosed in Patent Document 2, the fusing operation needs to be performed near the ferrule. Therefore, when a general-purpose discharge electrode is used in the fusing operation, the ferrule might be adversely affected. Thus, a generic fused connection device cannot be used. In this way, there is a problem in that the fusing operation cannot be conducted easily.

SUMMARY OF THE INVENTION

The present invention is made considering the problems described above. Exemplary embodiments of the present invention provide an optical connector connecting method and a structure produced by the method, so that, when an optical fiber of an optical connector and an optical fiber of an optical fiber cord are fusion-spliced, a gap between a connection portion and a reinforcing sleeve is not generated. Thus, the connection portion and the reinforcing sleeve are firmly fixed to one another. In addition, handling is easy and the production cost can be decreased.

Another object of the present invention is to provide an optical connector and an optical transmission element provided with a connector which allows a fusion splicing operation to be performed easily. In addition, the optical characteristics of an optical fiber (an embedded optical fiber), placed between a ferrule and a fused connection portion inside a housing, and an optical fiber inside a fused connection portion can be maintained in a stabilized manner over a long period. Moreover, the long-term reliability can be enhanced.

In addition, another object of the present invention is to provide an optical fiber cable provided with a connector and an assembling method of an optical connector, which allows the overall size to be reduced, confers adequate robustness, and allows the fusion splicing operation to be performed easily.

A connection method of an optical connector and an optical transmission element according to an aspect of the present invention uses the optical connector including a connector housing, a stop-ring structure, and an optical fiber which penetrates the connector housing and the stop-ring structure and protrudes from an end part of the stop-ring structure towards a connection side. The connection method also uses the optical transmission element including a tensile-strength fiber body. The connection method includes a fuse connection step, a covering step, and an integration step. In the fuse connection step, a first end of the optical fiber of the optical connector is fuse-connected with a second end of an optical fiber protruding from a transmission element terminal part of the optical transmission element. In the covering step, a fuse-connected optical fiber part and the tensile strength fiber body extending towards the stop-ring structure of the optical transmission element are inserted inside a reinforcing sleeve provided with a hot melt body in an inner peripheral surface of the reinforcing sleeve. Further, in the covering step, the transmission element terminal part of the optical transmission element and at least the end part of the stop-ring structure are covered so that the transmission element terminal part and the end part of the stop-ring structure are bridged. In the integration step, the fuse-connected optical fiber part, the tensile strength fiber body, the transmission element terminal part, and the stop-ring structure are integrated by a hot melt resin melted from the hot melt body flowing into a gap inside the reinforcing sleeve and solidifying, due to heating and heat-releasing the reinforcing sleeve.

In addition, the connection method may be configured as follows: the stop-ring structure includes a penetration hole, through which the optical fiber running through the stop-ring structure penetrates; and the optical fiber running through the stop-ring structure can be bent and deformed inside the penetration hole.

In addition, the connection method may be configured as follows: a linear tensile strength part extending along a central axis of the reinforcing sleeve is dispersed in a circumferential direction along an entire circumference of one or more of: the reinforcing sleeve, a boundary between the reinforcing sleeve and the hot melt resin body, or a peripheral part of the hot melt resin body along the boundary.

In addition, the connection method may be configured as follows: a tensile-strength body is embedded along a central axis of a sleeve body in the reinforcing sleeve or the hot melt resin body.

In addition, the connection method may be configured as follows: the tensile-strength body extends from one end of the reinforcing sleeve to another end of the reinforcing sleeve along a central axis of the reinforcing sleeve.

In addition, the connection method may be configured as follows: one or more of a concave part and/or a convex part is provided in an outer circumferential surface of the stop-ring structure.

Furthermore, a connector-attached optical transmission element according to an aspect of the present invention includes an optical connector being attached to a tip of an optical transmission element. The optical connector includes a connector housing, a stop-ring structure, and an optical fiber which penetrates the connector housing and the stop-ring structure and protrudes from an end part of the stop-ring structure towards a connection side. The optical transmission element includes a tensile-strength fiber body; a fused connection portion which fuse-connects a first end of the optical fiber of the optical connector and a second end of an optical fiber protruding from a transmission element terminal part of the optical transmission element; and a reinforcing sleeve through which a fuse-connected optical fiber part and a tensile strength fiber body extending towards the stop-ring structure of the optical transmission element are inserted. The reinforcing sleeve bridges the transmission element terminal part of the optical transmission element and at least the end part of the stop-ring structure. A hot melt resin is filled inside the reinforcing sleeve. The hot melt resin integrates the fuse-connected optical fiber part, the tensile strength fiber body, the transmission element terminal part, and the stop-ring structure.

In addition, the connector-attached optical transmission element may be configured as follows: the stop-ring structure includes a penetration hole, through which the optical fiber running through the stop-ring structure penetrates; and the optical fiber running through the stop-ring structure can be bent and deformed inside the penetration hole.

In addition, the connector-attached optical transmission element may be configured as follows: a linear tensile strength part extending along a central axis of the reinforcing sleeve is dispersed in a circumferential direction along an entire circumference of one or more of: the reinforcing sleeve, a boundary between the reinforcing sleeve and the hot melt resin body, or a peripheral part of the hot melt resin body along the boundary.

In addition, the connector-attached optical transmission element may be configured as follows: a tensile-strength body is embedded along a central axis of a sleeve body in the reinforcing sleeve or the hot melt resin body.

In addition, the connector-attached optical transmission element may be configured as follows: the tensile-strength body extends from one end of the reinforcing sleeve to another end of the reinforcing sleeve along a central axis of the reinforcing sleeve.

In addition, the connector-attached optical transmission element may be configured as follows: one or more of a concave part and/or a convex part is provided in an outer circumferential surface of the stop-ring structure.

Furthermore, an optical connector according to an aspect of the present invention is assembled to a tip of an optical transmission element including a tensile-strength fiber body. The optical connector includes a connector housing; a stop-ring structure; an optical fiber penetrating the connector housing and the stop-ring structure and protruding from an end part of the stop-ring structure towards a connection side; and a reinforcing sleeve including a hot melt resin in an inner peripheral surface of the reinforcing sleeve. While a fused connection portion, which fuse-connects a first end of the optical fiber and a second end of an optical fiber protruding from a transmission element terminal part of the optical transmission element, is stored in the reinforcing sleeve, the reinforcing sleeve covers and bridges the transmission element terminal part of the optical transmission element and at least the end part of the stop-ring structure. In addition, the reinforcing sleeve allows a fuse-connected optical fiber part, the tensile strength fiber body, the transmission element terminal part, and the stop-ring structure to be integrated by embedding the fuse-connected optical fiber part and the tensile strength fiber body extending towards the stop-ring structure of the optical transmission element into the hot melt resin body. The hot melt resin body is melted and solidified by heating and heat-releasing.

In addition, the optical connector may be configured as follows: the stop-ring structure includes a penetration hole, through which the optical fiber running through the stop-ring structure penetrates; and the optical fiber running through the stop-ring structure can be bent and deformed inside the penetration hole.

In addition, the optical connector may be configured as follows: a linear tensile-strength part extending along a central axis of the reinforcing sleeve is dispersed in a circumferential direction along an entire circumference of one or more of: the reinforcing sleeve, a boundary between the reinforcing sleeve and the holt melt resin body, or a peripheral part of the hot melt resin body along the boundary.

In addition, the optical connector may be configured as follows: a tensile-strength body is embedded along a central axis of a sleeve body in the reinforcing sleeve or the hot melt resin body.

In addition, the optical connector may be configured as follows: the tensile-strength body extends from one end of the reinforcing sleeve to another end of the reinforcing sleeve along a central axis of the reinforcing sleeve.

In addition, the optical connector may be configured as follows: one or more of a concave part and/or a convex part is provided in an outer circumferential surface of the stop-ring structure.

Furthermore, a method of assembling an optical connector to a tip of an optical transmission element including a tensile strength fiber body according to an aspect of the present invention includes a fuse connection step, a covering step, and an integration step. In the fuse connection step, a first end of an optical fiber of the optical connector is fuse-connected with a second end of an optical fiber protruding from a transmission element terminal part of the optical transmission element. The optical connector includes a connector housing, a stop-ring structure, and the optical fiber which penetrates the connector housing and the stop-ring structure and protrudes from an end part of the stop-ring structure towards a connection side. In the covering step, a fuse-connected optical fiber part and the tensile strength fiber body extending towards the stop-ring structure of the optical transmission element are inserted inside a reinforcing sleeve provided with a hot melt body in an inner peripheral surface of the reinforcing sleeve. Further, in the covering step, the transmission element terminal part of the optical transmission element and at least the end part of the stop-ring structure are covered so that the transmission element terminal part and the end part of the stop-ring structure are bridged. In the integration step, the fuse-connected optical fiber part, the tensile strength fiber body, the transmission element terminal part, and the stop-ring structure are integrated by a hot melt resin melted from the hot melt body flowing into a gap inside the reinforcing sleeve and solidifying, due to heating and heat-releasing the reinforcing sleeve.

Furthermore, a method of connecting an optical connector and an optical fiber cord according to an aspect of the present invention includes: providing an optical connector comprising a connector housing, a stop-ring structure, and a first optical fiber which extends through the connector housing and the stop-ring structure and protrudes from a structure end of the stop-ring structure toward a connection side; fusion-splicing a fiber end of the first optical fiber and a fiber end of a second optical fiber which protrudes from a cord end of the optical fiber cord; enclosing the cord end of the optical fiber cord and at least the structure end of the stop-ring structure with a reinforcing sleeve, wherein the reinforcing sleeve includes an annular sleeve body, a hot melt resin layer applied to an inner surface of the sleeve body, and a tensile-strength body embedded in one of the annular sleeve body and the hot melt resin layer; and heating and heat-releasing the reinforcing sleeve such that the hot melt resin layer is melted into a molten resin which fills an inner space of the reinforcing sleeve, and solidifies therein.

In addition, the above method may be configured as follows: the tensile-strength body extends parallel to an axis of the sleeve body from end to end thereof.

In addition, the above method may be configured as follows: the optical fiber of the optical connector is fixedly secured to an inner portion of the structure end of the stop-ring structure.

In addition, the above method may be configured as follows: the optical fiber cord includes tensile-strength fiber bodies which extend through the reinforcing sleeve toward the stop-ring structure but do not reach the stop-ring structure.

In addition, the above method may be configured as follows: at least one concave portion and/or a convex portion is formed on an outer peripheral surface of the stop-ring structure.

By the way, an optical connection according to an aspect of the present invention is formed by the method according to an aspect of the present invention recited above.

In addition, the above method may be configured as follows: the concave portion or the convex portion includes: a circumferential groove.

In addition, the above method may be configured as follows: the concave portion or the convex portion includes: a circumferential groove; and a spiral groove along a length of the stop-ring structure.

In addition, the above method may be configured as follows: the stop-ring structure includes: a plurality of recessed portions having circular openings and arc-shaped cross-sections.

In addition, the above method may be configured as follows: the stop-ring structure includes: a first plurality of recessed portions having circular openings and arc-shaped cross-sections, wherein the first plurality of recessed portions are arranged along a first plurality of lines parallel to a center axis of the stop-ring structure; a second plurality of recessed portions having triangular openings and rectangular cross-sections, and wherein the second plurality of recessed portions are arranged along a second plurality of lines parallel to the center axis of the stop-ring structure and alternating with the first plurality of lines.

Meanwhile, a fusion-spliced optical fiber apparatus according to an aspect of the present invention includes an optical connector including a connector housing, a stop-ring structure, and a first optical fiber which extends through the connector housing and the stop-ring structure and protrudes from a structure end of the stop-ring structure toward a connection side; an optical fiber cord and a second optical fiber which protrudes from a cord end of the optical fiber cord, wherein an end of the second optical fiber is fusion-spliced to an end of the first optical fiber; a reinforcing sleeve which encloses the cord end of the optical fiber cord and at least the structure end of the stop-ring structure, wherein the reinforcing sleeve includes: an annular sleeve body; a resin which fills an inner space of the reinforcing sleeve and integrates the cord end of the optical fiber cord and the stop-ring structure; and a tensile-strength body embedded in one of the annular sleeve body and the resin.

In addition, the above fusion-spliced optical fiber apparatus may be configured as follows: the tensile-strength body is substantially parallel with, an axis of the annular sleeve body.

In addition, the above fusion-spliced optical fiber apparatus may be configured as follows: the first optical fiber is fixedly secured to an inner portion of the structure end of the stop-ring structure.

In addition, the above fusion-spliced optical fiber apparatus may be configured as follows: the optical fiber cord includes at least one tensile-strength fiber body which extends through the optical fiber cord.

In addition, the above fusion-spliced optical fiber apparatus may be configured as follows: the stop-ring structure includes a concave portion or a convex portion formed on an outer peripheral surface of the stop-ring structure.

In addition, the above fusion-spliced optical fiber apparatus may be configured as follows: the concave portion or the convex portion includes: a circumferential groove.

In addition, the above fusion-spliced optical fiber apparatus may be configured as follows: the concave portion or the convex portion includes: a circumferential groove; and a spiral groove along a length of the stop-ring structure.

In addition, the above fusion-spliced optical fiber apparatus may be configured as follows: the stop-ring structure includes: a plurality of recessed portions having circular openings and arc-shaped cross-sections.

In addition, the above fusion-spliced optical fiber apparatus may be configured as follows: the stop-ring structure includes: a first plurality of recessed portions having circular openings and arc-shaped cross-sections, wherein the first plurality of recessed portions are arranged along a first plurality of lines parallel to a center axis of the stop-ring structure; a second plurality of recessed portions having triangular openings and rectangular cross-sections, and wherein the second plurality of recessed portions are arranged along a second plurality of lines parallel to the center axis of the stop-ring structure and alternating with the first plurality of lines.

According to an aspect of the present invention described above, an end of a reinforcing tube, forming a fused reinforcing portion stored inside a connector housing of an optical connector attached to a terminal of an optical transmission element, is externally fixed to a tube fixing portion, which is cylindrical and is located at a rear end portion of a ferrule housing that stores a ferrule. In addition, the other end is externally fixed to the terminal of the optical transmission element. The fused reinforcing portion is integrated with the ferrule housing. This structure prevents the embedded fiber from being damaged by the oscillation of the fused reinforcing portion inside the housing, as described in conventional art such as Patent Document 1. In addition, the optical characteristic of the embedded optical fiber can be maintained and stabilized over a long period. As a result, the long term reliability can be enhanced.

In addition, according to an aspect of the present invention, the fused connection portion is formed by fuse-splicing a rear end of an embedded optical fiber, internally fixed to the ferrule, to a tip portion of the optical fiber sticking out from a terminal of the optical transmission element. In this way, the fuse-splicing operation can be performed readily at a place distanced from the ferrule. Consequently, the fuse-splicing operation can be conducted with ease.

Furthermore, according to an aspect of the present invention, a fused portion reinforcing sleeve is used to form the fused reinforcing portion. This fused portion reinforcing sleeve is structured so that a linear tensile-strength component extends along a central axis of the reinforcing tube over the entire circumference of one or more of the following: the reinforcing tube, the boundary between the reinforcing tube and the thermoplastic resin, and the thermoplastic resin. As a result, the fused reinforcing portion is structured so that a tensile-strength component is affixed in the longitudinal direction. The fused reinforcing portion is structured so that the tensile-strength component is dispersed over the total circumference of the peripheral part of the fused reinforcing portion.

As a result, when the fused reinforcing portion deforms due to a bending force such as a side-pull applied to the optical transmission element extending from the rear end of an optical connector, or a pressing force from the side of the optical connector causing a deformation of the connector housing (for example, a bending of the boot at a rear end portion of the connector housing), the tensile-strength component restrains the stretching of the peripheral part of the deformed fused reinforcing portion. In this way, the tensile-strength component maintains a large radius of the curvature of the fused reinforcing portion caused by the deformation, over the entire length of the fused reinforcing portion.

When the fused reinforcing portion is deformed, the tensile-strength component retains a large radius of the curvature over the entire length of the fused reinforcing portion so that a deformation on any part of the fused reinforcing portion does not cause the optical fiber inside the fused reinforcing portion to be severed. In addition, the fused reinforcing portion is structured so that the tensile-strength component is dispersed over the entire length of the peripheral part of the fused reinforcing portion. Therefore, regardless of the direction in which the bending force is applied, the tensile-strength component can retain a sufficient radius of the curvature, which is large enough to prevent the internal optical fiber from being severed during a deformation.

Thus, according to an aspect of the present invention, the optical fiber inside the fused reinforcing portion can be easily prevented from being severed regardless of the direction in which the fused reinforcing portion is bent. Hence, the long term reliability of the connector-attached optical transmission element increases.

Furthermore, according to the optical connector based on an aspect of the present invention, an embedded optical fiber runs through a ferrule of the optical connector in advance. Thus, an end of the embedded optical fiber, located on the opposite side of the connecting end plane, can be fuse-spliced to the protruding optical fiber of the optical fiber code. In addition, the outer circumference of the fused connection portion and its surrounding area can be covered with a heat-shrinkable reinforcing tube. This reinforcing tube is embedded with a reinforcing core and a reinforcing material comprising a thermoplastic resin. The reinforcing tube can be formed from the stop-ring of the optical connector to the optical fiber code. The reinforcing material can be interposed between the stop-ring and the reinforcing material to fasten the stop-ring and the reinforcing material.

In addition, according to the connector-attached optical fiber cable based on an aspect of the present invention, the housing and the optical fiber cable are connected to each other via a reinforcing tube. The inside of this reinforcing tube is filled with a reinforcing material. As a result, the connecting portion of the housing and the optical fiber cable can be provided with adequate tension strength with a simple structure.

In addition, the tensile-strength body pulled out from the terminal of the optical fiber cable is fixed inside the reinforcing material. As a result, the terminal of the tensile-strength body can be easily processed. Furthermore, the tension strength can be augmented to a greater degree. Thus, even though a large amount of pull force is applied to the connection portion, the fused connection portion will not be damaged, and the optical fiber will not be severed.

In addition, according to the connector-attached optical fiber cable according to an aspect of the present invention, the fused connection portion is placed inside the reinforcing tube provided outside the housing. Therefore, compared to the cable structured so that the fused connection portion is stored inside the housing, the size of the housing can be made smaller, and the total length can be made shorter as well. As a result, the overall size of the connector at the tip of the optical fiber cable can be reduced. Therefore, the entire connector at the tip of the optical fiber cable can be stored in a limited amount of space such as an optical connection box and a closet, without unreasonably bending the optical fiber.

Furthermore, during the fusion operation, a generic holder can be used for fusing. Therefore, compared to a cable structured so that the fused connection portion is placed inside the ferrule, the fusion operation can be performed more easily.

Another advantage of the connector-attached optical fiber cable according to an aspect of the present invention is that a small number of components is involved, and thus, the installation operation is straightforward.

It should be noted that, when reinforcing fiber is simply placed inside a cable, and when some of the reinforcing fibers are sticking out of the cable in a lopsided manner while the fusing operation is performed, a tensional force might be applied to the optical fiber. Thus, according to an aspect of the present invention, the sleeve is structured to include a reinforcing fiber. This structure prevents the tensional force from being applied to the optical fiber itself.

The above and other aspects of the present invention will become apparent upon consideration of the following detailed descriptions of exemplary embodiments thereof, particularly when taken in conjunction with the accompanying drawings wherein like reference numerals in the various figures are utilized to designate like components.

BRIEF DESCRIPTION OF THE DRAWINGS

FIG. 25 shows an optical fiber and a tensile-strength body (tensile-strength fiber) sticking out from a terminal of the optical fiber cord.

FIG. 26A is a cross-sectional perspective view showing a cross-sectional structure of a central portion of the sleeve in a longitudinal direction of the sleeve.

FIG. 26B is a cross-sectional perspective view showing a cross-sectional structure of a central portion of the sleeve in a longitudinal direction of the sleeve.

FIG. 26C is a cross-sectional perspective view showing a cross-sectional structure of a central portion of the sleeve in a longitudinal direction of the sleeve.

FIG. 28 shows a condition in which an optical fiber of an optical fiber cord is fuse-spliced to a rear terminal portion of an optical fiber in the ferrule side (embedded optical fiber).

FIG. 29A is a process drawing illustrating an installation step (step forming a fused reinforcing portion) following the step shown in FIG. 28. FIG. 29A shows a condition in which a fused portion reinforcing sleeve is placed in a position at which a fused connection portion is stored. This fused connection portion connecting the optical fibers are formed by the fuse-splicing illustrated in the preceding diagram (FIG. 28).

FIG. 29B is a process drawing illustrating an installation step (step forming a fused reinforcing portion) following the step shown in FIG. 28. FIG. 29B shows a condition in which a fused reinforcing portion is formed by reducing a temperature after a sleeve reinforcing a fused portion, shown in FIG. 29A, is heated.

FIG. 30A is a diagram illustrating a step forming a fused reinforcing portion using a fused portion reinforcing sleeve according to another aspect of the present invention. FIG. 30A shows a condition in which a fused portion reinforcing sleeve is placed at a position at which a fused connecting portion, connecting the optical fibers, is stored.

FIG. 30B is a diagram illustrating a step forming a fused reinforcing portion using a fused portion reinforcing sleeve according to the above aspect of the present invention. FIG. 30B shows a condition in which a fused reinforcing portion is formed by reducing a temperature after a sleeve reinforcing a fused portion, shown in FIG. 30A, is heated.

FIG. 32A shows the deformation of the fused reinforcing portion of the contrasting example.

FIG. 32A shows the deformation of the fused reinforcing portion according to the above aspect of the present invention.

FIG. 39 shows a condition before an optical fiber is connected.

FIG. 40 shows a condition in which an optical fiber is connected.

FIG. 41 shows a condition in which a reinforcing tube is installed.

DETAILED DESCRIPTION OF THE PREFERRED EMBODIMENTS

Hereunder, a method connecting an optical fiber of an optical connector with an optical fiber cord, a connection portion, connector-attached optical transmission element, an optical connector, a connector-attached optical fiber cable, and an assembling method of an optical connector.

The following description aims to provide a detailed explanation to facilitate an understanding of the gist of the present invention. Therefore, the following description does not limit the present invention in any way, unless otherwise noted.

Figure 1:
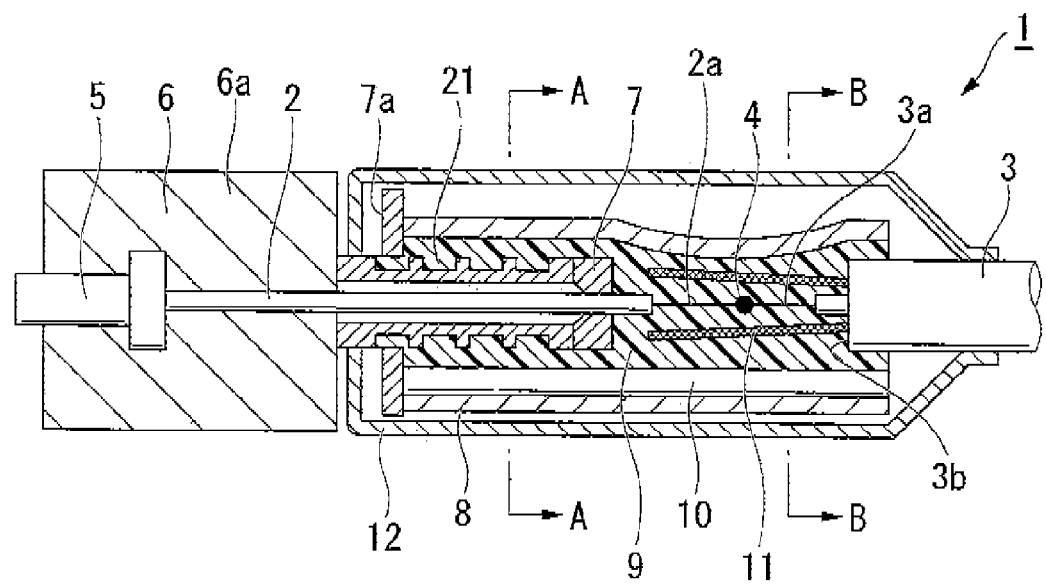
FIG. 1 is a cross-sectional view illustrating an optical connector according to an aspect of the present invention.
Figure 2:
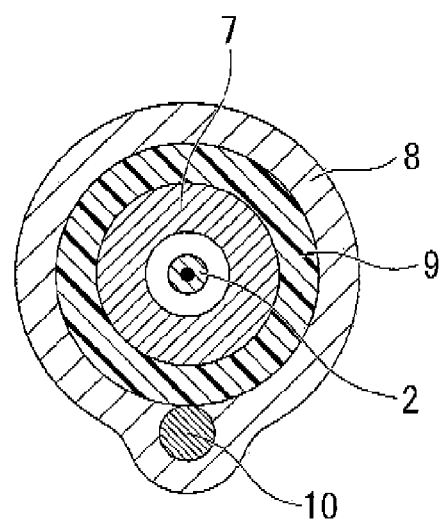
FIG. 2 is a cross-sectional view along line A-A of FIG. 1.
Figure 3:
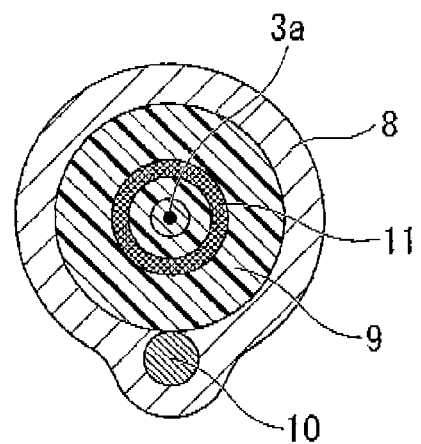
FIG. 3 is a cross-sectional view along line B-B of FIG. 1.

Hereinafter, a first embodiment of the present invention is described. FIG. 1 is a cross-sectional view illustrating an optical connector of an exemplary embodiment of the present invention. FIG. 2 is a cross-sectional view along line A-A of FIG. 1. FIG. 3 is a cross-sectional view along line B-B of FIG. 1. In these figures, 1 denotes an optical connector connecting apparatus which includes a fused connection portion 4 in which a bare optical fiber 2a of an optical fiber 2 extending with a predetermined protruding length from an optical connector 6 and a bare optical fiber 3a of an optical fiber cord 3 are fuse-connected.

Referring again to these figures, 5 denotes a ferrule into which the optical fiber 2 of the optical connector 6 is inserted, 6a denotes a connector housing in which the ferrule 5 is secured, 7 denotes a stop-ring structure which abuts one end of the connector housing 6a, 8 denotes a reinforcing sleeve which has a cylindrical shape and encloses the stop-ring structure 7 in such a manner that one end of the reinforcing sleeve 8 contacts the flange 7a of the stop-ring structure 7, 9 denotes a hot melt resin with which the inside of the reinforcing sleeve 8 is filled, 10 denotes a tensile-strength body (strain relief element) which is disposed so as to be substantially parallel with an axis of the optical fiber 2 of the optical connector 6 and with an axis of the optical fiber cord 3 and wherein one end of the tensile-strength body 10 contacts (the flange 7a of) the stop-ring structure 7, 11 denotes tensile-strength resins (strain relief element) which enclose the bare optical fibers 2a and 3a and the fused connection portion 4, and 12 denotes a boot which is comprised of a cylindrical casing.

The stop-ring structure 7 is formed with a plurality of grooves 21 which circumferentially extend in parallel with one another and in which the hot melt resin 9 fills. The dimensions such as width, depth, interval and the like, of these grooves 21 are set such that, when the stop-ring structure 7 is covered with the reinforcing sleeve 8, it can sustain a longitudinal stress. Generally, they are set so that the strength thereof is maximized. In an exemplary embodiment, when the stop-ring structure 7 has a diameter of 4 mm and a length of 8 mm and the reinforcing sleeve 8 has a length of 34 mm, the width, the depth and interval of each groove 21 are set to be 2 mm, 2 mm, and 1.5 mm, respectively.

The optical fiber 2 of the optical connector 6 is secured with adhesive to a free end side of the stop-ring structure 7. As a result, it is possible for the optical fiber 2 of the optical connector 6 to be positionally secured or determined. Accordingly, the possibility of the optical fiber 2 of the optical connector 6 protruding from the stop-ring structure 7, which is one of the drawbacks in the related art, when an external force acts on the optical fiber 2 of the optical connector 6, can be eliminated.

The reinforcing sleeve 8 is made of a heat-shrinkable material or plastic, which becomes smaller when heated to a predetermined temperature or higher. Polyethylene (shrinkage temperature: 100° C. to 120° C.), for example, can be used. The reinforcing sleeve 8 encloses or encircles most of the stop-ring structure 7 or at least a structure portion extending from the flange 7a.

The hot melt resin 9 is a resin member obtained by providing a composite element (precursor) or raw material; heating it to a predetermined temperature or higher; transforming it into any desired shape; cooling it to a preselected temperature or lower than the predetermined temperature; and curing it. Considering the workability and the like, the resin member may be melted at a temperature which is roughly equal to or near the shrinkage temperature of the reinforcing sleeve 8. As an example of the resin member, EVA resin (melting temperature: 90 to 100 degrees centigrade) or the like may be used.

The tensile-strength body 10 has, for example, a rod shape and is made of stainless steel or the like. It can relieve strain acting on the bare optical fibers 2a and 3a and the fused connection portion 4 due to an external force and thereby prevent the optical fibers from bending.

The tensile-strength fiber body 11 is made of, for example, aramid fiber, which is superior in tensile strength. It can relieve strain acting on the bare optical fibers 2a and 3a or on and around the fused connection portion 4 at the time of heat shrinkage of the reinforcing sleeve 8 and of hardening or setting of the hot melt resin 9 and thereby protect them.

Figure 4:
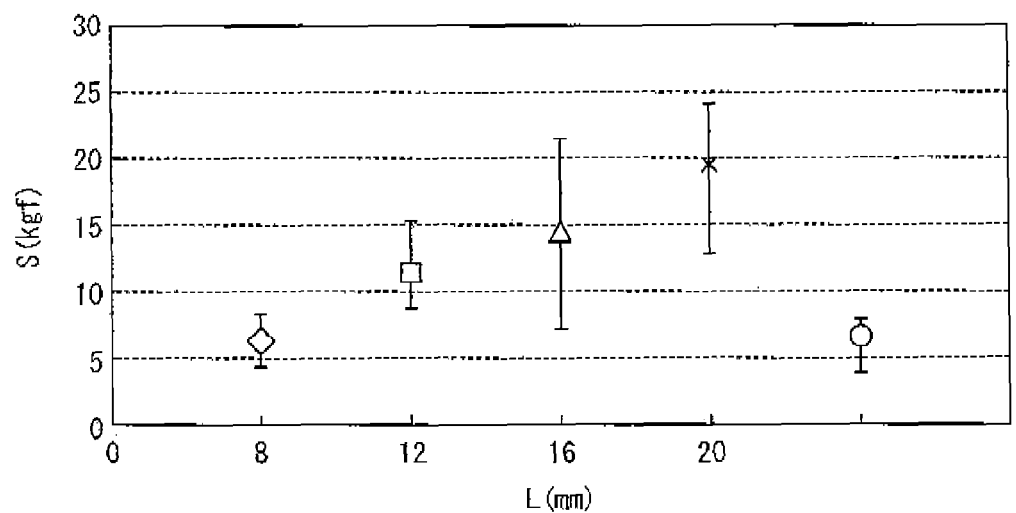
FIG. 4 is a diagram illustrating a relationship between the length of an aramid fiber and the breaking strength of an optical fiber.

FIG. 4 is a diagram illustrating a relationship between the length L of the tensile-strength fiber body 11 from the end of the optical fiber cord 3 body to the tip end and the breaking strength S (kgf) of an optical fiber. FIG. 4 reveals that, unless the aramid fiber 11 reaches the stop-ring structure 7, the longer the aramid fiber length (L) is, the stronger it is in terms of breakage. When the aramid fiber 11 reaches the stop-ring structure 7, the strength thereof is decreased. Thus, in an exemplary embodiment, the length of the (exposed) tensile-strength fiber body 11 or aramid fiber length L may be 8 mm to 20 mm, or about 20 mm.

Next, an exemplary embodiment is described, with reference to FIGS. 5 to 12, of a process to produce the aforesaid optical connector connecting apparatus 1.

Figure 5:
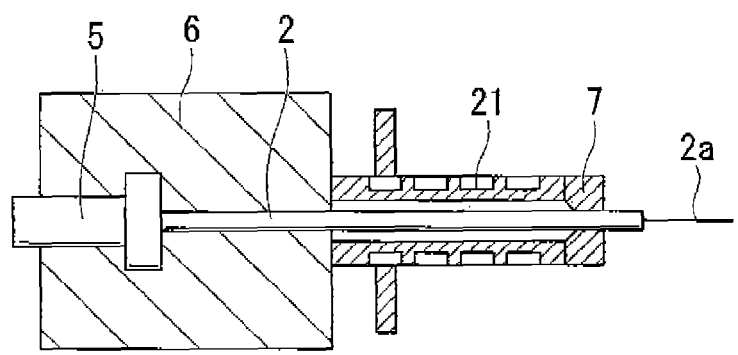
FIG. 5 is a diagram illustrating a step of making the optical connector according to an aspect of the present invention.

First, as illustrated in FIG. 5, an outer side surface (or left-hand side surface in FIG. 5) of the optical fiber 2 is polished together with the ferrule 5. Thereafter, an inner side section (or right-hand side section in FIG. 5) of the optical fiber 2 is decoated and cut to provide an exposed bare optical fiber 2a having a predetermined protruding length for fusion splicing.

Figure 6:
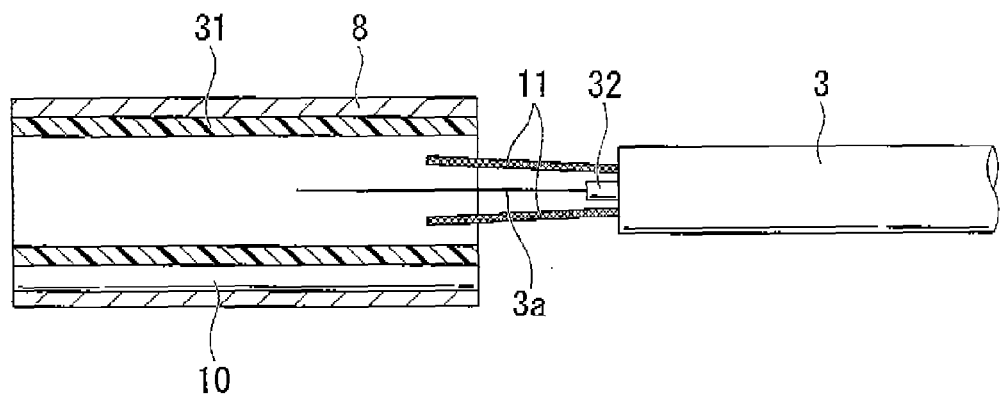
FIG. 6 is a diagram illustrating a step of making the optical connector according to an aspect of the present invention.

Thereafter or therebefore, as illustrated in FIG. 6, to provide the reinforcing sleeve 8, the tensile-strength body 10 is annexed or disposed on the inner surface of the cylindrical sleeve body so as to be parallel with the axis thereof, and then, hot melt resin is applied over the tensile-strength body 10 and the inner surface of the sleeve body so as to form a hot melt resin layer 31 to provide a reinforcing sleeve 8. Alternatively, it is possible to form a predetermined cylindrical-shaped body made of hot melt resin and then insert the same in the sleeve body to provide a reinforcing sleeve 8. Alternatively, a structure is also possible in which the tensile-strength body 10 is directly embedded in the cylindrical sleeve body before or after the hot melt resin application.

On the other hand, a sheath of an outer or connection side section of the optical fiber cord 3 may be peeled to expose a coated optical fiber 32 and tensile-strength fiber bodies 11 and then the tip section of the coated optical fiber 32 may be decoated so as to provide an exposed section of the bare optical fiber 3a.

Figure 7:
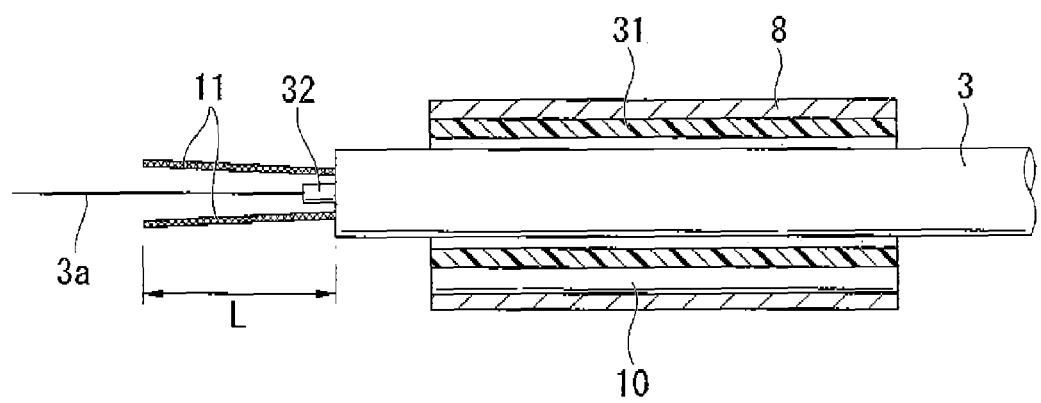
FIG. 7 is a diagram illustrating a step of making the optical, connector according to an aspect of the present invention.

Then, as illustrated in FIG. 7, the thus-prepared optical fiber cord 3 is inserted in the aforesaid reinforcing sleeve 8.

Figure 8:
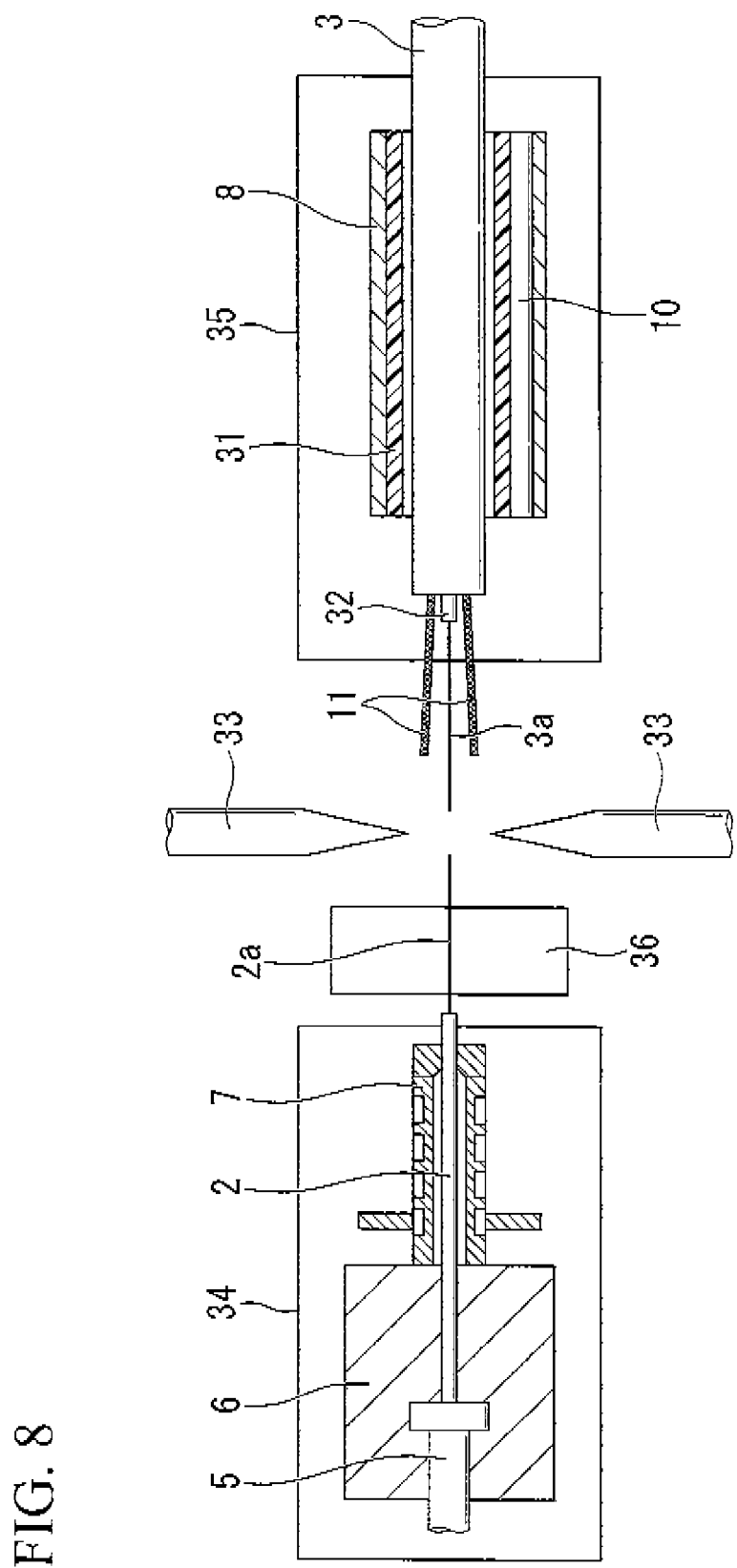
FIG. 8 is a diagram illustrating a step of making the optical connector according to an aspect of the present invention.

Next, as illustrated in FIG. 8, in a fusion-splicing apparatus, discharging electrodes 33 are disposed to oppose one another with a predetermined clearance therebetween. Holders 34 and 35 to be mounted on the fusion-splicing apparatus are prepared. The ferrule 5, the connector housing 6a, and the stop-ring structure 7 are fixedly secured at positions in the holder 34. The bare optical fiber 2a of the optical fiber 2 of the optical connector 6 is set in a V-shaped groove 36 of the fusion-splicing apparatus such that the bare optical fiber 2a is positioned.

The reinforcing sleeve 8 and the optical fiber cord 3 are fixedly secured at positions in the holder 35, and the bare optical fiber 3a is positioned.

Next, the holders 34 and 35 are placed in diametrically opposed positions with respect to the discharging electrodes 33. In addition, the bare optical fibers 2a and 3a are positioned so as to abut one another. A predetermined high voltage is applied to the discharging electrodes 33 such that the abutting portions of the bare optical fibers are fusion-spliced or fused. Namely, the bare optical fiber 2a of the optical fiber 2 of the optical connector 6 and the bare optical fiber 3a of the optical fiber cord 3 are fused and connected to provide a fused connection portion 4.

Figure 9:
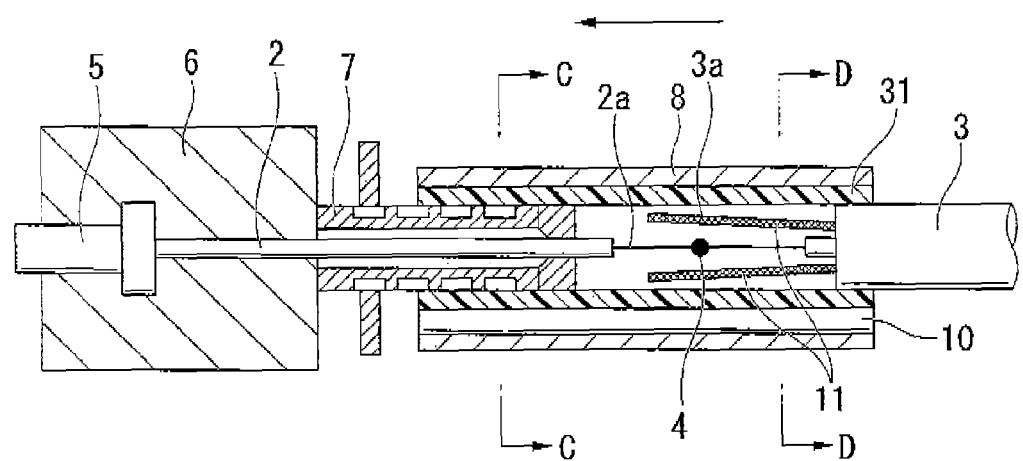
FIG. 9 is a diagram illustrating a step of making the optical connector according to an aspect of the present invention.
Figure 10:
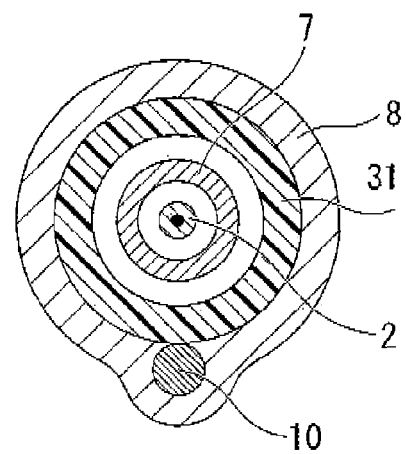
FIG. 10 is a cross-sectional view along line C-C of FIG. 9.
Figure 11:
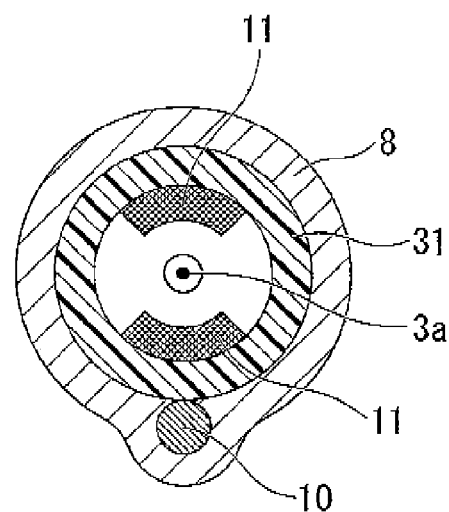
FIG. 11 is a cross-sectional view along line D-D of FIG. 9.

Next, as illustrated in FIGS. 9 to 11, the reinforcing sleeve 8 is moved or shifted to a position where it entirely encloses the fused connection portion and the exposed sections of the bare optical fibers 2a and 3a such that the reinforcing sleeve 8 abuts against the flange 7a of the stop-ring structure 7. With this construction or the simple abutting operation, precise positioning of the reinforcing sleeve 8 is not necessary.

Then, by using an unillustrated heater, the reinforcing sleeve 8 is heated to and maintained at a shrinkage temperature or higher and the hot melt resin layer 31 is heated to and maintained at a melting temperature or higher, so that the reinforcing sleeve 8 is contracted, and at the same time, the hot melt resin layer 31 is melted. Then, the thus-melted hot melt resin flows in and fills up the inner clearance, containing a space in each groove 21 of the stop-ring structure 7, of the reinforcing sleeve 8.

At this time, air residing in the reinforcing sleeve 8 is substantially discharged to the outside of the reinforcing sleeve 8 such that bubbles are not formed or do not remain therein.

Figure 12:
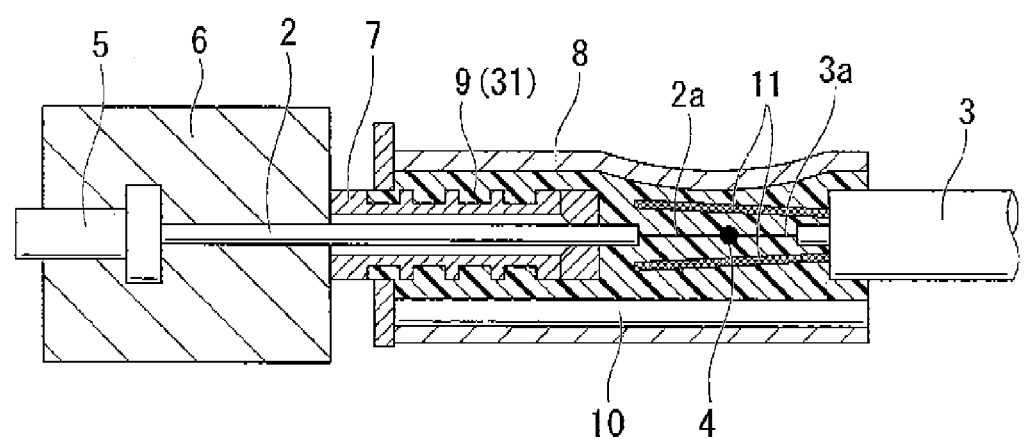
FIG. 12 is a diagram illustrating a step of making the optical connector according to an aspect of the present invention.

Next, it is removed from the heater and then self-cooled to a temperature which is as the same as the shrinkage temperature of the reinforcing sleeve 8, which is lower than the melting temperature of the hot melt resin 31, and which is, for example, room temperature (e.g., 25 degrees centigrade). As a result, as illustrated in FIG. 12, the reinforcing sleeve 8 is contracted and the hot melt resin 31 is cured whereby the reinforcing sleeve 8, the thus-cured hot melt resin 9, and the stop-ring structure 7 are integrally and tightly combined.

Finally, the boot 13 is mounted so that the optical connector or connecting structure 1 of the present embodiment is completed.

Figure 13:
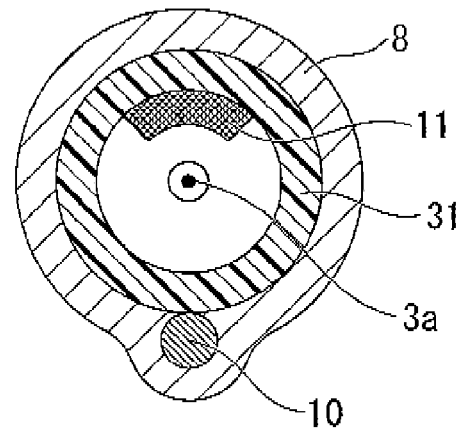
FIG. 13 is a cross sectional diagram illustrating a modified example of the tensile-strength fiber body 11 before heat shrinkage according to the aforesaid aspect of the present invention.

FIG. 13 is a cross-sectional view illustrating a modified example of the tensile-strength fiber body 11 before heat shrinkage of the aforesaid embodiment. The structure of FIG. 13 is different from the structure of FIG. 11 in that the tensile-strength fiber body 11 having a generally fan or sector shape in cross section is solely provided at an upper side with respect to the fused connection portion 4.

Figure 14:
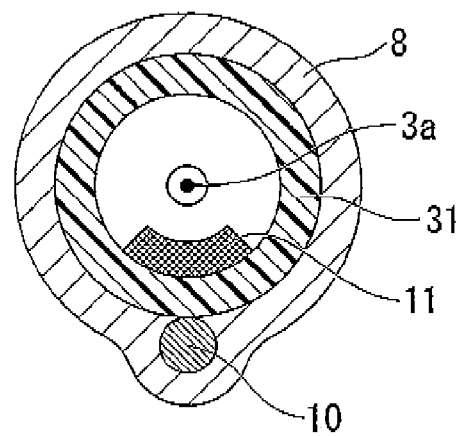
FIG. 14 is a cross sectional diagram illustrating a modified example of the tensile-strength fiber body 11 before heat shrinkage according to the aforesaid aspect of the present invention.

FIG. 14 is a cross-sectional view illustrating a modified example of the tensile-strength fiber body 11 before heat shrinkage of the aforesaid embodiment. The structure of FIG. 14 is different from the structure of FIG. 11 in that the tensile-strength fiber body 11 having a generally fan or sector shape in cross section is solely provided at a lower side with respect to the fused connection portion 4.

Figure 15:
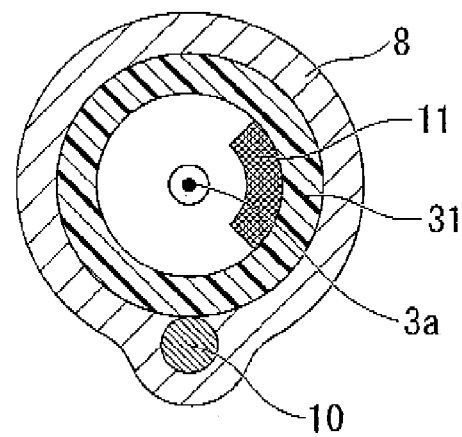
FIG. 15 is a cross sectional diagram illustrating a modified example of the tensile-strength fiber body 11 before heat shrinkage according to the aforesaid aspect of the present invention.

FIG. 15 is a cross-sectional view illustrating a modified example of the tensile-strength fiber body 11 before heat shrinkage of the aforesaid embodiment. The structure of FIG. 15 is different from the structure of FIG. 11 in that the tensile-strength fiber body 11 having a generally fan or sector shape in cross section is solely provided at a right-hand side or left-hand side with, respect to the fused connection portion 4.

Figure 16:
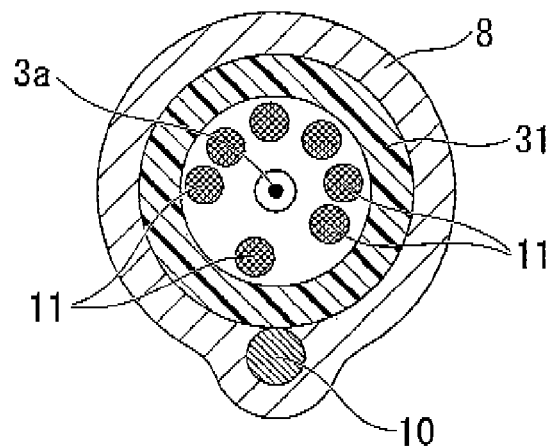
FIG. 16 is a cross sectional diagram illustrating a modified example of the tensile-strength fiber body 11 before heat shrinkage according to the aforesaid aspect of the present invention.

FIG. 16 is a cross-sectional view illustrating a modified example of the tensile-strength fiber body 11 before heat shrinkage of the aforesaid embodiment. The structure of FIG. 16 is different from the structure of FIG. 11 in that the tensile-strength fiber bodies 11 having a generally fan or sector shape in cross section are disposed in an enclosing manner around the fused connection portion 4.

As described, various changes in general shape and disposition with regard to the tensile-strength fiber body 11 are possible, such as those described above and others, as would be understood by one of ordinary skill in the art. Even when such changes are included, it is possible to reduce stress applied to portions, in the fused connection portion 4 or the peripheral thereof, of the bare optical fibers 2a and 3a when heat shrinkage of the reinforcing sleeve 8 is generated and the hot melt resin 31 is hardened, and to thereby protect them.

Figure 17:
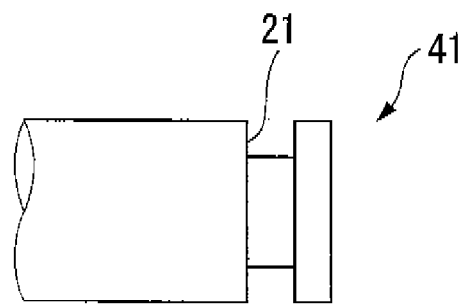
FIG. 17 is a side view illustrating a modified example of the stop-ring structure according to the aforesaid aspect of the present invention.

FIG. 17 is a side view illustrating a modified example of the stop-ring structure 7 of the aforesaid embodiment. The modified stop-ring structure 41 of FIG. 17 is different from the stop-ring structure 7 of FIG. 1 in that a circumferential groove 21 is formed on a tip end thereof. For example, when the stop-ring structure 41 has a diameter of 4 mm and a length of 8 mm and the reinforcing sleeve 8 has a length of 34 mm, the circumferential groove 21 may be set to have a width of 2 mm and a depth of 2 mm and to be formed at a lengthwise directional position of 1.5 mm from the tip end face.

Figure 18:
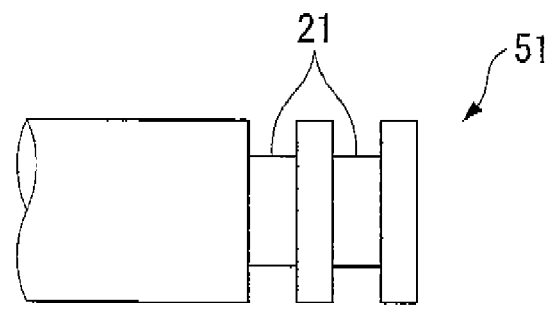
FIG. 18 is a side view illustrating a modified example of the stop-ring structure according to the aforesaid aspect of the present invention.

FIG. 18 is a side view illustrating a modified example of the stop-ring structure 7 of the aforesaid embodiment. The modified stop-ring structure 51 of FIG. 18 is different from the stop-ring structure 7 of FIG. 1 in that two circumferential grooves 21 are formed on a tip end thereof. For example, when the stop-ring structure 51 has a diameter of 4 mm and a length of 8 mm and the reinforcing sleeve 8 has a length of 34 mm, each of the circumferential grooves 21 may be set to have a width of 2 mm and a depth of 2 mm and the distance between them is set to be 1.5 mm.

Figure 19:
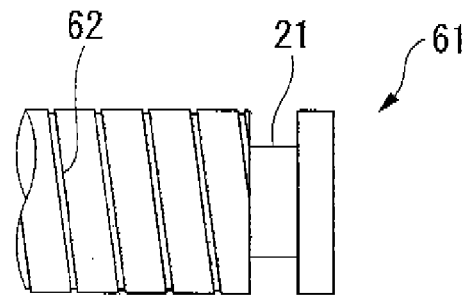
FIG. 19 is a side view illustrating a modified example of the stop-ring structure according to the aforesaid aspect of the present invention.

FIG. 19 is a side view illustrating a modified example of the stop-ring structure 7 of the aforesaid embodiment. The modified stop-ring structure 61 of FIG. 19 is different from the stop-ring structure 7 of FIG. 1 in that the circumferential groove 21 is formed on a tip end thereof and that a spiral groove 62 is formed on a body portion thereof. With the circumferential groove 21 and the spiral groove 62 provided in the stop-ring structure 61, the coefficient of friction between the stop-ring structure 61 and the reinforcing sleeve 8 is further increased, and accordingly the tensile breaking strength is further improved.

Figure 20:
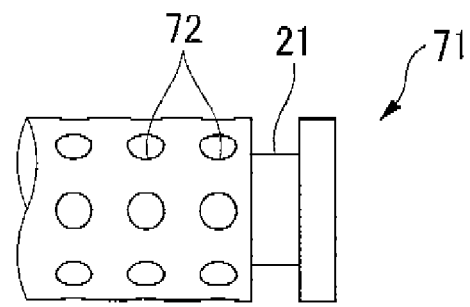
FIG. 20 is a side view illustrating a modified example of the stop-ring structure according to the aforesaid aspect of the present invention.

FIG. 20 is a side view illustrating a modified example of the stop-ring structure 7 of the aforesaid embodiment. The modified stop-ring structure 71 of FIG. 20 is different from the stop-ring structure 7 of FIG. 1 in that the circumferential groove 21 is formed on a tip end thereof and that recessed portions 72, whose openings are of circular shape and whose cross sections are of arc-shape, are provided in a grid pattern on a peripheral surface of a body portion of the stop-ring structure 71. With the circumferential groove 21 and the recessed portions 72 of the body portion provided in the stop-ring structure 71, the coefficient of friction between the stop-ring structure 71 and the reinforcing sleeve 8 is further increased, and accordingly the tensile breaking strength is further improved.

Figure 21:
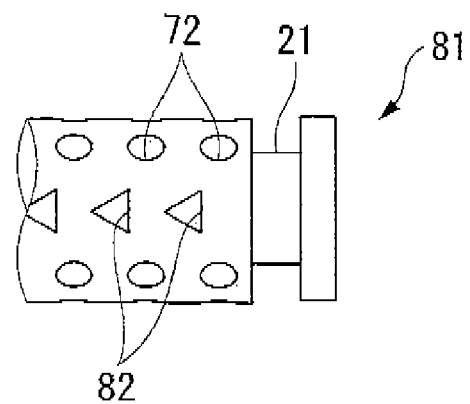
FIG. 21 is a side view illustrating a modified example of the stop-ring structure according to the aforesaid aspect of the present invention.

FIG. 21 is a side view illustrating a modified example of the stop-ring structure 7 of the aforesaid embodiment. The thus-illustrated stop-ring structure 81 is different from the stop-ring structure 7 of FIG. 1 in that the circumferential groove 21 is formed on a tip end thereof, that a plurality of lines (parallel to the center axis) of recessed portions 72 (whose openings are of circular shape and whose transverse cross sections are of arc-shape) are formed on the outer peripheral surface of the body portion, and that, between the lines of the recessed portions 72, and that another plurality of lines (parallel to the center axis) of recessed portions 82 (whose openings are of triangular shape and whose transverse cross sections are of rectangular shape) are formed. With the circumferential groove 21 and the recessed portions 72 and 82 of the body portion provided in the stop-ring structure 81, the coefficient of friction between the stop-ring structure 81 and the reinforcing sleeve 8 is further increased and accordingly the tensile breaking strength is further improved.

As described above, according to the optical connector connecting apparatus 1 of this embodiment, it is possible to firmly secure the fused connection portion 4 of the optical fibers and the reinforcing sleeve 8 without a clearance being generated therebetween, to make workability easy, and to reduce the production cost.

It is also possible for the fused connection portion 4 of the optical fibers, the reinforcing sleeve 8, the cured hot melt resin 9, and the tensile-strength body 10 to be tightly and integrally solidified.

Incidentally, in the aforesaid exemplary embodiment, the reinforcing sleeve 8 abuts the flange 7a of the stop-ring structure 7, and thereafter, the reinforcing sleeve 8 is contracted or shrunk such that the cured resin 9 and the stop-ring structure 7 are integrally connected. Alternatively, a structure is possible in which there is a clearance between the reinforcing sleeve 8 and the flange 7a of the stop-ring structure 7.

Further, the numbers or shapes of the grooves 21 of the stop-ring structure 7, the pitch and the depth of the spiral groove 62, the shapes, the dimensions and the numbers of the recessed portions 72 and 82, and the like, are appropriately selected according to need. The invention is not limited to those disclosed in the Figures.

Furthermore, although the concave portions or recessed portions 72 and 82 are provided in the present embodiment, they can be replaced with unillustrated convex portions by which similar effects can be obtained.

Hereinafter, a second embodiment of the present invention is described with reference to the attached figures. It should be noted that a "tensile-strength body" in the second embodiment is configured differently from the "tensile-strength body" described above in the first embodiment. The "tensile-strength body" in the second embodiment is also referred to as a "tensile-strength fiber body." In addition, a "reinforcing sleeve" in the second embodiment is configured differently from the "reinforcing sleeve" described above in the first embodiment. Further, the "reinforcing material" in the second embodiment is also referred to as a "hot melt resin body."

First, an optical fiber cord provided with a connector (an optical transmission element) (also referred to as a "connector-attached optical fiber cord") according to the second embodiment of the present invention is described with reference to, for example, FIGS. 22 to 29A, and 29B.

Figure 22:
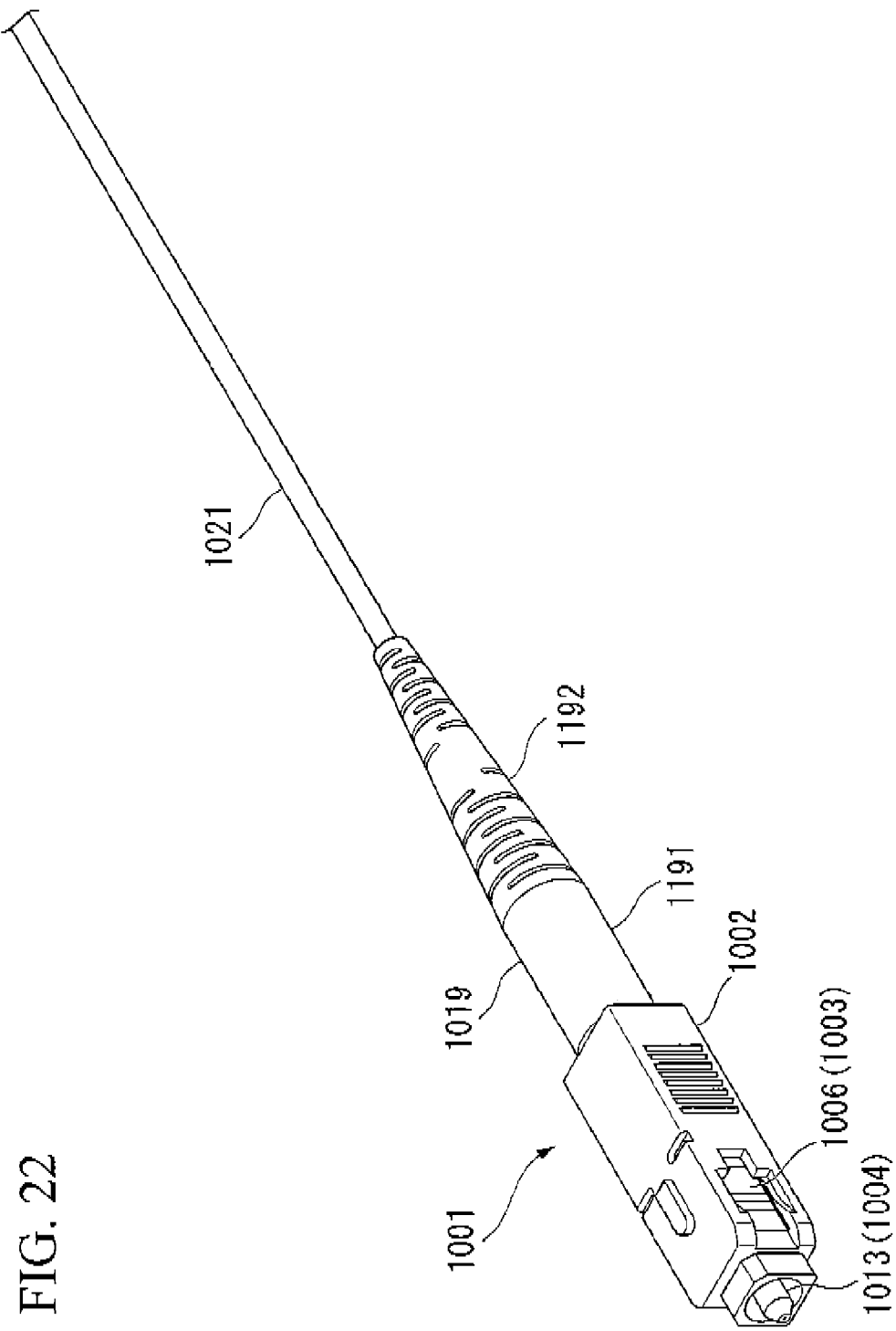
FIG. 22 is a perspective view illustrating an exterior appearance of the optical fiber cord provided with a connector (optical transmission element provided with a connector) according to an aspect of the present invention.
Figure 23A:
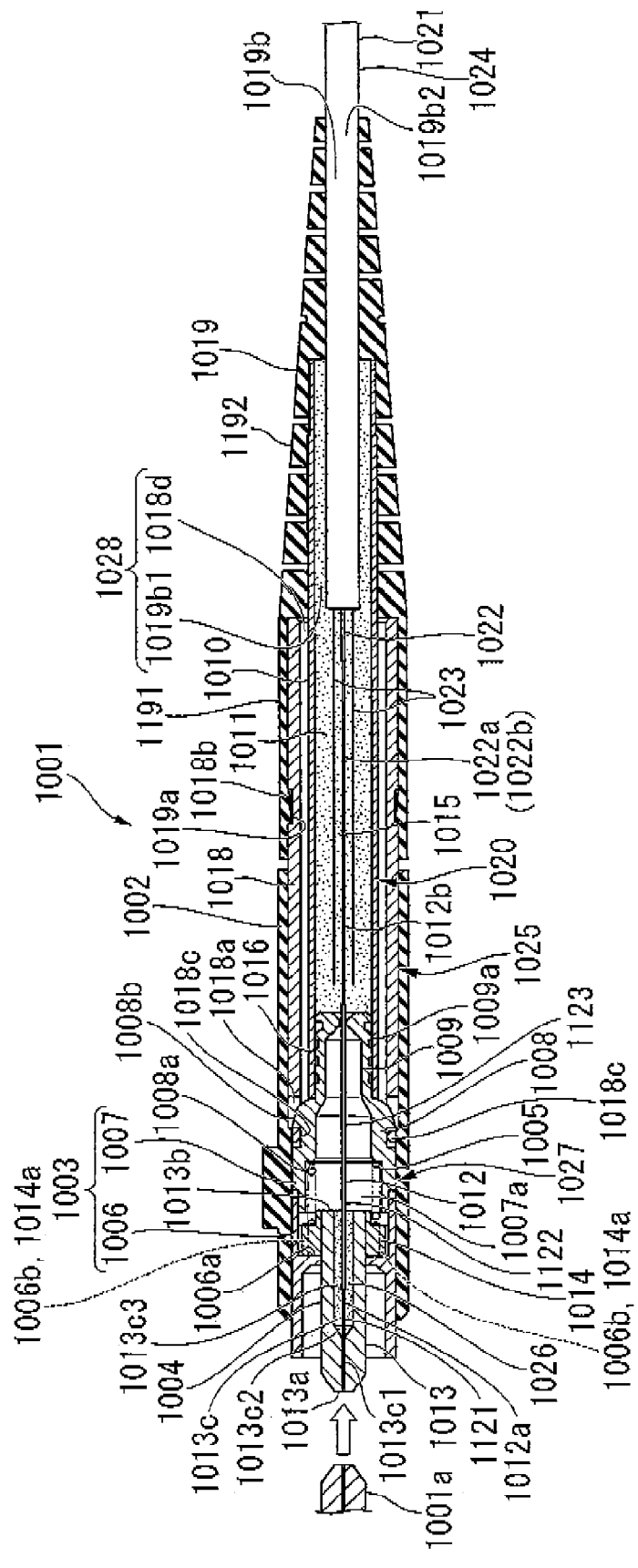
FIG. 23A is a cross sectional diagram representing an optical fiber cord provided with a connector shown in FIG. 22.
Figure 23B:
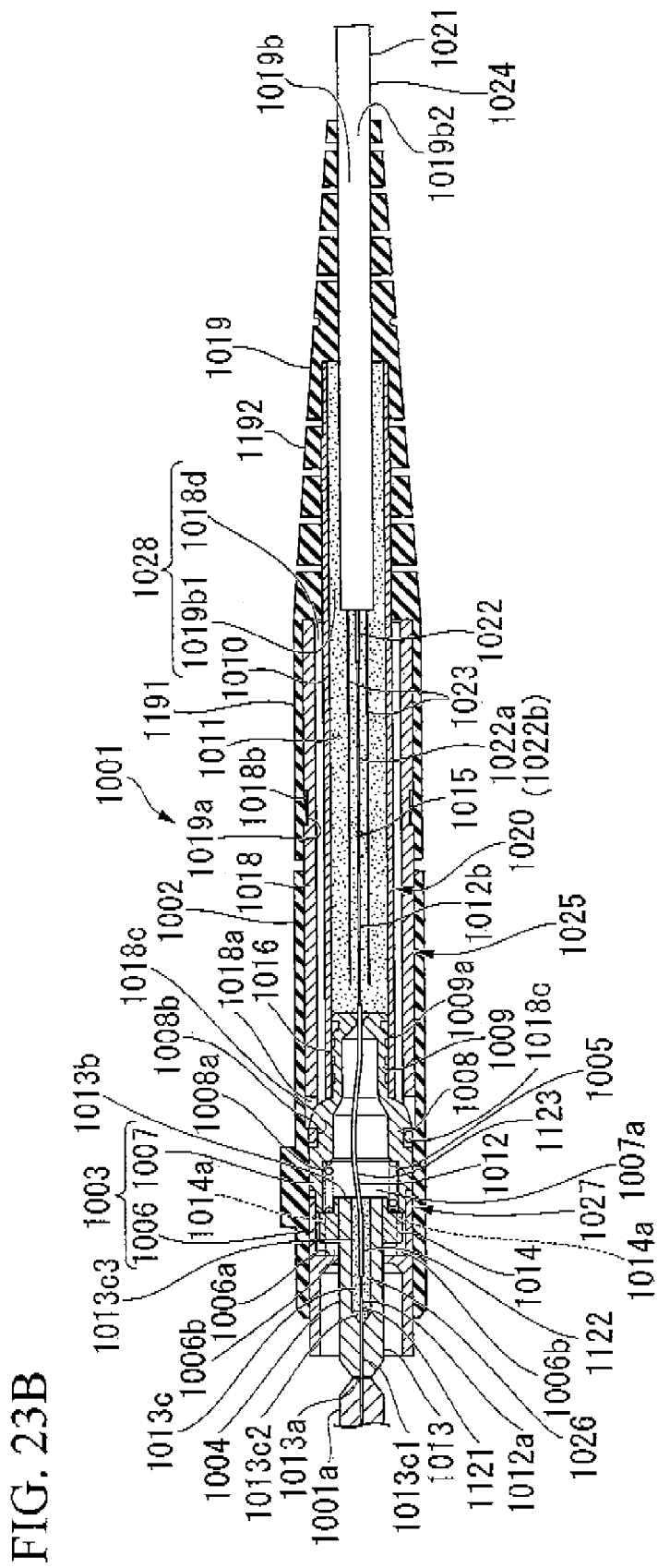
FIG. 23B is a cross sectional diagram representing an optical fiber cord provided with a connector shown in FIG. 22.

As indicated in FIGS. 22, 23A, and 23B, this optical fiber cord provided with a connector is formed by installing an optical connector 1001 to a terminal of an optical fiber cord 1021 (optical transmission element).

In the following description, the left side in FIGS. 23A and 23B is regarded as the front side, and the right side is regarded as the rear side.

Figure 25:
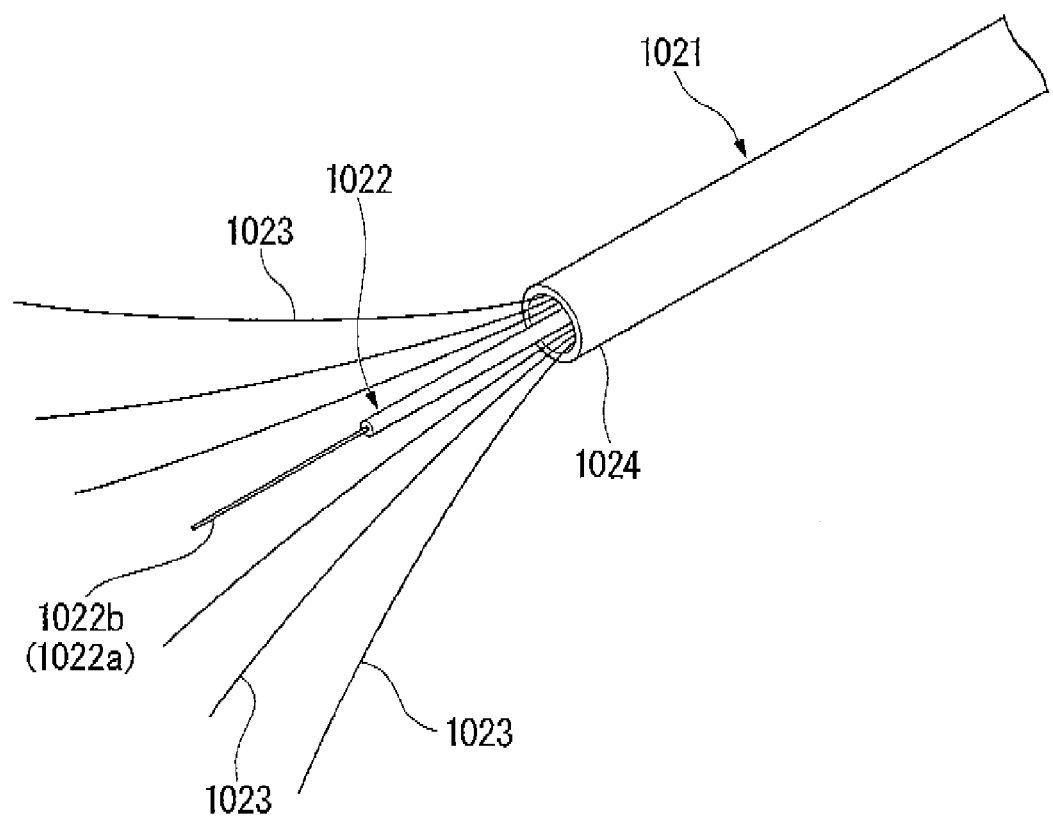
FIG. 25 is a perspective view representing a structure of an optical fiber cord used for an optical fiber cord provided with a connector shown in FIG. 22.

As shown in FIG. 25, the optical fiber cord 1021 is structured so that an optical fiber 1022, such as an optical fiber core wire, and a tensile-strength body 1023 (tensile-strength fiber body), extending along the longitudinal direction of the optical fiber 1022, are stored inside a sheath 1024 (external covering) comprising a resin such as polyethylene.

An aramid fiber is preferred as the tensile-strength body 1023. However, a glass fiber and a carbon fiber may be used as the tensile strength body as well.

As shown in FIGS. 22, 23A, and 23B, the optical connector 1001 forms a terminal so that the optical fiber 1022 can be connected to a connector.

As shown in FIGS. 23A and 23B, the optical connector 1001 is structured so that a ferrule 1004, a coil spring 1005 (spring) which elastically energizes the ferrule 1004 in the forward direction, and a fused reinforcing portion 1020 are stored inside a connector housing 1025 installed with a coupling 1002 (knob). The fused reinforcing portion 1020 is formed by embedding a fused connection portion 1015 inside a reinforcing material 1011 (hot melt resin body). This reinforcing material 1011 is filled inside a reinforcing tube 1010 made of resin, which is externally fixed along the fused connection portion 1015. This fused connection portion 1015 is formed by fuse-splicing a terminal (a rear end portion 1012b) of a part of the shorter optical fiber 1012 (hereinafter, may also be referred to as an embedded optical fiber) extending in the rear side of the ferrule 1004 with the optical fiber 1022 sticking out from a terminal of the optical fiber cord 1021. The shorter optical fiber 1012 is fixed inside the ferrule 1004.

The optical connector 1001 illustrated in the figure is an optical connector for a single core optical fiber. The optical connector is assembled to a tip of a single core optical fiber cord 1021.

The optical fiber 1022 of the optical fiber cord 1021 is a single core optical fiber such as a single core optical fiber core wire, and an optical fiber wire.

The ferrule 1004 includes a cylindrical capillary portion 1013 (the main body of the ferrule) and a flange portion 1014. This flange portion 1014 is a ring shaped metallic component which is externally fixed along the rear end portion 1013b in a side opposite to the tip (in the front end) at which a connection end plane 1013a abutting the capillary portion 1013 is installed. Examples of the material of this capillary portion 1013 include ceramic material such as zirconium and glass.

The same type of ferrule used in the following single core optical connector, for example, can be used as the ferrule 1004: an SC type optical connector (an F04 type optical connector designed as JIS C 5973, SC referring to a "Single Fiber Coupling Optical Fiber Connector") and an MU type optical connector (an F14 type optical connector designed as JIS C 5983, MU referring to a "Miniature-Unit Coupling Optical Fiber Connector").

As shown in FIGS. 23A and 23B, the embedded optical fiber 1012 is a single core optical fiber such as a single core optical fiber core wire and optical fiber wire. An end portion (tip portion) of the embedded optical fiber 1012 in the longitudinal direction is inserted an optical fiber insertion hole 1013 (a pore) which is formed on the same axis as the central axis of the capillary portion 1013. The fiber insertion hole 1013 runs through the inner side of the capillary portion 1013 of the ferrule 1004. The end portion of the embedded optical fiber 1012 is fixed to the capillary portion 1013 with an adhesive 1026.

The embedded optical fiber 1012 is a covered, single core optical fiber produced by coating (or covering) a bare optical fiber 1121 with a coating material 1122 made of resin. The coating material 1122 is not provided to both ends of the embedded optical fiber 1012 in the longitudinal direction. At these ends, the bare optical fiber 1121 is sticking out.

The optical fiber insertion hole 1013c of the capillary portion 1013 is a pore having an inner diameter which is approximately equal to an outer diameter of the bare optical fiber 1121 of the embedded optical fiber 1012. The optical fiber insertion hole 1013c includes a fiber pore part 1013c1, a tapered pore part 1013c2, and an extended pore part 1013c3. The fiber pore part 1013c1 extends from a connected end plane 1013a of the capillary portion 1013 to the rear end of the capillary portion 103. The tapered pore part 1013c2 is tapered so that the inner diameter of the pore increases from the rear end of the fiber pore part 1013c1 to the rear end of the capillary 1013. The diameter of the extended pore part 1013c3 is equal to the diameter of the rear end of the tapered pore part 1013c2. The extended pore part 1013c3 extends from the rear end of the tapered pore part 1013c2, along the same axis as the fiber pore 1013c1, and reaches the rear end of the capillary portion 1013.

The embedded optical fiber 1012 is attached to the ferrule 1004 (in further detail, the embedded optical fiber 1012 is attached to the capillary portion 1013) by inserting one end of the covered fiber portion 1123 (covered with a covering material 1122) inside the extended pore part 1013c3 of the optical fiber insertion hole 1013c of the capillary 1013, and then inserting the tip portion 1012a (the tip of the embedded optical fiber 1012) inside the fiber pore part 1013c1 of the optical fiber insertion hole 1013c. The tip portion 1012a is the tip of the bare optical fiber 1121 which is sticking out from an end of the covered fiber 1123 inserted in the extended hole portion 1013c3.

In addition, the part of the embedded optical fiber 1012, which is inserted from the fiber pore part 1013c1 of the optical fiber insertion hole 1013c to the tapered hole part 1013c2 in the rear side and the extended hole part 1013c3, is bonded and solidified so as to be embedded in the adhesive 1026 filled inside the tapered pore part 1013c2 and the extended pore part 1013c3.

The adhesive 1026 is also provided inside the fiber pore part 1013c1. This structure is not diagramed. The tip portion 1012a of the embedded optical fiber 1012 inserted in the fiber pore part 1013c1 is solidified through this adhesive.

However, the solidification of the embedded optical fiber 1012 in the ferrule 1004 is sufficiently performed as long as at least the covered fiber portion 1123, among the parts of the embedded optical fiber 1012 inserted in the optical fiber insertion hole 1013c, is adequately solidified. The tip portion 1012a of the embedded optical fiber 1012 inside the fiber pore part 1013c1 can also be solidified without using the adhesive 1026. For example, the tip portion 1012a can be fixed by press-fitting the tip portion 1012a into the fiber pore part 1013c1.

According to FIGS. 23A and 23B, the covered fiber portion 1123 of the embedded optical fiber 1012 is inserted only to the extended pore part 1013c3 of the optical fiber insertion hole 1013c. Only the bare optical fiber 1121 included in the tip portion 1012a of the embedded optical fiber 1012 is inserted in the tapered pore part 1013c2 of the optical fiber insertion hole 1013c. However, the present invention is not limited by this structure. For example, an end portion of the covering material 1122 of the covered fiber portion 1123 of the embedded optical fiber 1012 may be placed inside the tapered pore part 1013c2. As another example, the end portion of the covering material 1122 of the covered fiber portion 1123 of the embedded optical fiber 1012 may be abutted to the inner side of the tapered pore part 1013c2.

The embedded optical fiber 1012 is inserted and fixed in the ferrule 1004 so that an end plane of the tip portion 1012a of the embedded optical fiber 1012 is placed along the polished connection end plane 1013a of the ferrule 1004 (the connection end plane 1013a of the capillary part 1013).

An end plane of the tip portion 1012a of the embedded optical fiber 1012 may be a vertical plane with respect to the optical axis at the end plane. In addition, a polished plane, which is continuous with the connection end plane 1013; can be formed, for example, by polishing the connection end plane 1013a after the embedded optical fiber 1012 is inserted and fixed to the ferrule 1004 (in more detail, to the capillary part 1013).

The length of the embedded optical fiber 1012 is longer than the optical fiber insertion hole 1013c of the ferrule 1004. The portion of the embedded optical fiber 1012 which is not inserted and fixed in the optical fiber insertion hole 1013c is sticking out from the rear side of the ferrule 1004 (in more detail, from the capillary portion 1013). The embedded optical fiber 1012 is fuse-connected to the tip portion 1022a by fuse-connecting the rear end portion 1012b (in other words, the rear end portion of the bare optical fiber 1121), comprising the bare optical fiber 1121 sticking out from an end of the portion extending in the side (hereinafter, may be referred to as the rear side extending portion) from the rear end of the ferrule (the rear end of the capillary portion 1013c of the ferrule 1004 in the diagramed example), to the tip portion 1022a, comprising the bare optical fiber 1022b sticking out of the tip of the optical fiber 1022 extending from the tip of the optical fiber cord 1021.

The covered fiber portion 1123 of the embedded optical fiber 1012 extends to the rear side from the ferrule housing 1003. The entire part of the rear side extending portion of the embedded optical fiber 1012 which is placed inside the ferrule housing 1003 is regarded as the covered fiber portion 1123.

The embedded optical fiber 1012 according to the present invention is not limited to the above configuration in which the bare optical fiber 1121 is sticking out from both ends of the covered optical fiber. For example, the embedded optical fiber 1012 may be configured so that the optical fiber is bare over the entire length of the embedded optical fiber 1012.

Next, a connector housing 1025 is described.

Figure 24:
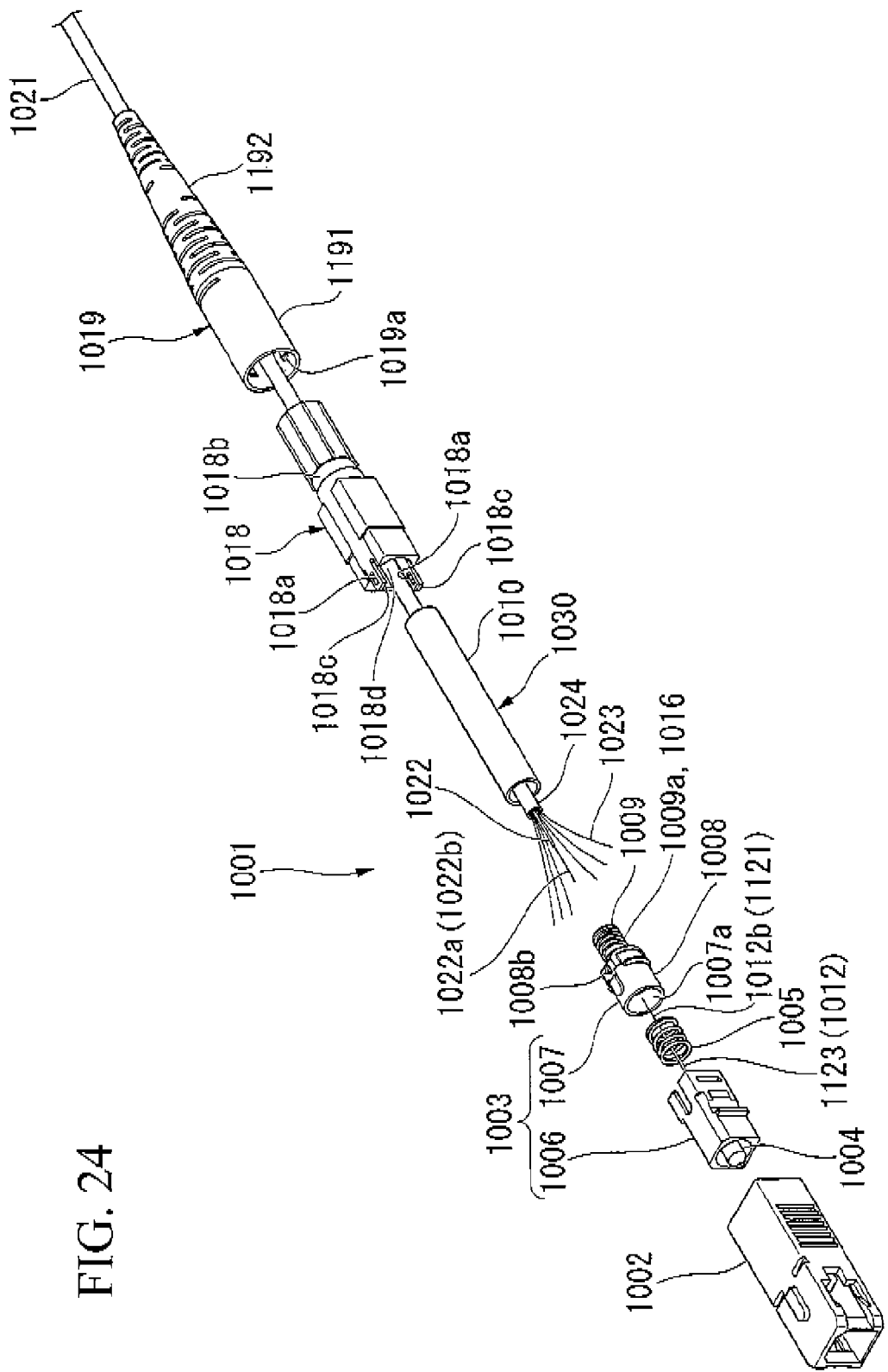
FIG. 24 is an exploded perspective view illustrating a structure of an optical fiber cord provided with a connector shown in FIG. 22.

As shown in FIGS. 23A, 23B, and 24, the connector housing 1025 includes the ferrule housing 1003 which is sleeve-shaped and stores the ferrule 1004 and the coil spring 1005; a protection tube portion 1018 (hereinafter, may also be referred to as a body sleeve) which is installed to the rear end side of the ferrule housing 1003 so as to extend to the rear side from the ferrule housing 1003, and a boot 1019 which is externally fitted to the rear end part of the body sleeve 1018.

The ferrule housing 1003 is shaped like a sleeve in general, due to the plug frame 1006 which is sleeve-shaped (shaped as a rectangular tube in the diagram), and a stop-ring 1007 which is sleeve shaped (shaped as a cylinder in the diagram) and attached to the rear end portion of the plug frame 1006. The stop-ring 1007 is attached to the plug frame 1006 by fitting the front end of the stop-ring 1007 to the inner side of the rear end of the plug frame 1006.

As shown in FIGS. 23A and 23B, the optical connector 1001 includes a ferrule storing unit 1027 which is produced by storing the ferrule 1004 and the coil spring 1005 into the ferrule housing 1003.

The stop-ring 1007 includes a body part 1008 which is sleeve-shaped (in more detail, shaped like a cylinder), and a tube fixing part 1009 which is shaped like a tube (cylinder) with a radius smaller than the radius of the body part 1008. The tube fixing part 1009 extends to the rear side from the body part 1008. One end (the front end portion) of the reinforcing tube 1010 of the fused reinforcing portion 1020 in the longitudinal direction is externally fixed to the tube fixing portion 1009.

As shown in FIGS. 23A and 23B, the ferrule 1004 is stored in the ferrule housing 1003 so that the center axis of the ferrule 1004 is positioned along the central axis of the ferrule housing 1003. In addition, the ferrule 1004 is stored in the ferrule housing 1003 so that the ferrule 1004 can move in the front-rear direction (the direction of the extension of the central axis of the ferrule housing 1003) in the ferrule housing 1003. The flange portion 1014 of the ferrule 1004 is placed between a stopper prong 1006a and a front end of the stop-ring 1007 (the front end of the body part 1008) which is internally fixed to the rear end of the plug frame 1006. The protruding stopper prong 1006a is placed in the inner side of the central portion of the plug frame 1006 in the longitudinal direction (in the direction along the central axis).

A clearance is provided between the stopper prong 1006a and the front end of the stop-ring 1007 so that the flange part 1014 of the ferrule 1004 can move in the front-rear direction. The amount that the flange part 1014 is allowed to move in the front-rear direction due to this clearance equals the amount that the ferrule 1004 can move inside the ferrule housing 1003.

Because the flange part 1014 hits the stopper prong 1006a (see FIG. 23A), the ferrule 1004 is prevented from moving further to the front side. On the other hand, because the flange part 1014 hits the front end of the stop-ring 1007 (see FIG. 23B), the ferrule 1004 is prevented from moving further to the rear side.

The flange part 1014 hits the front end of the stop-ring 1007 from the front side. In this way, the front end of the stop-ring 1007 acts as a stopper end which prevents the ferrule 1004 from further moving in the rear direction.

The coil spring 1005 is provided between the flange part 1014 of the ferrule 1004 and a locking step portion 1008a formed on the inner side of the stop-ring 1007, so that the central axis line of the coil spring 5 runs along the front-rear direction of the connector.

A spring storing hole 1007a is provided on a front end of a hole (a stop-ring penetrating hole) which penetrates the inner side of the stop-ring 1007. This spring storing hole 1007 is used to store the rear end of the coil spring 1005 which is provided on the same axis as the sleeve-shaped ferrule housing 1003. The spring storing hole 1007a is formed as an extension hole which has an inner diameter greater than the inner diameter of the rear part of the stop-ring penetrating hole from the stop-ring storing hole 1007a. In more detail, the locking step portion 1008a provided in the inner side of the stop-ring 1007 is a step plane formed by the difference in the inner diameters of the spring storing hole 1007a and the rear part of the stop-ring penetrating hole from the stop-ring storing hole 1007a. Considering the stop-ring 1007 shown in the diagram, the locking step portion 1008a (the step plane) is formed on the inner plane of the body part 1008 of the stop-ring 1007.

As shown in FIG. 23A, the ferrule 1004 is elastically energized towards the front side of the connector by the coil spring 1005. When a force pushing toward the rear side of the connector is not applied, the ferrule is provided at a position at which the flange part 1014 hits the stopper prong from its rear side (in other words, the furthest position in the front side to which the flange can move).

In addition, as shown in FIG. 23B, when the optical connector 1001 abuts and connects to another optical connector 1001a, an abutting force is provided between the other optical connector 1001a and the ferrule 1004 due to an elastic energizing force of the coil spring 1005, because the ferrule acts against the elastic energizing force of the coil spring 1005, the coil spring 1005 is contracted, and is pushed toward the rear side of the connector housing 1025.

Incidentally, FIG. 23B shows a condition in which the flange part 1014 of the ferrule 1004 has hit the front end of the stop-ring 1007 from the front side. In other words, FIG. 23B shows a condition in which the ferrule 1004 is at the furthest possible position to which the ferrule 1004 can move towards the rear side. However, when the connector is connected, it is not necessary that the ferrule 1004 reach the furthest possible position to which it can move towards the rear side. It is possible that the ferrule 1004 is placed between the furthest possible position to which it can move towards the front side and the furthest possible position to which it can move towards the rear side.

In addition, as shown in FIGS. 23A and 23B, the ferrule 1004 can move towards the front and rear sides with respect to the ferrule housing 1003, while a key 1006b protruding toward the inner side of the plug frame 1006 is inserted into a key trench 1014a formed on the peripheral portion of the flange part 1014, and while the rotation around the axis with respect to the ferrule housing 1003 is maintained in a controlled condition. The flange portion 1014 can slide with respect to the key 1006b inserted into the key trench 1014a, because the ferrule 1004 moves towards the front and rear side with respect to the ferrule housing 1003.

The furthest possible position to which the ferrule 1004 can move towards the rear side is set so that, when the ferrule 1004 moves (i.e., the ferrule 1004 is pushed in) towards the rear side with respect to the connector housing 1025, the bending and deformation of the embedded optical fiber 1012 extending from the rear end of the ferrule 1004 (the rear side extending portion) inside the ferrule housing 1003 are restrained so that the optical characteristics of the embedded optical fiber 1012 are not affected.

In this way, as the ferrule 1004 moves (i.e., is pushed in) towards the rear side of the connector housing 1025, it is possible to prevent the curving and the deformation of the rear side extending portion of the embedded optical fiber 1012 inside the ferrule housing 1003 from becoming too large (i.e., the radius of the curvature is prevented from becoming too small). Thus, the embedded optical fiber 1012 is prevented from being damaged or broken by bending.

As shown in FIGS. 22 to 24, the optical connector 1001 illustrated in the diagrams is structured so that a plug frame and a coupling used in SC-type optical connectors are used respectively as the plug frame 1006 and the coupling 1002.

The coupling 1002 is a component shaped as a rectangular tube. The coupling 1002 is externally fixed to the ferrule housing 1003 and the main body of the housing, so that the coupling 1002 can slide by a slight distance in the front and rear directions. The ferrule housing 1003 is produced by internally fixing a cylindrical stop-ring 1007 to the rear end of the plug frame 1006 shaped as a rectangular tube. The main body of the housing is formed by fixing the body sleeve 1018 to the stop-ring 1007 from the rear side. Along with the plug frame 1006, this coupling 1002 is a part of a slide lock mechanism, which is similar to the slide locking mechanism equipped in generic SC-type optical connectors, with respect to the position determining housing of the connector such as an optical connector adapter and an optical connector receptacle.

Incidentally, the plug frame and the coupling used in the above aspect of the present invention need not be the plug frame and the coupling used in SC-type optical connectors. For example, a plug frame and a coupling used in MU-type optical connectors may be used instead.

Along with the plug frame, the coupling is a component forming the slide lock mechanism with respect to the position determining housing of the connector. In other words, due to the movement of the connector in the front and rear directions with respect to the plug frame, the coupling acts as a switch between the locking and the unlocking of the engagement condition of the elastic click inside the position determining housing of the connector with respect to the plug frame. The detailed structure of the coupling may be altered according to the configurations of the position determining housing of the connector and the plug frame.

As shown in FIGS. 23A, 23B, and 24, it is preferable that a concave-convex portion 1016 is formed on the peripheral surface of the tube fixing portion 1009 of the ferrule housing 1003. There is no particular limitation on the shape of the concave-convex portion 1016. However, it is preferred that the concave-convex portion 1016 extends along the peripheral direction of the tube fixing portion 1009. Alternatively, it is preferred that a plurality of concave-convex portions 1016 are placed in series along the peripheral direction of the tube fixing portion 1009. In the diagram, a plurality of circular bump portions 1009a extend along the peripheral direction of the tube fixing portion 1009, with a space in the front and rear sides of each circular bump portion 1009. Due to the concave-convex portion 1016 and the circular bump portion 1009a, the reinforcing tube 1010 and the tube fixing portion 1009 can be fixed more tightly. In this way, the resisting force against a pulling force (in the direction of the right side in FIGS. 23A and 23B) can be augmented. In addition, when the reinforcing tube 1010, attached to the tube fixing portion 1009, is shaped so that the reinforcing tube 1010 is placed along the concave-convex pattern of the peripheral plane of the tube fixing portion 1009 due to heat contraction, the resistance against the pulling force becomes greater.

In the diagramed example, the cross-section of the circular bump portion 1009a is rectangular. However, the cross-sectional shape of the circular bump portion is not limited to this configuration. For example, the shape can be a half-circle, or V-shaped. In addition, only one circular bump portion may be provided. Alternatively, a plurality of circular bump portions may be provided as well.

As shown in FIGS. 23A, 23B, and 24, the body sleeve 1018 is a tube component which can be externally fitted to the fused reinforcing portion 1020. A latching hole 1018a is formed on the front end of the body sleeve 1018. A latching bump portion 1008b fits in the latching hole 1018a. The latching bump portion 1008b is formed on the peripheral plane of the main body part 1008 of the stop-ring 1007. The body sleeve 1018 is externally fitted to the ferrule housing 1003 by fitting the latching bump portion 1008b to the latching hole 1018a.

According to the optical connector 1001 in the diagrammed example, the latching hole 1018a of the body sleeve 1018 is formed on each pair of latching portions 1018c. The latching portion 1018c protrudes towards the front side from both rims of the body sleeve 1018 via the front end opening of the body sleeve 1018. The latching hole 1018a fits with the latching bump portion 1008b. The latching bump portions 1008b are provided on both sides of the peripheral plane of the stop-ring 1007. The latching bump portions 1008b correspond to the two latching holes 1018a of the body sleeve 1018.

Incidentally, the number of the latching holes 1018a of the body sleeve 1018 and the latching bump portions 1008b of the stop-ring 1007 is not limited to two. The number of the latching holes 1018a and the latching bump portions 1008b may be three or more.

In addition, the latching hole 1018a of the body sleeve 1018 is not limited to a configuration in which the latching hole 1018a is formed on the latching portion 1018c of the body sleeve 1018. Instead, the latching hole 1018a may be formed as a window opening penetrating the thick, front end of the sleeve portion of the body sleeve 1018.

The boot 1019 is a component structured so that a tapered tube portion 1192 extends from the rear end of the fitting tube 1191. The tapered tube portion 1192 is tapered from this fitting tube 11 towards the rear side. The fitting tube 11 is cylindrical and is externally fitted to the rear end of the body sleeve 1018. The entire portion of this boot 1019 is integrally formed by an elastic material such as rubber. Thus, the tapered tube portion 1192 is flexible so that it can be bent easily.

As shown in FIGS. 23A and 23B, this boot 1019 is installed so that the fitting tube 1191 is externally fitted to the rear end of the body sleeve 1018 by fitting a latching protrusion 1019 formed on the inner side of the fitting tube 1191 to the latching bump portion 1018b in the outer surface of the body sleeve 1018, so that the movement in the front and rear direction of the connector is restricted. In addition, the tapered portion 1192 extends from the body sleeve 1018 towards the rear side.

Incidentally, the coupling 1002 can move in the front-rear direction from the position of the fitting tube 1191 of the boot 1019 externally fitted to the rear, end of the body sleeve 1018 to the position distanced to the front side of the connector. The coupling 1002 is installed so that, even though the coupling 1002 moves to the furthest possible position in the rear direction of the connector, the coupling 1002 does not touch the boot 1019.

As shown in FIGS. 23A and 23B, the optical fiber cord 1021 is internally fitted to a tapered tube penetrating hole 1019b penetrating the inner side of the tapered tube portion 1192 of the boot 1019.

The tapered tube penetrating hole 1019b includes a fused reinforcing portion storing hole 1019b1 in the front end and a transmission element storing hole 1019b2. This transmission element storing hole 1019b2 has a radius smaller than the radius of the fused reinforcing portion storing hole 1019b1. In addition, the transmission element storing hole 1019b2 penetrates from the rear end of the fused reinforcing portion storing hole 1019b1 to the rear end of the tapered tube portion 1192. The optical fiber cord 1021 is not fixed to the boot 1019. Instead, the optical fiber cord 1021 is pulled through the transmission element storing hole 1019b2. The end of the optical fiber cord 1021 is pulled inside the connector housing 1025. A side of the optical fiber cord 1021 opposite to the above end extends from the rear end of the boot 1019 towards the rear side.

The fused reinforcing portion storing hole 1019b1 is formed in the inner side of the tapered tube portion 1192 of the boot 1019. This fused reinforcing portion storing hole 1019b1 connects with the rear end of the of the body sleeve inner hole 1018d, as if the body sleeve inner hole 1018d extends towards the rear side.

This optical connector 1001 includes a fused reinforcing portion storing part 1028 (inner side space) in the inner side of the connector housing 1025. This fused reinforcing portion storing part 1028 includes a body sleeve inner hole 1018d and the fused reinforcing portion storing hole 1019b1 connecting from the rear side of the body sleeve inner hole 1018d. The optical connector 1001 is structured so that the fused reinforcing portion 1020 is stored inside this fused reinforcing portion storing part 1028.

The cross-section of the fused reinforcing portion storing hole 1019b1 is adequately larger than the cross section of the fused reinforcing portion 1020, so that the fused reinforcing portion 1020 can be stored in the fused reinforcing portion storing hole 1019b1.

As shown in FIGS. 23A and 23B, the length of the reinforcing tube 1010 of the fused reinforcing portion 1020 in the direction of the central axis of the reinforcing tube 1010 is much longer compared to the outer diameter of this reinforcing tube 1020. In addition, the reinforcing tube 1010 is shaped as a thin rectangle. The reinforcing tube 1010 is installed inside the fused reinforcing portion storing part 1028 so that the reinforcing tube 1010 extends along the front-rear direction of the connector.

An end (front end) of the reinforcing tube 1010 is externally fixed to the tube fixing portion 1009 of the ferrule housing 1003. The other end (rear end) of the reinforcing tube 1010 is externally fixed to a terminal of the optical fiber cord 1021 (the sheath terminal 1024).

The fused reinforcing portion 1020 is formed from the ferrule housing 1003 towards the rear side. The fused reinforcing portion 1020 extends along the central axis line of the body sleeve 1018 of the connector housing 1025. The fused reinforcing portion 1020 is structured so that a portion of the embedded optical fiber 1012 extending rearwards from the tube fixing portion 1009 of the ferrule housing 1003, a portion of the optical fiber cord 1021 extending from a terminal of the optical fiber cord 1021 of the optical fiber 1022, the fused connection portion 1015 of the optical fibers 1012 and 1022, and the tensile-strength body 1023 extending from a terminal of the optical fiber cord 1021 are embedded inside the reinforcing material 1011. The reinforcing material 1011 is a thermoplastic resin filled inside the reinforcing tube 1010.

Figure 26A:
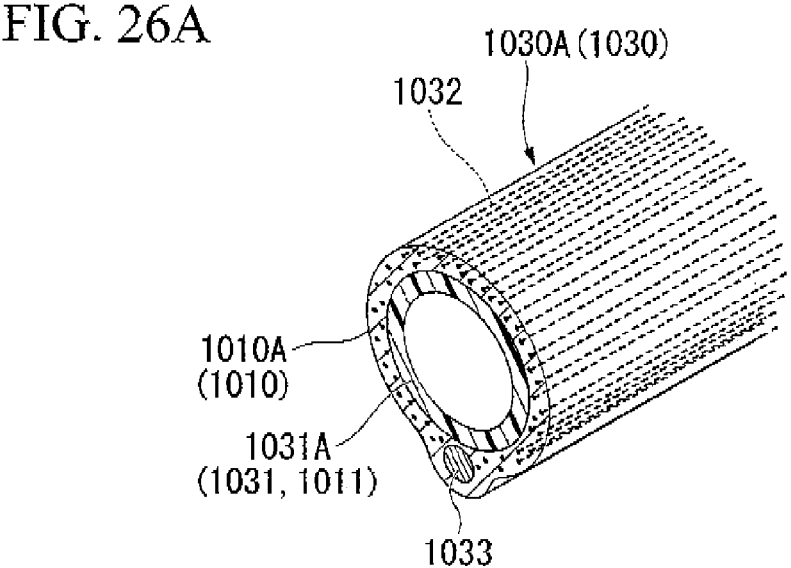
FIG. 26A is a diagram illustrating an example of a sleeve for reinforcing a fused portion, used to install an optical fiber cord provided with a connector shown in FIG. 22.
Figure 26B:
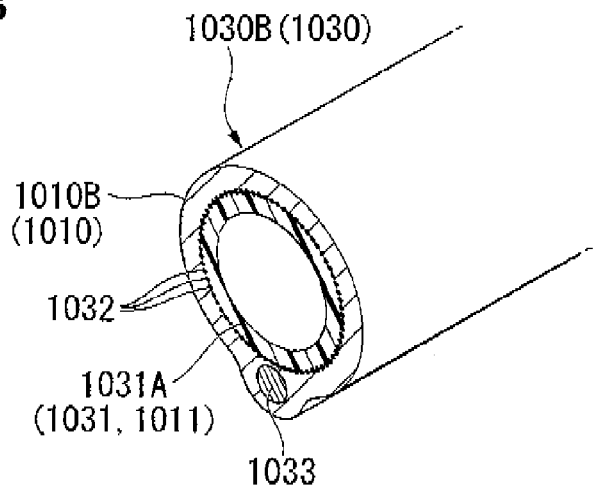
FIG. 26B is a diagram illustrating an example of a sleeve for reinforcing a fused portion, used to install an optical fiber cord provided with a connector shown in FIG. 22.
Figure 26C:
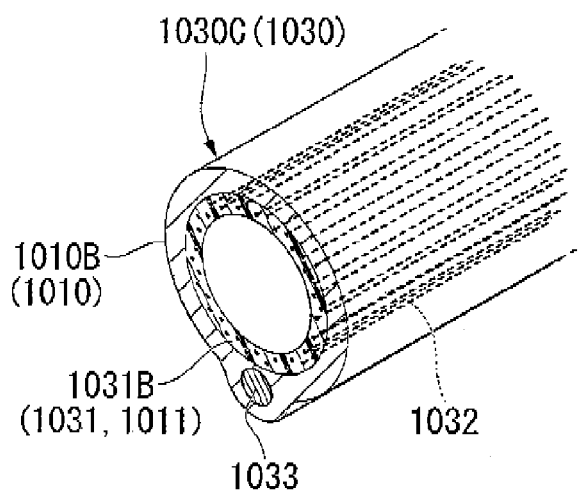
FIG. 26C is a diagram illustrating an example of a sleeve for reinforcing a fused portion, used to install an optical fiber cord provided with a connector shown in FIG. 22.
Figure 28:
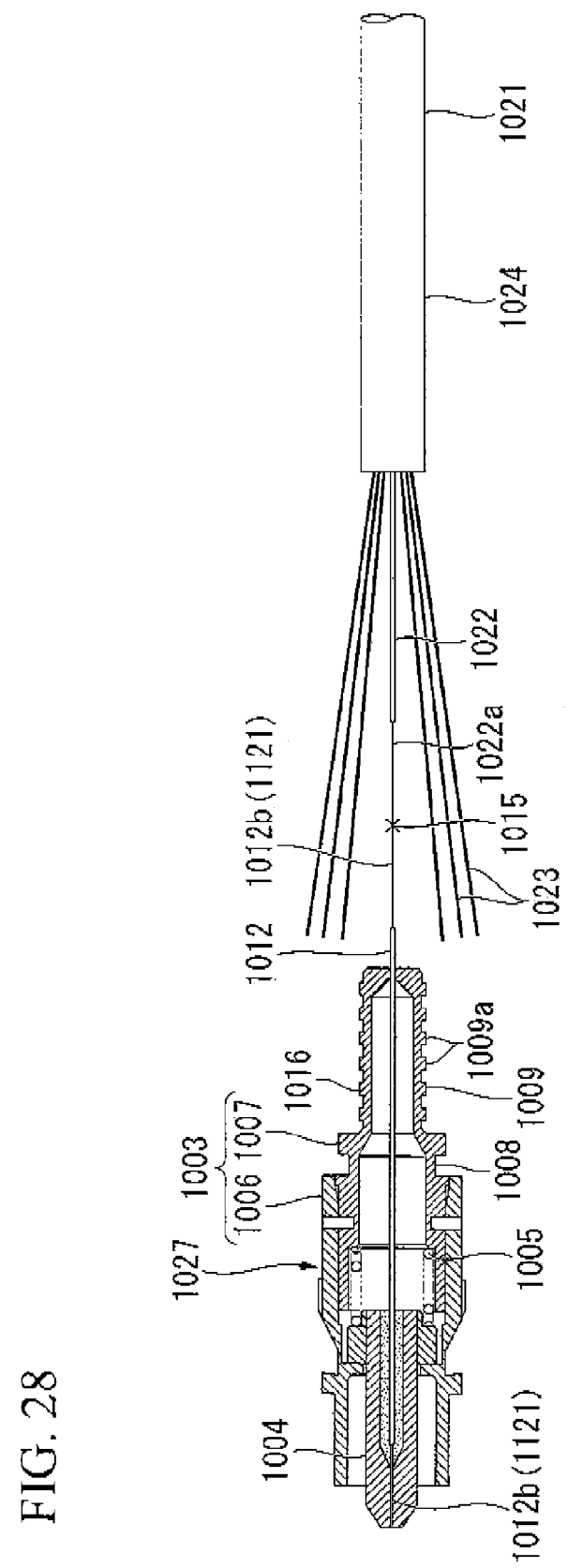
FIG. 28 is a process drawing illustrating a step of installing an optical connector according to an aspect of the present invention to a terminal of an optical fiber code.

The fused reinforcing portion 1020 is formed by embedding the fused connection portion 1015, the tensile-strength body 1023 of the optical fiber cord 1021, and the like, into the reinforcing material 1011 filled inside the reinforcing tube 1010 (see FIG. 29B). During a process in which the optical connector 1001 is assembled to a terminal of the optical fiber cord 1021, a rear end part 1012b of the embedded optical fiber 1012 extending from the rear end of the ferrule housing 1003 of the ferrule storing unit 1027 (i.e., from the rear end of the tube fixing portion 1009), as shown in FIG. 28, is fuse-connected with the tip 1022a of the optical fiber 1022 sticking out from a terminal of the optical fiber cord 1021. Next, a fused portion reinforcing sleeve 1030 (hereinafter, may be simply referred to as a reinforcing sleeve) as shown in FIGS. 26A, 26B, and 26C (i.e., a reinforcing sleeve 1030 structured so that a thermoplastic resin (reinforcing material 1011) is provided inside a heat-shrinkable reinforcing tube 1010) externally covers the fused connection portion 1015 formed by the above fuse-connecting process (see FIG. 29A). Then, the reinforcing sleeve 1030 is heated, and the reinforcing tube 1010 is heat-contracted. At the same time, the reinforcing material 1011, made of thermoplastic resin, is melted. Thereafter, the heating process is halted, and the temperature is dropped to room temperature (fox example, through air cooling). In this way, the melted thermoplastic resin is solidified.

The reinforcing sleeve 1030 according to the second aspect of the present invention is structured so that a thermoplastic resin (the reinforcing material 1011) is provided on approximately the entire inner surface of the heat-shrinkable reinforcing tube 1010, as described above. This reinforcing sleeve 1030 is structured so that a linear tensile-strength component 1032 extends along a central axis (in the longitudinal direction) of the reinforcing tube 1010 over the entire circumference of one or more of the following: the reinforcing tube 1010, the boundary between the reinforcing tube 1010 and the reinforcing material 1011, and the reinforcing material.

The tensile-strength component 1032 is a linear component having excellent resilience and resistance to pulling force. Examples of the material of the tensile-strength component 1032 include aramid fiber and FRP.

This tensile-strength component 1032 is embedded inside the reinforcing tube 1010 or the resin forming the reinforcing material 1011 at the fused reinforcing portion 1020. In this way, the tensile-strength component 1032 is fixed and integrated to the resin. Thus, the tensile-strength component 1032 acts to prevent the fused reinforcing portion 1020 from stretching by absorbing the pulling force applied to the fused reinforcing portion 1020.

An example of the thermoplastic resin (reinforcing material 1011) in the inner side of the reinforcing tube 1010 is an inner tube 1031 which is independent of the reinforcing tube 1010 (see FIGS. 26A, 26B, and 26C). However, the present invention is not limited to this configuration. For example, the reinforcing material 1011 may be a layer of thermoplastic resin (a layer of reinforcing material) adhering to the inner side of the reinforcing tube 1010. This layer may be formed, for example, by applying a heated and melted thermoplastic resin.

Incidentally, the reinforcing tube 1010 and the inner tube 1031 of the double-layered reinforcing sleeve 1030 shown in FIGS. 26A, 26B, and 26C, are cylindrical.

Figure 27:
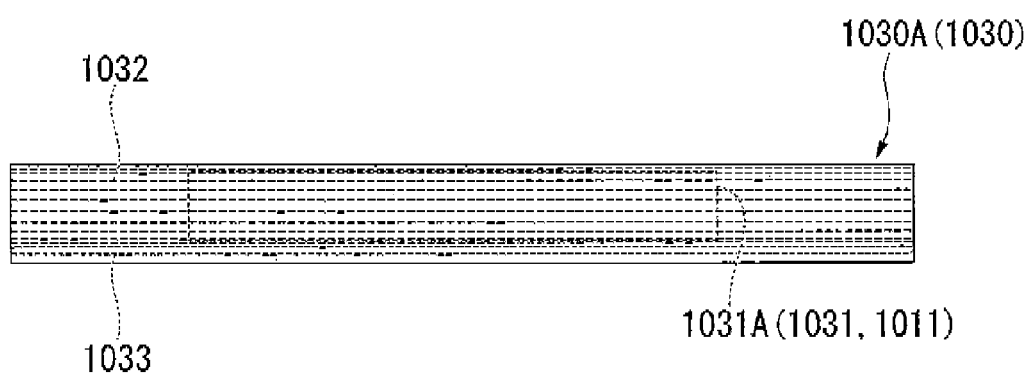
FIG. 27 is an overall view representing a structure of a sleeve for reinforcing a fused portion shown in FIG. 26A.

In addition, as shown in FIGS. 27 and 29A, the thermoplastic resin (reinforcing material 1011) on the inner side of the reinforcing tube 1010 of the reinforcing sleeve 1030 is provided so that the thermoplastic resin covers the entire inner surface between both ends of the reinforcing tube 1010 in the longitudinal direction, but excluding the ends.

According to the reinforcing sleeve 1030, shown in FIGS. 27 and 29A, the range at which the thermoplastic resin can extend in the longitudinal direction (in the direction of the central axis) of the reinforcing tube 1010 (i.e., how much the thermoplastic resin can be extended) is approximately equal to the distance between the rear end of the ferrule housing 1003 and the terminal of the optical fiber cord 1021 (the tip plane of the sheath 1024) when the rear end 1012b of the embedded optical fiber 1012 and the optical fiber 1022 of the optical fiber cord 1021 are fuse-connected.

Considering a double-layered reinforcing sleeve 1030 including the reinforcing tube 1010 and the inner tube 1031 on the inner side of the reinforcing tube 1010, the tensile-strength component 1032 is provided by one or more of the following: embedding and fixing the tensile-strength component 1032 into the resin forming the reinforcing tube 1010; embedding and fixing the tensile-strength component 1032 into the resin forming the inner tube 1031; and placing the tensile-strength component 1032 between the reinforcing tube 1010 and the inner tube 1031.

Meanwhile, considering a reinforcing sleeve 1030, structured so that the inner plane of the reinforcing tube 1010 is covered with a layer of the thermoplastic resin (a layer of reinforcing material), and the reinforcing tube 1010 and the thermoplastic resin are integrated, the tensile-strength component 1032 is provided by one or more of the following: embedding and fixing the tensile-strength component 1032 in the resin forming the reinforcing tube 1010, embedding and fixing the tensile-strength component 1032 in the resin forming the layer of thermoplastic resin, and placing or embedding the tensile-strength component 1032 between the reinforcing tube 1010 and the layer of thermoplastic resin.

Regardless of the way in which the reinforcing sleeve 1030 is configured, the tensile-strength component 1032 is provided so that a plurality of the tensile-strength components 1032 are dispersed over the entire circumference of the reinforcing sleeve 1030.

FIG. 26A shows a concrete example of the reinforcing sleeve 103Q.

The reinforcing sleeve 1030A shown in FIG. 26A is double-layered. An inner tube 1031 made of thermoplastic resin is stored inside the reinforcing tube 1010. The inner tube 1031 is a component separate from the reinforcing tube 1010. A linear tensile-strength component 1032 is embedded inside the resin forming the reinforcing tube 1010 along approximately the entire length of the reinforcing tube 1010 in the longitudinal direction. In this way, a reinforcing tube 1010A is formed. This reinforcing tube 1010A stores an inner tube 1031 (which is referred to using 1031A in the diagram) on the inner side of the reinforcing tube 1010A. A tensile-strength component 1032 is not embedded in the inner tube 1031.

In addition, a double-layered reinforcing sleeve 1030 can be configured so that the reinforcing tube 1010 stores an independent inner tube 1031 inside the reinforcing tube 1010 as shown in FIGS. 26B and 26C (i.e., reinforcing sleeve 1030B and 1030C).

The reinforcing sleeve 1030E shown in FIG. 26B includes an inner tube 1031A and a reinforcing sleeve 1010 (which is referred to using reference numeral 1010E in the diagram) in which a tensile-strength component 1032 is not embedded. This reinforcing sleeve 1030B is structured so that a tensile-strength component 1032 is placed between the reinforcing sleeve 1010E and the inner tube 1031A (at the boundary between the reinforcing sleeve 10103 and the inner tube 1031A) along the central axis of the reinforcing sleeve 1010E and the inner tube 1031A (in the longitudinal direction of the reinforcing sleeve 1030).

The reinforcing sleeve 10300 shown in FIG. 26C is structured so that the reinforcing sleeve 1010B, in which the tensile-strength component 1032 is not embedded, stores an inner tube 1031 (which is referred to using reference numeral 1031B in the diagram) inside the reinforcing sleeve 1010B. The tensile-strength component 1032 is embedded in this inner tube 1032. The tensile-strength component 1032 in the inner tube 10313 is placed so as to extend along the direction of the central axis of the inner tube 1031B (in the longitudinal direction of the reinforcing sleeve 1030).

In addition, as shown in FIG. 27, the tensile-strength component 1032 of the reinforcing sleeve 1030 is placed along approximately the entire length of the reinforcing sleeve 1030 in the longitudinal direction (in other words, along approximately the entire length of the reinforcing tube 1010 in the longitudinal direction). This structure is not limited to a double-layered reinforcing sleeve configured so that an independent inner tube 1031 made of thermoplastic resin is stored inside the reinforcing tube 1010. The above structure is also seen in a reinforcing sleeve configured to include a layer of thermoplastic resin (a layer of reinforcing material) in the inner plane of the reinforcing tube 1010.

FIG. 27 shows an overall structure of the reinforcing sleeve 1030A illustrated in FIG. 26A.

This reinforcing sleeve 1030A is structured so that the tensile-strength component 1032, embedded in the reinforcing tube 1010A, is placed along the entire length of the reinforcing tube 1010A in the longitudinal direction.

Considering the reinforcing sleeves 1030B and 10300, the tensile-strength component 1032 is provided so that the tensile-strength component 1032 sticks out from both ends of the inner tube 1031, and so that the tensile-strength component is provided in a range that approximately matches the entire length of the reinforcing tube 1010.

According to the reinforcing sleeves 1030B and 10300, as illustrated in FIGS. 26B and 26C, which is configured so that a tensile-strength body 1032 is provided in the boundary between the reinforcing tube 1010 and the thermoplastic resin or the thermoplastic resin at the inner side of the reinforcing tube 1010, the portion of the tensile-strength component 1032 sticking out from both sides of the thermoplastic resin provided in a circular form inside the reinforcing tube 1010 may be stored inside the reinforcing tube 1010 instead of being fixed. However, the tensile-strength body may be fixed to the inner side of the reinforcing tube 1010, for example, using an adhesive.

According to the reinforcing tube 1010 of the reinforcing sleeve 1030 shown in FIG. 27, a reinforcing core material 1033 (a metallic rod) shaped as a rod is inserted in the resin forming the reinforcing tube 1010. This reinforcing core material 1033 extends over approximately the entire length of the reinforcing tube 1010 in the direction of the central axis of the reinforcing tube 1010.

As described above, the reinforcing sleeve 1030 is used to form the fused reinforcing portion 1020. The reinforcing sleeve 1030 is heated while the reinforcing sleeve 1030 is externally fixed to the fused connection portion 1015. This fused connection portion 1015 is formed by fuse-connecting the rear end 1012b of the embedded optical fiber 1012 and the tip portion 1022a of the optical fiber 1022 of the optical fiber cord 1021.

The reinforcing sleeve 1021 includes a heat-shrinkable resin. For example, a polyolefin type resin which contracts at a temperature of 100° C. to 160° C. may be used for the reinforcing sleeve 1021.

A hot melt resin (a hot melt adhesive) may be preferably used as a thermoplastic resin for the reinforcing material 1011. Examples of the hot melt resin include ethylene—vinyl acetate copolymer (EVA), polyethylene, polyisobutylene, polyamide, and ethylene—acrylic acid ester copolymer.

In addition, it is preferred that this thermoplastic resin softens at a temperature at which the reinforcing tube 1010 contracts. An example of this softening temperature is 100° C. to 160° C.

Hereinafter, a method to assemble the optical connector 1001 to a terminal of the optical fiber code 1021 (the assembling method of the optical connector) is described. First, as shown in FIG. 28, a rear end portion 1012b is fuse-connected to the tip portion 1022a of the optical fiber 1022 sticking out from a terminal of the optical fiber cord 1021. Thus, the fused connection portion 1015 is formed by this fusion process. The rear end portion 1012b is a tip of the portion of the embedded optical fiber 1012 sticking out from the tube fixing portion 1009 of the ferrule housing 1003. The embedded optical fiber 1012 is internally fixed to the ferrule 1004 of the ferrule storing unit 1027. The ferrule storing unit 1027 is assembled in advance.

The fuse-connection between the rear end portion 1012b of the embedded optical fiber 1012 and the optical fiber 1022 of the optical fiber cord 1021 can be performed using an existing fuse-connecting equipment which utilizes an arc discharge between a pair of discharging electrode rods placed so that each of the rods are distanced from one another. The rear end portion 1012b of the embedded optical fiber 1012 is an end portion of the part of the embedded optical fiber 1012 sticking out from the tube fixing portion 1009 of the ferrule housing 1003. The above fuse-connection process can be performed at a place sufficiently distanced from the ferrule 1004 towards the rear side. As a result, there is a low possibility that the ferrule 1004 will be damaged due to the discharging energy. In addition, it is not necessary to use a special fuse-connection equipment. Neither is it necessary to set special conditions for the procedure. Thus, the connection process can be conducted using a generic fuse-connection equipment. In this way, the fusing procedure can be performed efficiently.

Next, the reinforcing sleeve 1030, which was externally fixed to the optical fiber cord 1021 in advance (see FIG. 24), is shifted towards the side of the ferrule housing 1003. Then, as shown in FIG. 29A, the fused connection portion 1015 and the tensile-strength component 1023 are stored inside the reinforcing sleeve 1030. This tensile-strength body 1023 sticks out from a terminal of the optical fiber cord 1021. An end (the front end) of this reinforcing sleeve 1030 is externally fixed to the tube fixing portion 1009 of the ferrule housing 1003. Meanwhile, the other end (the rear end) of the reinforcing sleeve 1030 is externally fixed to a terminal of the optical fiber cord 1021. After the reinforcing sleeve 1030 is heated under this condition, the temperature is dropped, and a procedure is performed to form the fused reinforcing portion 1020.

As described above, the range at which the thermoplastic resin can extend in the longitudinal direction (in the direction of the central axis) of the reinforcing tube 1010 (i.e., how much the thermoplastic resin can be extended) is approximately equal to the distance between the rear end of the ferrule housing 1003 and the terminal of the optical fiber cord 1021 (the tip plane of the sheath 1024) when the rear end 1012b of the embedded optical fiber 1012 and the optical fiber 1022 of the optical fiber cord 1021 are fuse-connected. As shown in FIG. 29A, the reinforcing sleeve 1030 is placed so as to cover the embedded optical fiber 1012, the optical fiber 1022, the fused connection portion 1015, and the tensile-strength component 1023. Here, the thermoplastic resin provided in the inner side of the reinforcing tube 1010 is placed between the rear end of the ferrule housing 1003 and the terminal of the optical fiber cord 1021.

A part of both ends of the reinforcing sleeve 1030 in the longitudinal direction, at which the thermoplastic resin is not provided, is externally fixed to the tube fixing portion 1009 of the ferrule housing 1003. In other words, one portion (the front end part) of the stretched out portion, i.e., both ends of the reinforcing tube 1010 which stretch out to both sides in the longitudinal direction from the thermoplastic resin, is externally fixed to the tube fixing portion 1009.

FIG. 29A shows a configuration such that the stretched out portion of the reinforcing tube 1010 is externally fixed to the tube fixing portion 1009 of the ferrule housing 1003 and a terminal of the optical fiber cord 1021. In this way, the thermoplastic resin (inner tube 1031) is placed between the tube fixing portion 1009 and the terminal of the optical fiber cord 1021, so that the thermoplastic resin does not overlap with the tube fixing portion 1009 and the terminal of the optical fiber cord 1021. However, a portion of the reinforcing sleeve 1030, at which the thermoplastic resin is provided, may be externally fixed to the tube fixing portion 1009 and/or the terminal of the optical fiber cord 1021.

According to this process, the reinforcing sleeve 1030 is heated. As a result, the reinforcing tube 1010 undergoes a heat-contraction. At the same time, the thermoplastic resin of the reinforcing material 1011 is melted. The heated and molten thermoplastic resin is filled completely inside the reinforcing tube 1010. Thus, the thermoplastic resin fills the entire inner side of the reinforcing tube 1010. As shown in FIG. 29B, when the thermoplastic resin solidifies due to the drop in temperature after the heating process, the following components will be embedded and solidified in the reinforcing material 1011 formed by solidifying the thermoplastic resin: the fused connection portion 1015 in the inner side of the reinforcing tube 1010, the tensile-strength body 1023, the part of the embedded optical fiber 1012 sticking out from the ferrule housing 1003 towards the rear side, and the part of the optical fiber cord 1021 sticking out from the terminal of the optical fiber cord 1021 of the optical fiber 1022 of the optical fiber cord 1021.

In addition, according to this process, the reinforcing sleeve 1030 is heated, and then, the temperature is dropped. As a result, the reinforcing tube 1010 is attached to and fixed to the terminal of the optical fiber cord 1021 and the tube fixing portion 1009, to which both ends of the reinforcing sleeve 1030 is externally fixed.

According to the configuration shown in FIG. 29B, the reinforcing tube 1010 can be attached and fixed to the terminal of the optical fiber cord 1021 by solidifying the thermoplastic resin placed in between the peripheral plane of the sheath 1024 of the optical fiber cord 1021 and the reinforcing tube 1010. The thermoplastic resin can be inserted in between the peripheral plane of the sheath 1024 of the optical fiber cord 1021 and the reinforcing tube 1010 because, as the reinforcing tube 1010 undergoes a heat-contraction, molten thermoplastic resin is pushed out from between the tube fixing portion 1009 and the terminal of the optical fiber cord 1021.

Incidentally, according to the illustrated example, the outer radius of the sheath 1024 of the optical fiber cord 1021 is smaller than the outer radius of the tube fixing portion 1009.

As a result, it becomes easier for the heated and molten thermoplastic resin to enter in between the peripheral plane of the sheath 1024 of the optical fiber cord 1021 and the reinforcing tube 1010. The outer radius of the reinforcing tube 1010 of the reinforcing sleeve 1030 is constant along the entire length in the longitudinal direction.

On the other hand, the reinforcing tube 1010 is fixed to the tube fixing portion 1009 by the application of pressure caused by the heat-contraction of this reinforcing tube 1010. It is also possible that the reinforcing tube 1010 be adhered and fixed to the tube fixing portion using a thermoplastic resin.

The adhesion/solidification due to the thermoplastic resin is made possible by the molten thermoplastic resin entering the concave portion between the circular bump portion 1009a at the outer circumference of the tube fixing portion 1009. Molten thermoplastic resin enters the concave portion between the circular bump portion 1009a because, as the reinforcing tube 1010 undergoes a heat contraction, molten thermoplastic resin is pushed out from between the tube fixing portion 1009 and the terminal of the optical fiber cord 1021. When molten thermoplastic resin does not enter the concave portion in this manner, the reinforcing tube 1010 is fixed to the tube fixing portion 1009 by the application of pressure caused by the heat-contraction of the reinforcing tube 1010.

The reinforcing tube 1010 can be adequately fixed to the tube fixing portion 1009 by the application of pressure caused by the heat-contraction of the reinforcing tube 1010. In addition, the reinforcing tube 1010 can be fixed more tightly to the tube fixing portion 1009 due to the adherence caused by the thermoplastic resin filled in the concave portion between the circular bump portions 1009a.

In addition, according to the second aspect of the present invention, the reinforcing tube 1010 may be fixed to the tube fixing portion 1009 due to the adhesive force of the thermoplastic resin only.

In this way, the reinforcing tube 1010 may be fixed to the tube fixing portion 1009 by the application of pressure caused by the heat-contraction of the reinforcing tube 1010 and/or the adhesive force of the thermoplastic resin.

Furthermore, the reinforcing tube 1010 may be fixed or solidified to the terminal of the optical fiber cord 1021 by the application of pressure caused by the heat-contraction of the reinforcing tube 1010 and/or the adhesive force of the thermoplastic resin.

Although not diagramed, as the reinforcing tube 1010 undergoes a heat-contraction, a portion between the tube fixing portion 1009 and the terminal of the optical fiber cord 1021 may become thinner compared to a portion which is fixed to the tube fixing portion 1009. As a result, when the reinforcing tube 1010 undergoes a heat contraction, a molten thermoplastic resin may be filled easily and completely inside the entire inner side located between the tube fixing portion 1009 of the reinforcing tube 1010 and the terminal of the optical fiber cord 1021. In addition, it is possible to easily obtain a condition in which the thermoplastic resin is filled in the entire inner side of the reinforcing tube 1010 without any gaps, after the heat-contraction of the reinforcing tube 1010.

It also becomes easier to fill the space between the peripheral plane of the sheath 1024 of the optical fiber cord 1021 and the reinforcing tube 1010 with a molten thermoplastic resin.

Furthermore, as shown in FIGS. 29A and 29B, the reinforcing sleeve 1030 is placed so that an end (the front end) of the reinforcing core material 1033 of the reinforcing tube 1010 is placed along the tube fixing portion 1009 during this process. In addition, the other end (the rear end) of the reinforcing core material 1033 is placed along the tip (terminal) of the optical fiber cord 1021. Thus, the reinforcing sleeve 1030 is externally fixed to the tube fixing portion 1009 and the tip of the optical fiber cord 1021. Under this condition, the heating process is performed, and the temperature is dropped as well. When both ends of the reinforcing tube 1010 are fixed to the tube fixing portion 1009 and to the terminal of the optical fiber cord 1021, both ends of the reinforcing core material 1033 are fixed to the tube fixing portion 1009 and the terminal of the optical fiber cord 1021.

Incidentally, when fixing the reinforcing tube 1010 to the optical fiber cord 1021, it is preferred that a widest possible range of the reinforcing tube 1010, which is externally attached to the tip of the optical fiber cord 1021, is fixed. This configuration is preferable in order to fix the reinforcing tube 1010 adequately to the optical fiber cord 1021.

The tensile-strength component 1032 is not diagrammed in FIGS. 29A and 293. Similarly, the tensile-strength component 1032 is not diagrammed in FIGS. 23A, 23B, and FIGS. 30A and 30B described later.

In this procedure, the fused reinforcing portion 1020 is formed by using a reinforcing sleeve 1030 structured so that a tensile-strength component 1032 is dispersed approximately evenly in the reinforcing sleeve 1030 in the peripheral direction. As a result, a fused reinforcing portion 1020 is obtained which is structured so that a tensile-strength component 1032, extending over approximately the entire length of the fused reinforcing portion 1020 in the longitudinal direction, is dispersed approximately evenly in the fused reinforcing portion 1020 in the peripheral direction.

In addition, the fused reinforcing portion 1020 can retain a high resistance to a tensional force because the tensile-strength component 1032 is provided over approximately the entire length of the fused reinforcing portion 1020 in the longitudinal direction.

For example, when a reinforcing sleeve 1030A is used as shown in FIG. 26A, the reinforcing tube 1010 is fixed to the tube fixing portion 1009 and the terminal of the optical fiber cord 1021 due to the heating of the reinforcing sleeve 1030A and the reduction in temperature. Then, the tensile-strength component 1032, which is embedded in the longitudinal direction inside the reinforcing tube 1010A, will also be fixed against the tube fixing portion 1009 and the terminal of the optical fiber cord 1021.

For example, according to the reinforcing sleeve 1030B and 1030C shown in FIGS. 26B and 26C, an inner tube 1031 is stored inside the reinforcing tube 1010. According to this configuration, the tensile-strength component 1032 is provided in the longitudinal direction in one or more of the following: the boundary between the reinforcing tube 1010 and the inner tube 1031, and the inner tube 1031. A portion of the tensile-strength component 1032, which is sticking out from both ends of the inner tube 1031, is inserted between the tube fixing portion 1009 and the reinforcing tube 1010 externally fixed to this tube fixing portion 1009, and in between the tip (terminal) of the optical fiber cord 1021 and the reinforcing tube 1010 externally fixed to the tip of this optical fiber cord 1021. Under these conditions, the reinforcing sleeve 1030 is heated. Then, the temperature is dropped. As a result, the reinforcing tube 1010 is fixed to the tube fixing portion 1009 and the terminal of the optical fiber cord 1021. Then, the tensile-strength component 1032 will also be fixed to the tube fixing portion 1009 and the terminal of the optical fiber cord 1021.

Further, a reinforcing sleeve is considered, which is structured so that a layer of thermoplastic resin covers the inner side of the reinforcing tube 1010, and so that the tensile-strength component 1032 is embedded in either the boundary between the reinforcing tube 1010 and the layer of thermoplastic resin and/or the layer of thermoplastic resin. In this configuration, a portion of the tensile-strength component 1032 which sticks out from both ends of the layer of thermoplastic resin is inserted in between the tube fixing portion 1009 and the reinforcing tube 1010 externally fixed to the tube fixing portion 1009, and in between the tip (terminal) of the optical fiber cord 1021 and the reinforcing tube 1010 which is externally fixed to the top of this optical fiber cord 1021. Under these conditions, the reinforcing sleeve is heated, and the temperature is dropped.

When the fused reinforcing portion 1020 is formed by the above process, the ferrule housing 1003 and the optical fiber cord 1021 will be connected via the fused reinforcing portion 1020.

Once the fused reinforcing portion formation process is completed, the connector housing 1025 is assembled in its entirety. Then, a process is performed to assemble the housing which stores the fused reinforcing portion 1020.

As shown in FIG. 23A, according to the optical connector 1001 shown in the diagram, the body sleeve 1018, which was externally fixed to the optical fiber cord 1021 in advance, is shifted to the side of the ferrule housing 1003. The front end of the body sleeve 1018 is inserted and fixed to the ferrule housing 1003. In this way, the connector housing 1025 is assembled, which includes the ferrule housing 1003, the body sleeve 1018, and a boot 1019 which is externally attached to the rear end of the body sleeve 1018. Consequently, the fused reinforcing portion 1020 can be stored inside the connector housing 1025 (inside the fused reinforcing portion storing part 1028).

In addition, as shown in FIGS. 22 and 23A, the optical connector 1001 includes a coupling 1002. Thus, the assembling method of the housing includes a step in which the coupling 1002 is externally fixed to the plug frame 1006 of the ferrule housing 1003.

Once the connector housing 1025 is assembled in its entirety, and the coupling 1002 is assembled with respect to the plug frame 1006, the assembling process of the optical connector 1001 is completed.

The body sleeve 1018 is attached to the ferrule housing 1003 by pressing the body sleeve 1018 against the ferrule housing 1003 from the rear side, and inserting the latching bump portion 1008b into the latching hole 1018a formed at the front end of the body sleeve 1018. The latching bump portion 1008b is provided on both sides of the stop-ring 1007 protruding from the peripheral surface of the main body part 1008 of the stop-ring 1007. In other words, the body sleeve 1018 is externally fixed to the ferrule housing 1003.

The boot 1019 is externally fixed to the optical fiber cord 1021 along with the body sleeve 1018 while, for example, the boot 1019 is attached to the rear end of the body sleeve 1018, until the fused reinforcing portion formation process is completed. As a result, once the fused reinforcing portion formation process is completed, the connector housing 1025 can be assembled by simply attaching the body sleeve 1018 to the ferrule housing 1003. It is also possible to externally fix the boot 1019 to the optical fiber cord 1021, in a condition in which the boot 1019 is not attached to the body sleeve 1018, until the fused reinforcing portion formation process is completed. In this example, the boot 1019 may be attached to the body sleeve 1018 after the body sleeve 1018 is fixed to the ferrule housing 1003.

In the above fused reinforcing portion formation process, a reinforcing sleeve 1030' shown in FIG. 30A is used as the reinforcing sleeve. This reinforcing sleeve 1030' is structured so that the thermoplastic resin 1034 covers the entire inner plane of the reinforcing tube 1010' excluding one end of the reinforcing tube 1010' in the longitudinal direction. An end of this reinforcing sleeve 1030' in the longitudinal direction (the resin insertion end 1035) may be externally fixed to the tube fixing portion 1009 of the ferrule housing 1003. A thermoplastic resin (referred to as 1034 in the diagram) is provided in the inner surface of the above resin insertion end 1035. The other end of the reinforcing sleeve 1030' may be externally fixed to the optical fiber cord 1021. Under these conditions, the reinforcing sleeve 1030' may be heated to a contracting temperature of the reinforcing tube 1010. Furthermore, by subsequently lowering the temperature, the fused reinforcing portion 1020' (see FIG. 30B) may be formed.

The reinforcing sleeve 1030' is heated while the embedded optical fiber 1012, the optical fiber 1022, the fused connection portion 1015, and the tensile-strength body 1023 are stored inside the reinforcing sleeve 1030'. The embedded optical fiber 1012 is positioned in between the rear end of the ferrule housing 1003 (the rear end of the tube fixing portion 1009) and the terminal of the optical fiber cord 1021.

In further detail, a reinforcing tube 1010, having an inner diameter such that the reinforcing tube 1010 is externally fixed to the tube fixing portion 1009, is used as the reinforcing sleeve 1030 illustrated in FIG. 29A. The reinforcing tube 1010' of the reinforcing sleeve 1030' shown in FIG. 30A is configured so that the inner diameter of the reinforcing tube 1010 of the reinforcing sleeve 1030, illustrated in FIGS. 27 and 29A, is slightly increased. Thus, the thermoplastic resin 1034 may be placed in between this reinforcing tube 1010' and the tube fixing portion 1009. A material used for the reinforcing tube 1010 of the reinforcing sleeve 1030 may be used as the material of this reinforcing tube 1010'.

FIG. 30A shows a reinforcing sleeve 1030A' structured so that, described in detail, the inner diameter of the reinforcing tube 1010A' is enlarged compared to the reinforcing tube 1010A of the reinforcing sleeve 1030A illustrated in FIGS. 27 and 29A, and an inner tube 1031A' (thermoplastic resin 1034) is provided so as to cover the entire inner side of the reinforcing tube 1010A' excluding one end of the reinforcing tube 1010A' in the longitudinal direction. The reinforcing sleeve 1030A' is configured so that the tensile-strength component 1032 is provided only on the reinforcing tube 1010A'. However, the reinforcing sleeve 1030' is not limited to this configuration. The reinforcing sleeve 1030' may be structured so that a linear tensile-strength component extends along a central axis of the reinforcing tube over the entire circumference of one or more of the following: the reinforcing tube, the boundary between the reinforcing tube and the thermoplastic resin, and the thermoplastic resin.

However, the reinforcing tube 1010 of the reinforcing sleeve 1030 shown in FIGS. 27 and 29A is not necessarily limited to those having an inner diameter such that the reinforcing tube 1010 can be externally fixed to the tube fixing portion 1009. Instead, the reinforcing tube 1010 may have an inner diameter such that the reinforcing tube 1010 is externally fixed to the tube fixing portion 1009 in a loosely-inserted manner. Alternatively, the reinforcing tube 1010 may be configured so that the reinforcing tube 1010 itself may be used as the reinforcing tube 1010' of the reinforcing sleeve 1030'.

When the fused reinforcing portion 1020' is formed using the reinforcing sleeve 1030', the thermoplastic resin 1034 enters the concave portion of the peripheral of the tube fixing portion 1009 (for example, the concave portion between the circular bump portions 1009a) after the reinforcing sleeve 1030' is heated, and after the temperature is dropped. In this way, the end of the reinforcing tube 1010' may be tightly fixed to the tube fixing portion 1009 by the pressure created by the heat-contraction of the reinforcing tube 1010 and by the adhesion force of the thermoplastic resin.

Furthermore, in the above fused reinforcing portion formation process, it is possible to use a reinforcing sleeve configured so that the thermoplastic resin covers the entire inner surface of the reinforcing tube 1010.

According to the optical connector 1001 shown in FIGS. 23A and 23B, the reinforcing tube 1010 of the fused reinforcing portion 1020 and the reinforcing material 1011 provided in the inner side of the reinforcing tube 1010 may cover and protect the following: the fused connection portion 1015 produced by fuse-connecting the embedded optical fiber 1012 in the side of the ferrule 1004 and the optical fiber 1022 sticking out from a terminal of the optical fiber cord 1021; the part of the embedded optical fiber 1012 extending from the tube fixing portion 1009 of the ferrule housing 1003 towards the rear side; and a portion of the optical fiber cord 1021 extending from a terminal of the optical fiber cord 1021 of the optical fiber 1022 (hereinafter, may be referred to as an extending portion).

Moreover, the fused reinforcing portion 1020 is formed by externally fixing the front end of the reinforcing tube 1010 of the reinforcing portion 1020 to the tube fixing portion 1009. As a result, the fused reinforcing portion 1020 does not oscillate inside the connector housing 1025. Therefore, this configuration solves the problem described in Patent Document 1, in which the embedded optical fiber is damaged due to the repeated oscillation of the fused reinforcing portion.

According to the optical connector described in Patent Document 1, the portion of the optical fiber sticking out from an end of the optical fiber cord, which is located in between the terminal of the optical fiber cord and the fused reinforcing portion, may also be adversely affected by the repeated oscillation of the fused reinforcing portion inside the housing. For example, the characteristic of the optical fiber may deteriorate. However, according to the configuration of the optical connector 1001, the rear end of the reinforcing tube 1010 is externally fixed to the terminal of the optical fiber cord 1021. In addition, the entire length of the extending portion of the optical fiber 1022 of the optical fiber cord 1021 is embedded inside the reinforcing material 1011 in the inner side of the fused reinforcing portion 1020. Due to this configuration, the adverse effects of the repeated oscillation of the fused reinforcing portion described in Patent Document 1 may be prevented with respect to the extending portion of the optical fiber 1022 of the optical fiber cord 1021.

In addition, according to the optical connector 1001 based on the second aspect of the present invention, the rear end of the reinforcing tube 1010 is externally fixed to the terminal of the optical fiber cord 1021. Moreover, the reinforcing tube 1010 is configured so that the tensile-strength body 1023 sticking out from the terminal of the optical fiber cord 1021 is embedded and fixed inside the reinforcing material 1011 in the inner side of the fused reinforcing portion 1020. As a result, the optical fiber cord 1021 has a high resistance against a pulling force applied to the fused reinforcing portion 1020.

Therefore, according to the optical connector 1001 based on the second aspect of the present invention, the optical fiber cord 1021 may be sufficiently fixed to the connector housing 1025 by forming a fused reinforcing portion 1020 and connecting the ferrule housing 1003 and the optical fiber cord 1021 through the fused reinforcing portion 1020. Therefore, compared to the structure described in Patent Document 1 in which a tensile-strength body exposed at a terminal of the optical fiber cord is crimped and fixed to the rear end of the housing a calking ring, the optical fiber cord 1021 according to the optical connector 1001 based on the second aspect of the present invention may be fixed easily. As a result, the optical connector 1001 can be assembled in its entirety within a short period of time in an efficient manner. As an additional effect, the cost can be reduced because there is a fewer number of components.

Furthermore, according to the optical connector 1001, the fused reinforcing portion 1020 is fixed to the ferrule housing 1003. As a result, the tensional force applied to the optical fiber cord 1021 does not act on the portion of the embedded optical fiber 1012 located on the front side with respect to the fused reinforcing portion 1020.

Moreover, when the boot 1019 is bent or the connector housing 1025 is deformed due to a side-pull applied to the optical fiber cord 1021 or due to a pressing force applied to the connector housing 1025 from a side of the connector housing 1025, a bending force is applied to the fused reinforcing portion 1020, and, as a result, the fused reinforcing portion 1020 is deformed. The optical connector 1001 is structured so that, when the fused reinforcing portion 1020 is deformed as described above, the radius of the curvature due to the deformation is maintained to be large along the entirety of the fused reinforcing portion 1020 in the longitudinal direction. As a result, it is possible to prevent the optical fiber inside the fused reinforcing portion 1020 (i.e., the embedded optical fiber 1012, the extending portion of the optical fiber 1022 of the optical fiber cord 1021) from being severed.

Figure 32A:
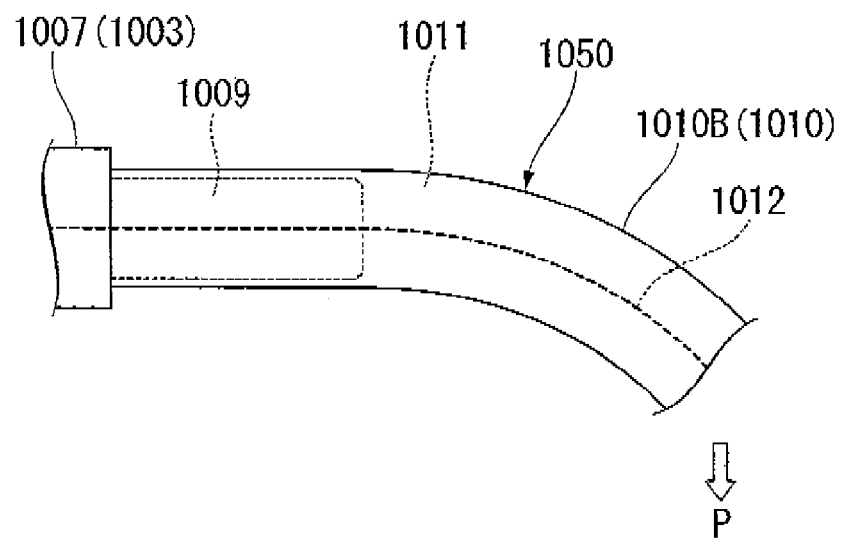
FIG. 32A is a diagram illustrating a deformation of a fused reinforcing portion due to a bending force applied to a boot.
Figure 32B:
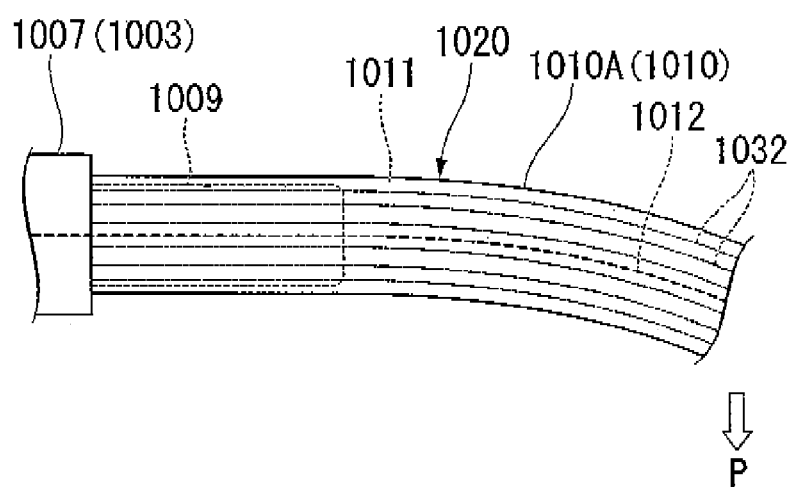
FIG. 32B is a diagram illustrating a deformation of a fused reinforcing portion due to a bending force applied to a boot.

FIG. 32B is a diagram showing an area near the front end portion of the fused reinforcing portion 1020 of the optical connector 1001 according to an aspect of the present invention. FIG. 32B shows the fused reinforcing portion 1020 being deformed as a result of a deflection of the connector housing 1025 or a bending of the boot 1019 due to a side-pull of the optical fiber cord 1021. In FIG. 32B, the optical fiber cord, the boot, and the connector housing are not diagramed.

As shown in FIG. 32B, the bending of the fused reinforcing portion 1020 of the optical connector 1001 according to an aspect of the present invention may be considered as a deformation (due to bending or deflection) of the fused reinforcing portion 1020 supported on one end by the ferrule housing 1003. Here, the front end portion of the fused reinforcing portion 1020 is fixed by the ferrule housing 1003. The deformation of the fused reinforcing portion 1020 may be regarded as being caused by a bending load P applied to the opposite, rear end portion.

When the fused reinforcing portion 1020 deforms, the optical fiber inside the reinforcing material 1011 of the fused reinforcing portion 1020 (i.e., the embedded optical fiber 1012, the optical fiber 1022 of the optical fiber cord 1021) is bent and deformed while being fixed to the reinforcing material of the fused reinforcing portion. As a result, a tensional force applies to the optical fiber. The magnitude of the tensional force applying to the optical fiber inside the fused reinforcing due to the deformation of the fused reinforcing portion depends on the radius of the curvature due to the deformation of the fused reinforcing portion. For example, when the fused reinforcing portion is deformed to a large extent (the radius of the curvature being small), the magnitude of the tensional force applied to the optical fiber becomes large as well. As a result, there is an increasing possibility that the optical fiber is severed due to stress being applied to a concentrated area. On the other hand, when the fused reinforcing portion is deformed only to a small extent, the magnitude of the tensional force applied to the optical fiber is also small. Therefore, it is unlikely that the optical fiber will be severed.

Therefore, it is possible to prevent the optical fiber inside the fused reinforcing portion 1020 from being severed if the radius of the curvature can be maintained to be large along the entire length of the fused reinforcing portion 1020 when the fused reinforcing portion deflects and bends due to a bending force caused by, for example, a side-pull applied to the optical fiber cord 1021. In this way, no segment of the fused reinforcing portion 1020 is bent and deformed with a radius of the curvature so small as to cause the optical fiber inside the fused reinforcing portion 1020 to be severed.

When a side-pull and the like causes a bending force to be applied to the fused reinforcing portion 1020, the optical fiber 1001 is resistant to the bending force because of the reinforcing tube 1010, the reinforcing material 1011 inside the reinforcing tube 1010, the tensile-strength body 1023, the reinforcing core material 1033, and the tensile-strength component 1032. The tensile-strength body 1023 sticks out from the terminal of the optical fiber cord 1021 and is embedded and fixed inside the reinforcing material 1011. The tensile-strength component 1032 is provided along the fused reinforcing portion 1020 in the longitudinal direction.

The tensile-strength component 1032 absorbs the tensional force applied to the outer peripheral portion of the fused reinforcing portion 1020 which is deflected and deformed by the bending force. In this way, the tensile-strength component restrains the stretching of the outer peripheral portion. Thus, the tensile-strength component 1032 contributes to the optical fiber 1001 being resistant to the bending force described above. In addition, the tensile-strength component prevents the fused reinforcing portion 1020 from being subject to a bending (or a deflection) that would cause the optical fiber inside the fused reinforcing portion 1020 to be severed. Furthermore, because the tensile-strength component 1032 absorbs the tensional force applied to the outer peripheral part of the fused reinforcing portion 1020 deformed by the bending force and restrains the stretching of the outer peripheral part, the tensile-strength component 1032 also restrains the deflecting and deforming of the fused reinforcing portion 1020. In other words, because of the tensile-strength component 1032, the fused reinforcing portion 1020 is less likely to be bent.

As a result, the radius of the curvature of the deformed fused reinforcing portion 1020 along the entire length of the fused reinforcing portion 1020 in the longitudinal direction can be maintained to be large. Thus, the optical fiber inside the fused reinforcing portion 1020 (i.e., the embedded optical fiber 1012, the extending portion of the optical fiber 1022 of the optical fiber cord 1021) can be prevented from being severed.

The fused reinforcing portion 1020 of the optical connector 1001 according to the present invention is structured so that the tensile-strength component 1032 is dispersed in the peripheral direction of the reinforcing tube 1010 in an approximately even manner. This structure is formed during the manufacturing process of the fused reinforcing portion 1020 by using a reinforcing sleeve 1030 structured so that the tensile-strength component 1032 is dispersed in the peripheral direction of the reinforcing tube 1010 in an approximately even manner.

According to the fused reinforcing portion 1020 formed by using the reinforcing sleeve 1030 according to an aspect of the present invention, the tensile-strength component 1032 is either provided inside the resin forming the reinforcing tube 1010, and/or provided along the reinforcing tube 1010 in the longitudinal direction by being embedded near the inner circumferential surface of the reinforcing tube of the reinforcing material 1011. As a result, the tensile-strength component 1032 is effective in restraining the stretching of the outer peripheral part of the deformed fused reinforcing portion 1020.

In this way, the fused reinforcing portion 1020 is structured so that the tensile-strength component 1032 is dispersed in the peripheral direction of the fused reinforcing portion 1020 in an approximately even manner. Consequently, the fused reinforcing portion 1020 can be easily restrained from being bent or deformed (i.e., thus contributing to the effect of preventing a reduction in the radius of the curvature due to the bending and the deformation of all or part of the fused reinforcing portion 1020), regardless of the direction in which the fused reinforcing portion 1020 is bent due to, for example, a side-pull applied to the optical fiber cord 1021.

Figure 31A:
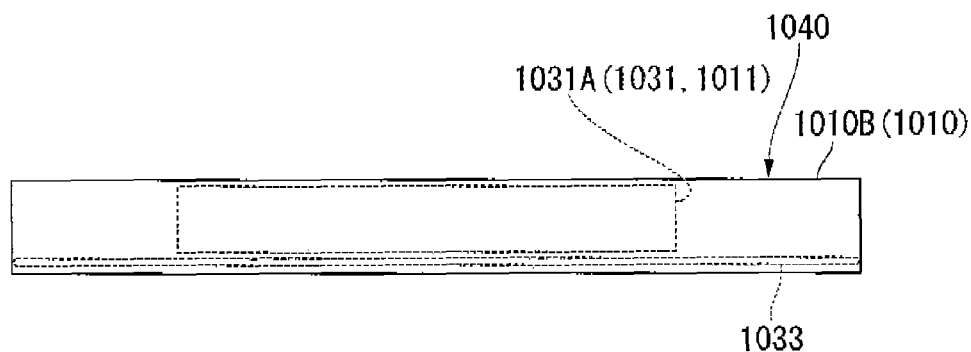
FIG. 31A is an overall view showing a structure of a fused portion reinforcing sleeve of a contrasting example.
Figure 31B:
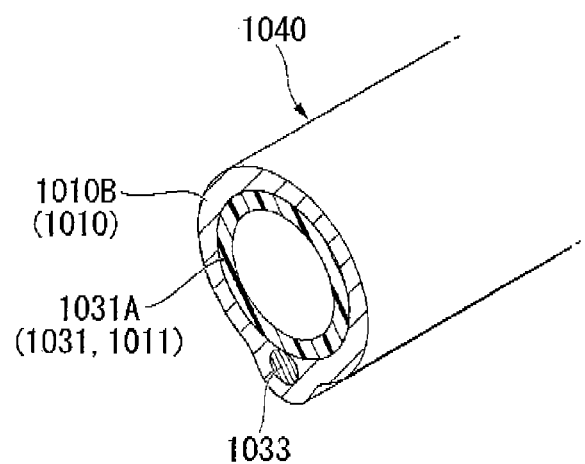
FIG. 31B is an overall view showing a structure of a fused portion reinforcing sleeve of a contrasting example.

This characteristic is described below in more detail in comparison to a configuration in which an optical connector is assembled by using a reinforcing sleeve structured so that the tensile-strength component 1032 is removed from the reinforcing sleeve 1030 as shown in FIGS. 31A and 31B. According to this configuration, during the process of assembling a terminal of the optical fiber cord 1021 of the optical connector 1001, the reinforcing sleeve 1040 is used instead of the reinforcing sleeve 1030. The reinforcing sleeve 1040 is structured so that the tensile-strength component 1032 is removed from the double-layered reinforcing sleeve 1030 illustrated in FIGS. 26A-26C.

FIG. 32A shows the fused reinforcing portion 1050 being deflected and deformed by, for example, a side-pull applied to the optical fiber cord 1021. This fused reinforcing portion 1050 in the comparative configuration is formed by using the reinforcing sleeve 1040 illustrated in FIG. 31A.

When a bending force (a bending load P) is applied to the fused reinforcing portion 1050 shown in FIG. 32A due to, for example, a side-pull of the optical fiber cord 1021, the fused reinforcing portion 1050 is resistant to the bending force because of the reinforcing tube 1010, the reinforcing material inside the reinforcing tube 1010, the reinforcing core material, and the tensile-strength body. This tensile-strength body sticks out from the terminal of the optical fiber cord and is embedded and fixed inside the reinforcing material of the fused reinforcing portion 1050.

The reinforcing core material 1033 and the tensile-strength body inside the reinforcing material, with their tensile-strength, absorb the tensional force applied particularly to the outer peripheral part of the deformed fused reinforcing portion 1050. As a result, the reinforcing core material 1033 is effective in restraining the bending and deformation of the fused reinforcing portion 1050.

However, the reinforcing core material 1033 is provided only on one segment of the reinforcing tube 1010 in the peripheral direction, as shown in FIG. 31B. Therefore, the effect of restraining the bending and deformation of the fused reinforcing portion 1050, caused by a bending force applied to the fused reinforcing portion 1050, depends on the direction in which the bending force is applied. This restraining effect is brought about by the rigidity of the reinforcing core material 1033.

The reinforcing core material 1033 is a rod-shaped tensile-strength body including, for example, a stainless steel such as SUS304.

According to the fused reinforcing portion 1050 shown in FIG. 32A, when the reinforcing core material 1033 is positioned in the outer peripheral side of the fused reinforcing portion 1050 deformed by the bending force, the reinforcing core material 1033 absorbs the tensional force applied to the fused reinforcing portion 1050 due to the deformation. Thus, the reinforcing core material 1033 effectively restrains the stretching of the outer peripheral part of the deformed fused reinforcing portion 1050. In this way, the reinforcing core material 1033 effectively restrains the deflection and the deformation of the fused reinforcing portion 1050.

However, when the position of the reinforcing core material is different from the outer peripheral part of the deformed fused reinforcing portion 1050, the reinforcing core material is not effective in restraining the stretching of the outer peripheral part of the deformed fused reinforcing portion 1050. Thus, the effect of the reinforcing core material 1033 restraining the bending and deformation of the fused reinforcing portion 1050 becomes small.

In addition, when the fused reinforcing portion 1050 is formed by heating the reinforcing sleeve 1040, it is not easy to embed the tensile-strength body of the optical fiber cord so that the tensile-strength body is dispersed in the peripheral direction of the reinforcing tube 1010 in an approximately even manner. Thus, the distribution of the tensile-strength body often becomes lopsided. As a result, the effectiveness of the tensile-strength body, embedded in the reinforcing material of the fused reinforcing portion 1050, in restraining the bending and deformation of the fused reinforcing portion 1050 depends on the direction in which the bending force is applied to the fused reinforcing portion 1050.

According to the fused reinforcing portion 1050 shown in FIG. 32A, the reinforcing tube 1010, the reinforcing material inside the reinforcing tube 1010, the reinforcing core material, and the tensile-strength body of the optical fiber cord embedded and fixed inside the reinforcing material are resistant to the bending force and restrains the deflection and the deformation of the fused reinforcing portion. As a result, the severing of the optical fiber inside the fused reinforcing portion 1050 shown in FIG. 32A can be prevented by a certain degree.

However, as mentioned above, when the fused reinforcing portion 1050 is structured so that the reinforcing core material and the tensile-strength body of the optical fiber cord are embedded in the reinforcing material in order to enhance the resistance against the bending force, the effectiveness of restraining the bending and the deformation of the fused reinforcing portion 1050 depends on the direction in which the bending force is applied. Therefore, it is difficult to enhance the effectiveness of restraining the bending and deformation of the fused reinforcing portion without relying on the direction in which the side-pull is applied to the optical fiber cord. It is also difficult to prevent the optical fiber of the fused reinforcing portion 1050 from being severed.

In contrast, according to the optical connector 1001 according to the present invention, a reinforcing sleeve 1030 is used to form the fused reinforcing material 1020. This reinforcing sleeve 1030 is already manufactured so that the tensile-strength component 1032 is placed in the longitudinal direction. As a result, the fused reinforcing material 1020, structured so that the tensile-strength component 1032 is dispersed in the peripheral direction of the reinforcing tube 1010 in an approximately even manner, can be easily obtained. Moreover, this optical connector 1001 is structured so that the tensile-strength component 1032 is dispersed in the peripheral direction of the fused reinforcing portion 1020 in an approximately even manner. Consequently, it is possible to enhance the resistance against the bending force applied to the fused reinforcing portion, and also enhance the effect of restraining the bending and the deformation of the fused reinforcing portion 1020, without relying on the direction in which the fused reinforcing portion 1020 is bent.

Therefore, according to the optical connector 1001, when the fused reinforcing portion 1020 is deflected and deformed due to, for example, a side-pull applied to the optical fiber cord 1021, a radius of the curvature (or a radius of the bending) can be maintained to be large enough along the entire length of the fused reinforcing portion 1020 so that the optical fiber inside the fused reinforcing portion 1020 will not be severed, regardless of the direction in which the fused reinforcing portion 1020 is bent. In this way, the severing of the optical fiber inside the fused reinforcing portion 1020 can be easily prevented. In addition, the tensile-strength component 1032 absorbs the tensional force applying to an outer peripheral part of the fused reinforcing portion 1020 when this fused reinforcing portion 1020 is deflected and deformed due to the bending force. Thus, the tensile-strength component 1032 restrains the stretching of the outer peripheral part. As a result, the deflection and deformation of the fused reinforcing portion 1020 can be better restrained, compared to the fused reinforcing portion 1050 shown in FIG. 32A. This restraining effect contributes to the prevention of the severing of the optical fiber inside the fused reinforcing portion 1020.

Furthermore, as illustrated in FIG. 23A and the like, this optical connector 1001 includes a fused reinforcing portion storing part 1028 which stores the fused reinforcing portion 1020. This fused reinforcing portion storing part 1028 is formed by connecting the fused reinforcing portion storing hale 1019b1 and the body sleeve inner hole 1018d. The fused reinforcing portion storing hole 1019b1 is formed inside the tapered tube portion 1192 of the boot 1019 at the rear end portion of the connector housing 1025. The body sleeve inner hole 1018d is formed inside the body sleeve 1018. The fused reinforcing portion 1020 described above is structured so that the optical fiber inside the fused reinforcing portion 1020 can be prevented from being severed. When the fused reinforcing portion 1020 is stored in the fused reinforcing portion storing part 1028 so that the rear end of the fused reinforcing portion 1020 is placed inside the fused reinforcing portion storing hole 1019b1, and the fused reinforcing portion 1020 is deformed due to a side-pull applied to the optical fiber cord 1021, the optical fiber inside the fused reinforcing portion 1020 can be prevented from being severed, as long as the fused reinforcing portion 1020 is structured as described above to prevent the severing of the optical fiber.

As a result, the optical connector 1001 can be easily made shorter by using a boot 1019 structured so that the fused reinforcing portion storing hole 1019b1 is provided in the inner side of the tapered tube portion 1192.

It should be noted that the present invention is not limited to the configuration described above, and can be modified without departing from the scope of the present invention.

Figure 33:
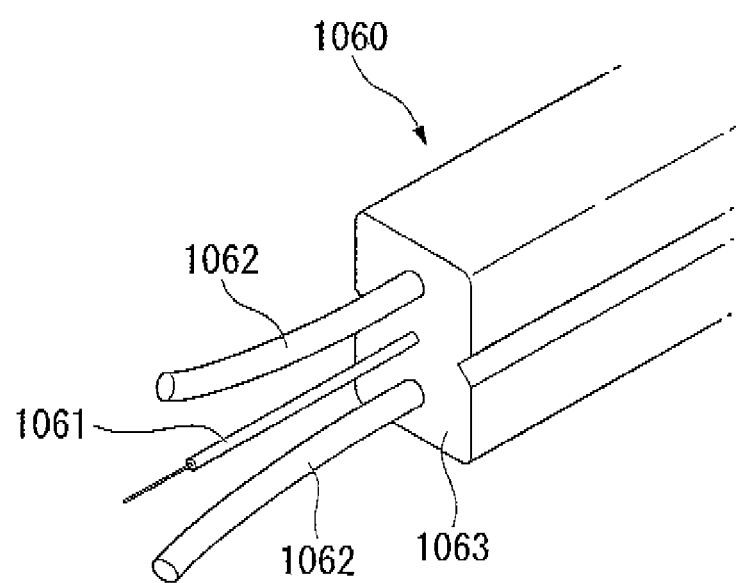
FIG. 33 is a perspective view showing an example of an optical fiber cable used as an optical transmission element.

The optical transmission element is not limited to the optical fiber cord 1021, as long as an optical fiber and a tensile-strength body extending along the optical fiber in the longitudinal direction are covered by an external covering. For example, an optical fiber cable 1060 shown in FIG. 33 can be used as the optical transmission element. Here, an optical fiber 1061 and a tensile-strength body 1062 arc embedded inside a covering material 1063 (external covering). The optical fiber 1061 is a single-core, covered optical fiber such as a single-core optical fiber core wire and an optical fiber filament. The tensile-strength body 1062 is placed on both sides of this optical fiber 1061 along the longitudinal direction. This optical fiber cable 1060 can be used as an optical drop cable, an optical indoor cable, and the like. A tensile-strength component (tensile-strength fiber) having excellent tensile-strength and resiliency are used as the tensile-strength body. Examples include aramid fiber and FRP.

The optical fiber cable provided with a connector can be obtained by assembling the optical connector 1001 to the terminal of the optical fiber cable 1060.

The optical connector 1001 can be assembled to the terminal of the optical fiber cable 1060 (the assembling method of the optical connector) in the same way as described above except for the following distinctions: First, the optical fiber cable 1060 is used instead of the optical fiber cord 1021. Second, in the previous description, the tensile-strength body 1023, exposed in the terminal of the optical fiber cord 1021 in the inner side of the reinforcing sleeve 1030 placed where the fused connection portion 1015 is stored, was stored as shown in FIG. 29A during the manufacturing process of the fused portion. However, when the optical connector 1001 is assembled to the terminal of the optical fiber cable 1060, a pair of tensile-strength bodies 1062, exposed in the terminal of the optical fiber cable 1060 in the inner side of the reinforcing sleeve 1030, is stored instead of the tensile-strength body 1023.

In addition, the connector housing of the optical connector according to the present invention is not limited to the embodiment described above, as long as the connector housing includes a body sleeve, a ferrule housing which is provided at the front end of the body sleeve and stores the ferrule, and a boot attached to the rear end part of the body sleeve and includes the optical transmission body. Furthermore, the connector housing must be capable of storing the fused reinforcing portion inside the connector housing.

For example, the body sleeve may be structured so that the body sleeve can move by sliding in the front-rear direction of the connector by retaining a space in the ferrule housing in which the body sleeve can move. In other words, the body sleeve may be structured so that the body sleeve also acts as a coupling element.

Moreover, the optical connector according to the present invention may be structured without a coupling element. In this case, a plug frame of an SC-type optical connector, a housing of an LC-type optical connector (LC: registered trademark of Lucent Technologies Inc.), and the like, may be used as the plug frame of the ferrule housing.

Hereinafter, a third embodiment of the present invention is described with reference to the attached figures. It should be noted that a "tensile-strength body" in the third embodiment is configured differently from the "tensile-strength body" described above in the first embodiment.

Figure 34:
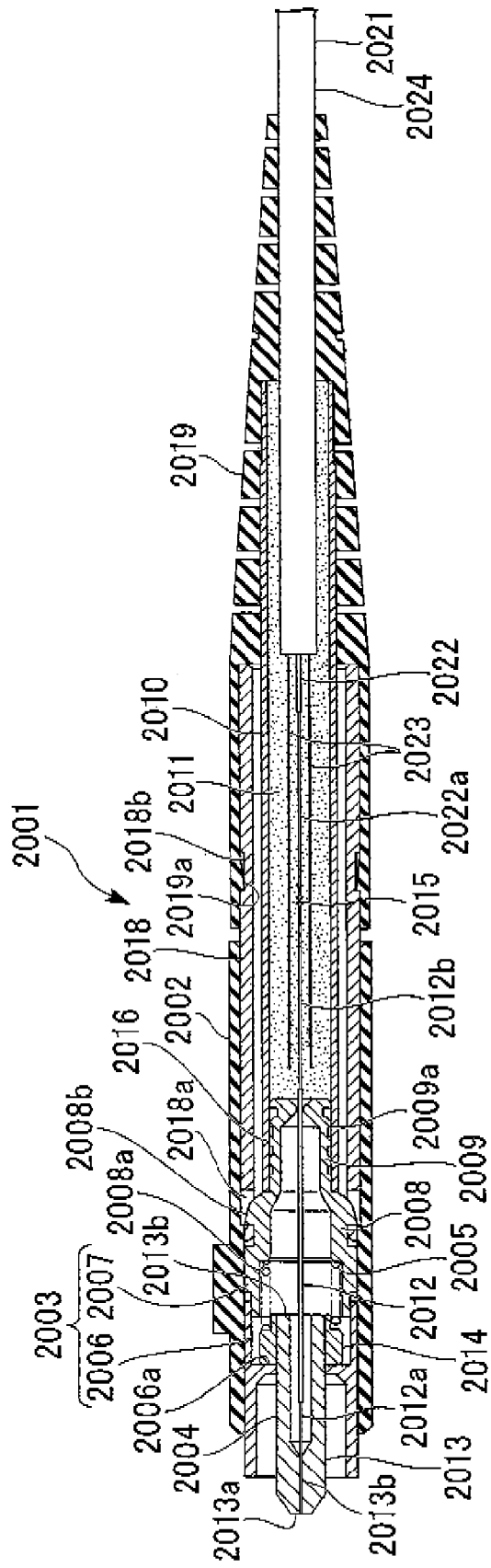
FIG. 34 is a cross-sectional diagram showing an optical fiber cable provided with a connector according to an aspect of the present invention.
Figure 35:
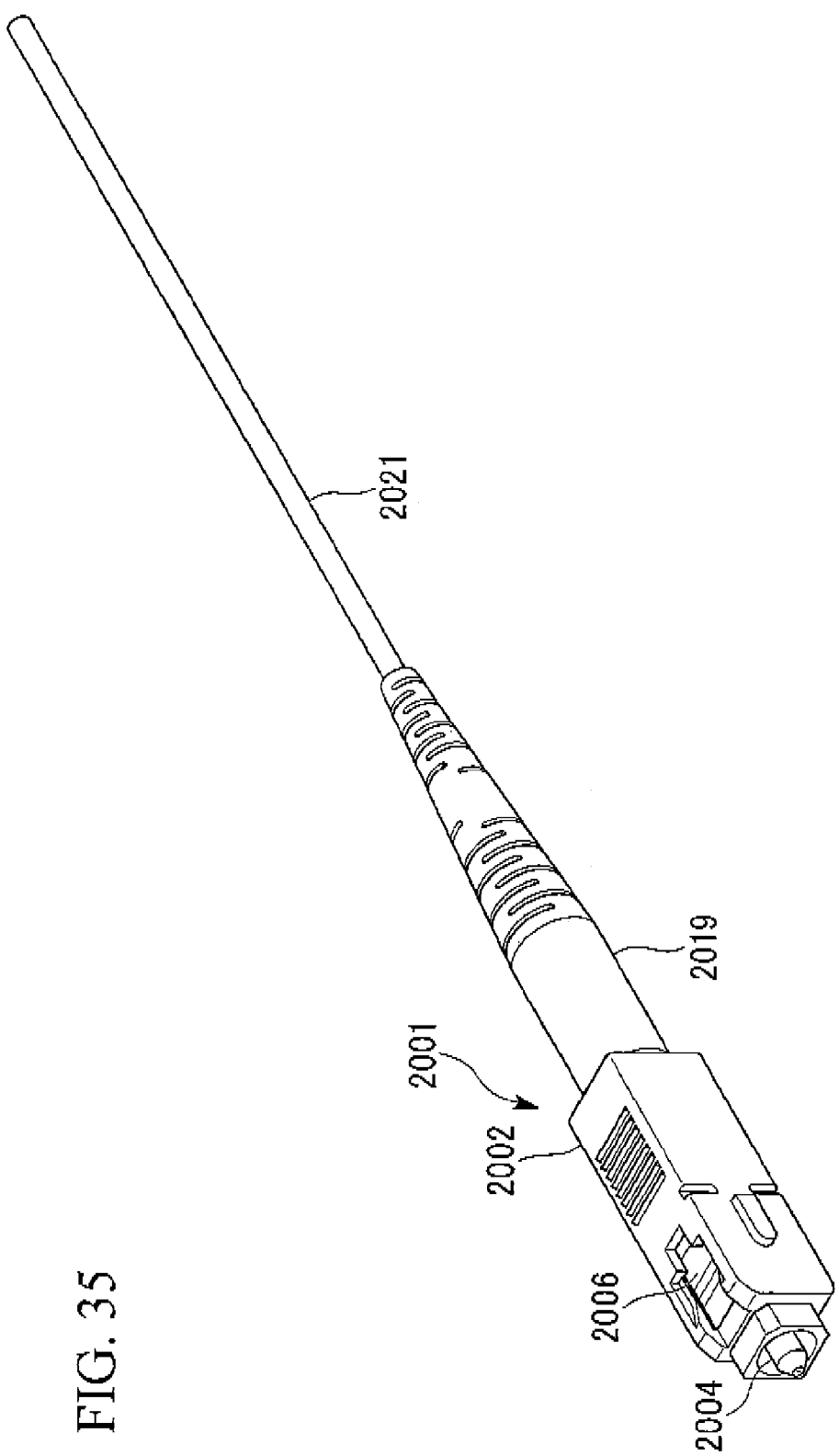
FIG. 35 is a perspective view showing an exterior appearance of an optical fiber cable provided with a connector shown in FIG. 34.

FIG. 34 is a cross-sectional diagram showing an optical fiber cable provided with a connector (hereinafter, may also be referred to as a "connector-attached optical fiber cable") according to the above third embodiment of the present invention. FIG. 35 is a perspective view showing an exterior appearance of an optical fiber cable provided with the above connector shown in FIG. 34.

As illustrated in FIGS. 34 and 35, the connector-attached optical fiber cable is produced by assembling an optical connector 2001 to a terminal of an optical fiber cable 2021.

In the following description, the left side in FIG. 34 is referred to as the "front side" or the "tip side." Meanwhile, the right side in FIG. 34 is referred to as the "rear side."

An example of the optical fiber cable 2021 is a generic optical fiber cord including an optical fiber 2022 which is structured so that an optical fiber 2022, such as an optical fiber core wire, and a tensile-strength body 2023 extending along the longitudinal direction of the optical fiber 2022, are stored inside an external covering comprising a resin such as polyethylene.

An aramid fiber is preferably used as the tensile-strength body 2023. However, a glass fiber and a carbon fiber may be used as the tensile-strength body as well.

The optical connector 2001 forms a terminal so that the optical fiber 2022 can be connected to a connector. The optical connector 2001 includes a sleeve-shaped coupling 2002, a housing 2003 provided inside the coupling 2002, a ferrule 2004 provided inside the housing 2003, a coil spring 2005 which elastically energizes the ferrule 2004 in the forward direction, and a protection tube portion 2018 provided in the rear end side of the housing 2003.

The housing 2003 includes a sleeve-shaped plug frame 2006 and a stop-ring 2007 attached to a rear end side of the plug frame 2006.

The stop-ring 2007 includes a sleeve-shaped body part 2008 and a cylindrical fixing part 2009 (hereinafter, may also be referred to as a tube fixing part) which extends to the rear side from the body part 2008.

A locking step portion 2008a is formed on the inner side of the body part 2008. A rear end portion of the coil spring 2005 engages with the locking step portion 2008a.

The tube fixing part 2009 has a radius smaller than the radius of the body part 2008. It is preferred that a concave-convex portion 2016 be formed on the outer surface of the tube fixing portion 2009. There is no particular limitation on the shape of the concave-convex portion 2016. However, it is preferred that the concave-convex portion 2016 be formed along the peripheral direction of the tube fixing portion 2009. In the diagram, a plurality of circular pump portions 2009a are formed with a space in the front and rear sides of each circular bump portion 2009a.

By forming the circular bump portions 2009a, the reinforcing tube 2010 and the tube fixing portion 2009 can be fixed more tightly. In this way, the resistance against a pulling force (in the direction of the right side in FIG. 34) can, be augmented. In addition, when the reinforcing tube 2010 is shaped in accordance with the circular bump portions 2009a, the resistance against the pulling force becomes even greater.

In the diagramed example, the cross-section of the circular bump portion 2009a is rectangular. However, the cross-sectional shape of the circular bump portion is not limited to this configuration. For example, the shape can be a half-circle, or V-shaped. In addition, only one circular bump portion may be provided. Alternatively, a plurality of circular bump portions may be provided as well.

The protection tube portion 2018 is cylindrical and extends to the rear side from the body part 2008 of the stop-ring 2007. The protection tube portion 2018 can store part of the reinforcing tube 2010 and the tube fixing portion 2009. The protection tube portion 2018 can also store the fused connection portion 2015, described below. A latching hole 2018a is formed on the front end portion of the protection tube portion 2018. A latching bump portion 2008b fits in the latching hole 2018a. The latching bump portion 2008b is formed on the external plane of the body part 2008 of the stop-ring 2007. The protection tube portion 2018 can be assembled to the body part 2008 by fitting the latching bump portion 2008b to the latching hole 2018a.

The front part of the protection tube portion 2018 is provided inside the coupling 2002. The rear part of the protection tube portion 2018 extends rearwards from the rear end of the coupling 2002.

In addition, the protection tube portion 2018 may be formed so that the reinforcing tube 2010 can be stored in its entirety.

The ferrule 2004 includes cylindrical capillary portion 2013 and a metallic flange portion 2014. A connection end plane 2013a is provided at a tip of the capillary portion 2013. The flange portion 2014 is provided on the rear end portion 2013b of the capillary portion 2013. This flange portion 2014 is shaped like a component generally used for single core optical connector ferrules.

An optical fiber insertion hole 2013b (a pore) is formed in the capillary portion 2013 along the central axis. An end portion 2012a of an embedded optical fiber 2012 such as an optical fiber core wire (an optical fiber bare wire, for example) is inserted and fixed in the optical fiber insertion hole 2013b.

The tip of the embedded optical fiber 2012 is exposed in the connection end plane 2013a of the capillary portion 2013. The rear side of the embedded optical fiber 2012 runs through the stop-ring 2007 and extends rearwards from the rear end of the stop-ring 2007.

The capillary portion 2013 includes, for example, glass and ceramic material such as zirconium. The ingredients for this capillary portion 2013 can be modified according to the environment in which the capillary portion 2013 is used.

The flange portion 2014 protrudes outwards from the outer surface of the capillary portion 2013. A concave engaging portion (not diagramed) is formed. The convex engaging portion (not diagramed) of the plug frame 2006 engages with this concave engaging portion. As a result, the ferrule 2004 is restricted from rotating around the axis.

The flange portion 2014 is positioned at the rear end portion of the ferrule 2004.

Because the flange portion 2014 hits the stopper prong 2006a of the plug frame 2006, the ferrule 2004 is prevented from moving further to the front side.

A ferrule sometimes used for this type of optical connector includes a capillary portion, a flange portion attached to the rear end of the capillary portion, and an extension tube which is integrated with the flange portion and extends rearwards from this flange portion. In addition, an embedded optical fiber is inserted in the extension tube.

However, in order to store the extension tube inside the housing, it is necessary to use a housing with a large size.

On the other hand, the ferrule 2004 shown in the diagram does not have an extension tube because the end part of the flange portion 2014 is positioned at the rear end portion of the ferrule 2004. Therefore, a short, small housing 2003 can be used. As a result, the overall size of the optical connector 2001 can be reduced.

The rear end portion 2012b of the embedded optical fiber 2012 is fuse-connected to the tip portion 2022a of the optical fiber 2022 sticking out from the terminal of the optical fiber cable 2021. The fused connection portion is referred to as 2015. The tip portion 2022a is, for example, an optical fiber bare wire sticking out of an optical fiber core wire.

The coil spring 2005 elastically energizes the ferrule 2004 in the forward direction by applying a reactive force against the body portion 2008 of the stop-ring 2007 and by pushing the flange portion 2014 forward. When the optical connector 2001 is connected to another optical connector, the coil spring 2005 provides an abutting force between the ferrule 2004 and the other optical connector.

The tube fixing portion 2009 of the stop-ring 2007 and the external cover 2024 of the tip portion of the optical fiber cable 2021 are covered by the sleeve-shaped reinforcing tube 2010. The reinforcing tube 2010 stores the optical fiber 2012, 2022, and the fused connection portion 2015.

A heat-shrinkable resin is used to produce the reinforcing tube 2010. For example, a polyolefin type resin which contracts at a temperature of 100° C. to 160° C. may be used.

The front end of the reinforcing tube 2010 covers the tube fixing portion 2009 and is fixed to the tube fixing portion 2009 by tightly contacting the outer surface (side surface) of the tube fixing portion 2009. Since the reinforcing tube 2010 is fixed to the portion where the circular bump portion 2009a is formed, the resistance against a pulling force (toward the right side in FIG. 34) is enhanced.

The rear end of the reinforcing tube 2010 covers the tip portion of the optical fiber cable 2021.

The reinforcing tube 2010 is filled with a reinforcing material including thermoplastic resin. The reinforcing material 2011 is filled from the tube fixing portion 2009 to the outer surface of the tip portion of the optical fiber cable 2021.

The tensile-strength body 2023 pulled out from the terminal of the optical fiber cable 2021 is embedded and fixed inside the reinforcing material 2011. The position of the tip of the tensile-strength body 2023 in the longitudinal direction is in the front side of the fused connection portion 2015. The tip of the tensile-strength body 2023 may be sandwiched between the reinforcing tube 2010 and the tube fixing portion 2009.

It is preferred that the reinforcing material 2011 be provided between the inner plane of the reinforcing tube 2010 and the outer plane of the tube fixing portion 2009 (not diagramed). As a result, the reinforcing material 2011 extends to the outer surface of the tube fixing portion 2009. Thus, the body part of the reinforcing material 2011 (in the side of the fused connection portion) and the stop-ring 2007 are bonded more tightly. Further, the resistance against the pulling force becomes stronger.

In the diagramed example, the reinforcing material 2011 is provided between the inner surface of the reinforcing tube 2010 and the outer surface of the optical fiber cable 2021. Because the outer surface of the tip portion of the optical fiber cable 2021 is embedded in the reinforcing material 2011, the body part of the reinforcing material 2011 (in the side of the fused connection portion) and the optical fiber cable 2021 are bonded more tightly. Further, the resistance against the pulling force becomes stronger. Furthermore, the optical fiber cable can be more resistant to mechanical stress provided from other directions.

The reinforcing material 2011 softens at a temperature above a predetermined temperature. Below this predetermined temperature, the reinforcing material 2011 solidifies. It is preferred that the reinforcing material soften at the contracting temperature of the reinforcing tube 2010. An example of this temperature range is 100° C. to 160° C.

A hot melt resin (a hot melt adhesive) may be preferably used as a reinforcing material 2011. Examples of the hot melt resin include ethylene—vinyl acetate copolymer (EVA), polyethylene, polyisobutylene, polyamide, and ethylene—acrylic acid ester copolymer.

It is preferred that a reinforcing core material (not diagramed) is provided inside the reinforcing tube 2010 along with the reinforcing portion of the fused connection portion which is generally used. This reinforcing core material extends from the outer surface of the tube fixing portion 2009 to the outer surface of the terminal of the optical fiber cable 2021.

The reinforcing core material is used to enhance the strength of the portion connecting the optical connector 2001 and the optical fiber cable 2021. The reinforcing core material includes hard material such as metal and glass. The reinforcing material may be rod-shaped. The reinforcing material may also be shaped as a long rectangle. It is preferred that the reinforcing core material be approximately as long as the total length of the reinforcing tube 2010. As a result, the mechanical strength of the connection portion is augmented.

The boot 2019, attached to the optical fiber cable 2021, is fixed to the protection tube portion 2018 by having the engaging protrusion 2019a engage with the engaging concave portion 2018b. The portion connecting the housing 2003 and the optical fiber cable 2021 is covered by the coupling 2002, the protection tube portion 2018, and the boot 2017.

Hereinafter, a fourth embodiment of the present invention is described with reference to the attached figures.

Figure 36:
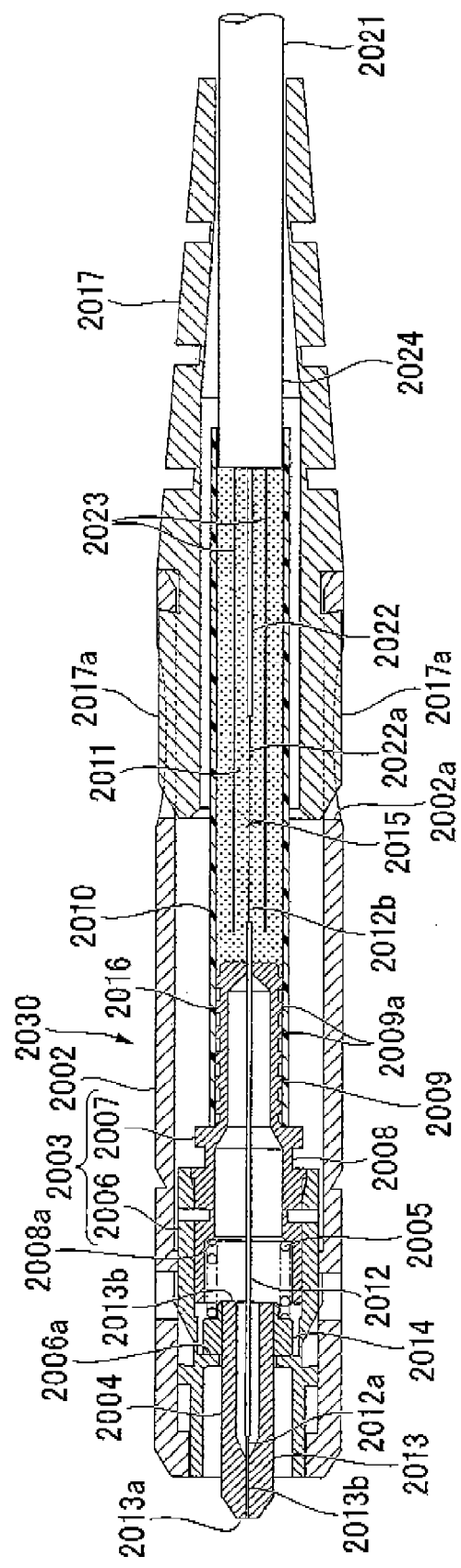
FIG. 36 is a cross-sectional diagram showing an optical fiber cable provided with a connector according to an aspect of the present invention.
Figure 37:
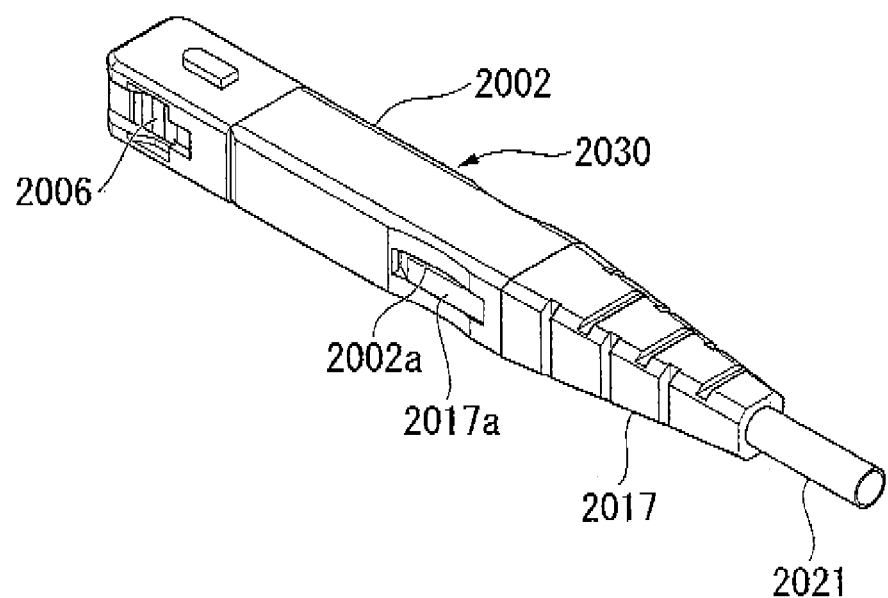
FIG. 37 is a perspective view showing an exterior appearance of an optical fiber cable provided with a connector shown in FIG. 36.
Figure 38:
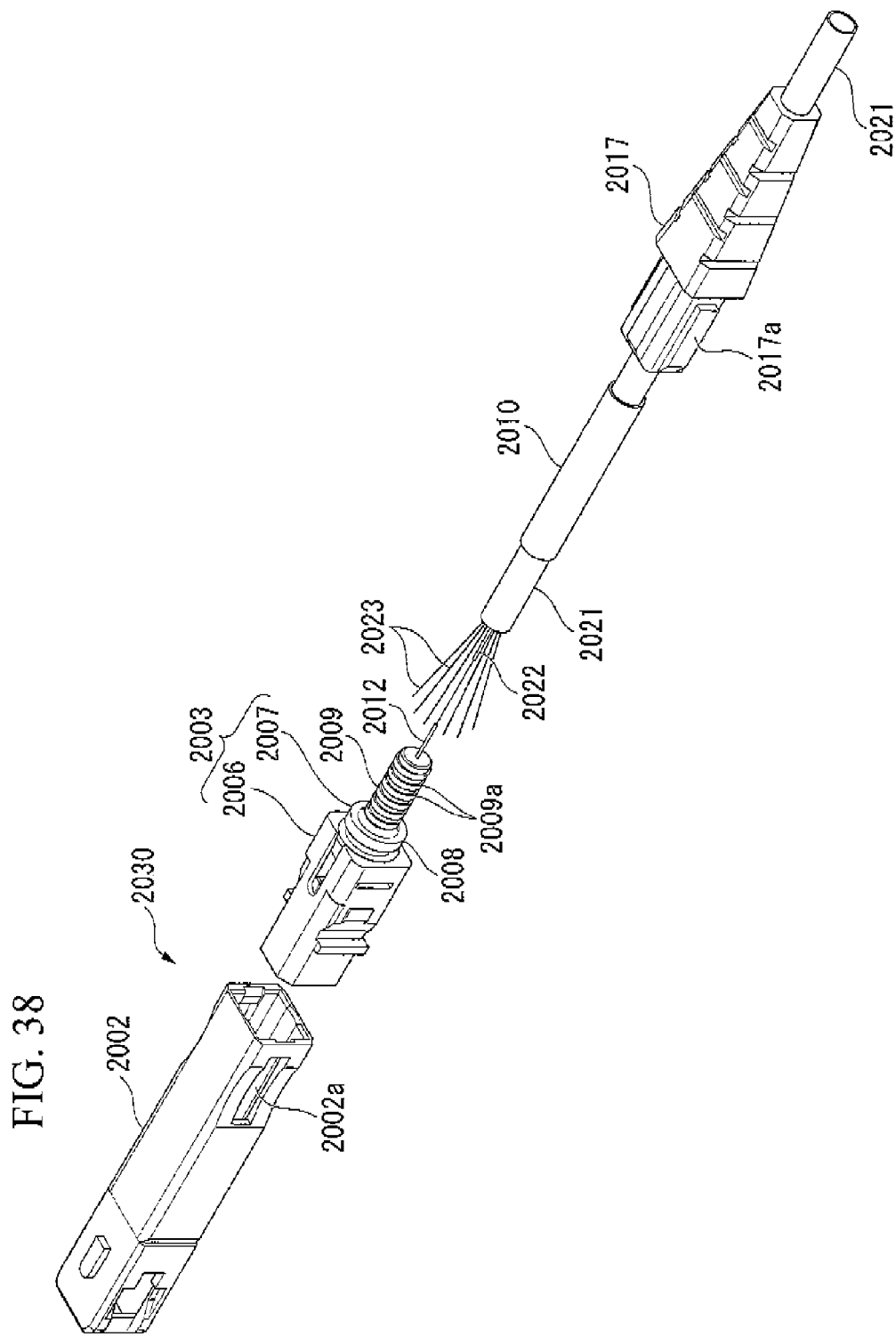
FIG. 38 is an exploded perspective view illustrating an optical fiber cable provided with a connector shown in FIG. 36.
Figure 39:
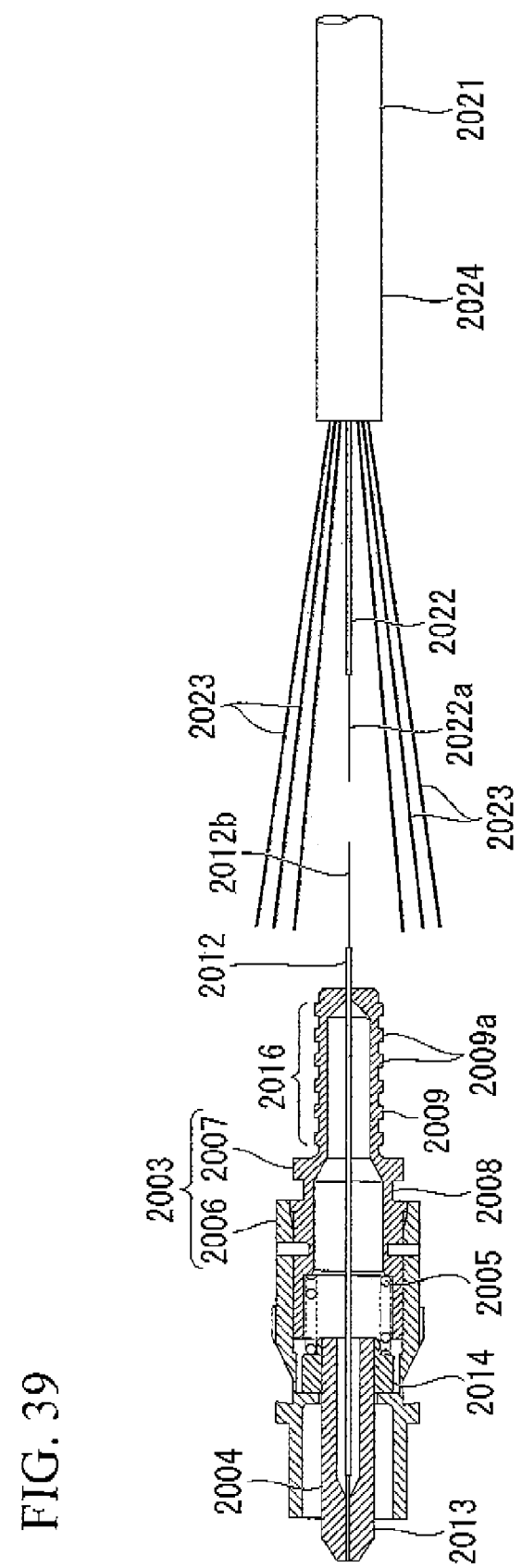
FIG. 39 is a process drawing illustrating a step installing an optical connector shown in FIG. 36.

FIG. 36 is a cross-sectional diagram showing a connector-attached optical fiber cable according to the fourth embodiment of the present invention. FIG. 37 is a perspective view showing an exterior appearance of a connector-attached optical fiber cable. FIG. 38 is an exploded perspective view illustrating the connector-attached optical fiber cable. FIG. 39 is a process drawing illustrating a step installing the optical connector. FIG. 39 shows a condition before the optical fiber is connected.

Figure 40:
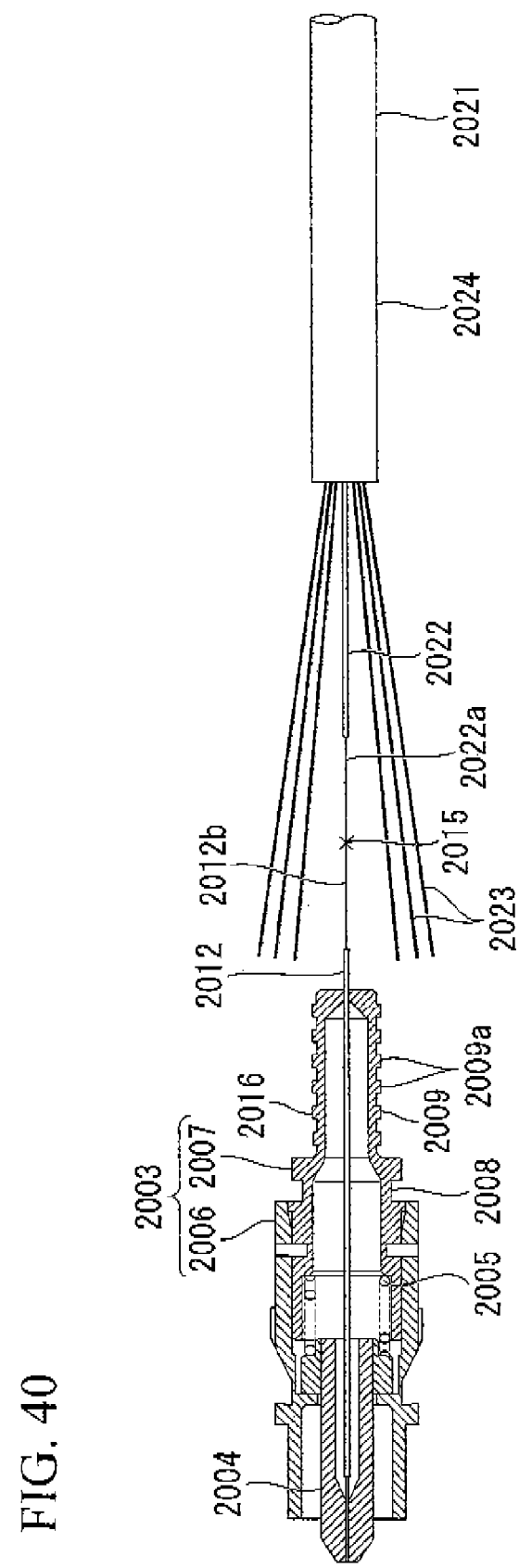
FIG. 40 is a processing diagram illustrating an installation step following the step shown in FIG. 39.
Figure 41:
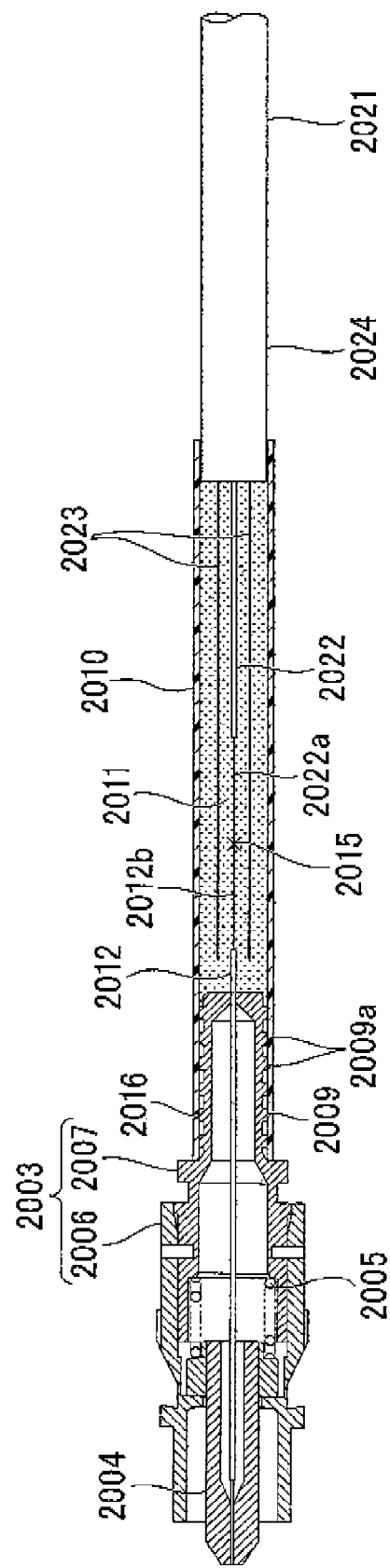
FIG. 41 is a processing diagram illustrating an installation step following the step shown in FIG. 40.

FIG. 40 is a processing diagram illustrating an installation step succeeding the step shown in FIG. 39. FIG. 40 shows a condition in which the optical fiber is connected. FIG. 41 is a processing diagram illustrating an installation step following the step shown in FIG. 40. FIG. 41 shows a condition in which the housing and the optical fiber cable are connected via the reinforcing tube.

As shown in FIGS. 36 to 38, the connector-attached optical fiber cable is produced by assembling the optical connector 2030 to a terminal of the optical fiber cable 2021.

The optical connector 2030 is structured similar to the optical connector 2001 shown in FIG. 34, except that the optical connector 2030 does not have a protection tube portion 2018.

According to the connector-attached optical fiber cable described above, the rear end portion of the reinforcing tube 2010 covers the optical fiber cable 2021. In addition, the rear end portion of the reinforcing tube 2010 tightly contacts and bonds with the outer surface (side surface) of the tip portion of the external covering 2024. The reinforcing material 2011 is filled from the tube fixing portion 2009 to the tip of the optical fiber cable 2021.

The boot 2017 is attached to the coupling 2002 by having the engaging protrusion 2017a engage with the engaging hole 2002a of the coupling 2002. The portion connecting the housing 2003 and the optical fiber cable 2021 is surrounded by the coupling 2002 and the boot 2017. It is preferred that the coupling 2002 be formed so as to cover a majority of the reinforcing tube 2010.

Next, a method of assembling the optical connector 2030 to a terminal of the optical fiber cable 2021 is described.

As shown in FIGS. 39 and 40, the optical fiber 2022 sticks out from the terminal of the optical fiber cable 2021. At the same time, the tensile-strength body 2023 is pulled out. In this way, the tip portion 2022a of the optical fiber 2022 is fuse-spliced to the rear end portion 2012b of the embedded optical fiber 2012.

For example, the tip portions of the optical fibers 2012 and 2022 may be fuse-spliced by heating these tip portions with, for example, an arc discharge, and by abutting these tip portions together. Here, ample space can be obtained surrounding the optical fiber connection portion. As a result, it is possible to use a generic fusing-holder using a discharge electrode.

Incidentally, the optical fiber cable 2021 is inserted in advance inside the reinforcing tube 2010 and the boot 2017.

Next, the reinforcing tube 2010 is positioned so as to store the fused connection portion 2015, the tensile-strength body 2023, and the reinforcing material 2011.

When a reinforcing core material is used, this reinforcing core material is inserted in the reinforcing tube 2010 so that the reinforcing core material extends from the tube fixing portion 2009 to the optical fiber cable 2021.

As shown in FIG. 41, the reinforcing tube 2010 is heated above the contracting temperature. Thus, the reinforcing tube 2010 is contracted. As a result, the front end portion of the reinforcing tube 2010 tightly contacts the external surface of the tube fixing portion 2009, and is fixed. The rear end portion of the reinforcing tube 2010 tightly contacts the outer covering 2024 of the optical fiber cable 2021, and is fixed firmly as well.

At the same time, when, due to heating, the temperature rises above the temperature at which the reinforcing material softens (hereinafter, may be referred to as the "softening temperature"), the reinforcing material 2011 softens. Thus, the reinforcing material 2011 flows so as to fill the entire space inside the reinforcing material 2011. In this way, the segment from the outer surface of the tube fixing portion 2009 to the surface of the external covering 2024 of the terminal of the optical fiber cable 2021 is filled with the reinforcing material 2011. When the heating is halted, and the temperature drops below the softening temperature, the reinforcing material 2011 solidifies. The tensile-strength body 2023 is embedded and fixed inside the reinforcing material 2011. As a result, the housing 2003 and the optical fiber cable 2021 are connected.

Next, the housing 2003 is inserted in the coupling 2002. At the same time, the boot 2017 is fixed to the coupling 2002. In this way, the connector-attached optical fiber cable illustrated in FIGS. 36-38 is obtained.

According to the connector-attached optical fiber cable described above, the reinforcing tube 2010 covers the housing 2003 and the optical fiber cable 2021. In addition, the reinforcing tube 2010 is filled with the reinforcing material 2011. Therefore, although the structure of the connector-attached optical fiber cable is simple, the portion connecting the housing 2003 and the optical fiber cable 2021 is adequately strengthened.

Furthermore, the tensile-strength body 2023, pulled out from the terminal of the optical fiber cable 2021, is fixed inside the reinforcing material 2011. As a result, the processing of the terminal of the tensile-strength body 2023 becomes easier. In addition, the portion connecting the housing 2003 and the optical fiber cable 2021 can be strengthened even further.

In addition, the reinforcing core material is provided along the reinforcing material 2011 such as a hot melt adhesive in the longitudinal direction. As a result, the terminal of the housing 2003 and the terminal of the optical fiber cable 2021 can be integrally bonded. In addition, the portion connecting the terminals is mechanically strong. In particular, the formation of the concave-convex portion 2016 in the housing 2003 allows the terminals to be tightly bonded.

Thus, even though a strong pulling force is applied to the connection portion, the fused connection portion 2015 will not be damaged, and the optical fiber will not be severed.

Furthermore, since the fused connection portion 2015 is covered by the reinforcing material 2011 and the reinforcing tube 2010, the fused connection portion 2015 can be protected.

According to the connector-attached optical fiber cable described above, the fused connection portion 2015 is placed inside the reinforcing tube 2010 provided in the exterior portion of the housing 2001. Thus, the size of the housing can be made smaller, and the total length can be made shorter, compared to a cable structured so that the fused connection portion is stored inside the housing. As a result, the overall size of the connector portion at the tip of the optical fiber cable 2021 can be reduced.

In this way, the optical fiber cable can be stored in a place with limited amount of space, such as an optical connection box or a rosette, without the optical fiber being subject to an unreasonable bend.

Moreover, a generic fusing holder may be used in the fuse-splicing operation. As a result, the fusing process becomes easy compared to an optical fiber cable structured so that the fused connection portion is placed inside the ferrule.

Furthermore, another advantage of the connector-attached optical fiber cable is that the number of components is small, and thus, the assembling process becomes easy.

Figure 42:
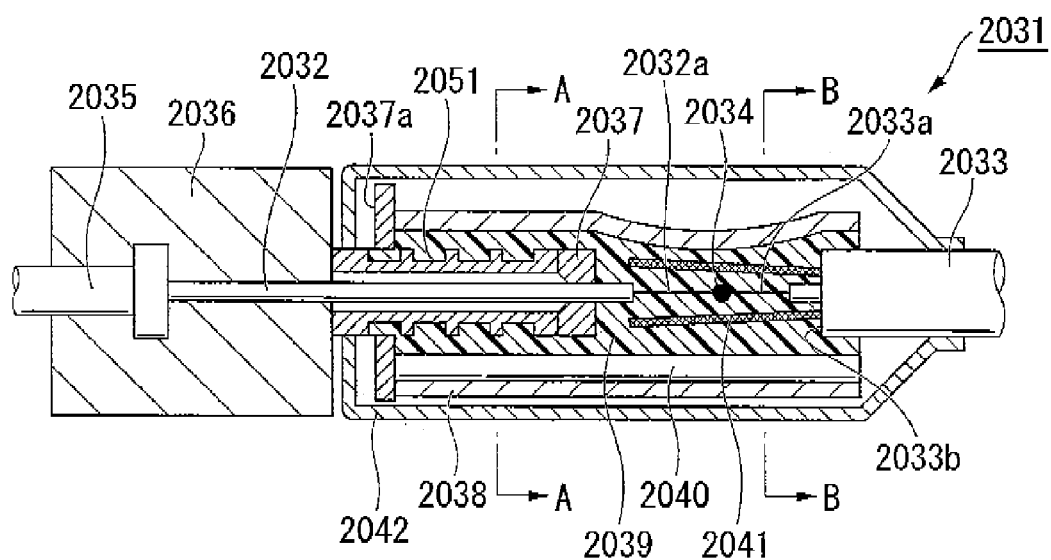
FIG. 42 is a cross-sectional diagram showing an optical connector according to an aspect of the present invention.
Figure 43:
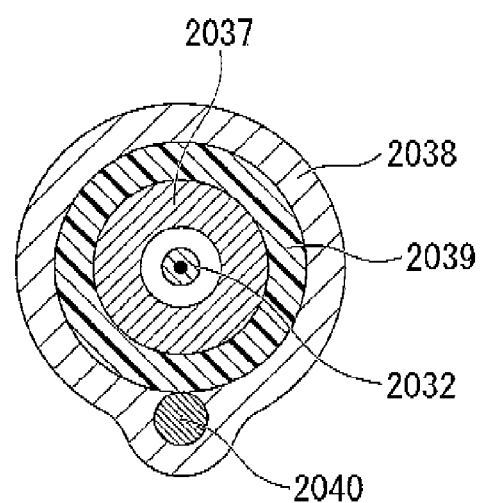
FIG. 43 is a cross-sectional diagram along line A-A in FIG. 42.
Figure 44:
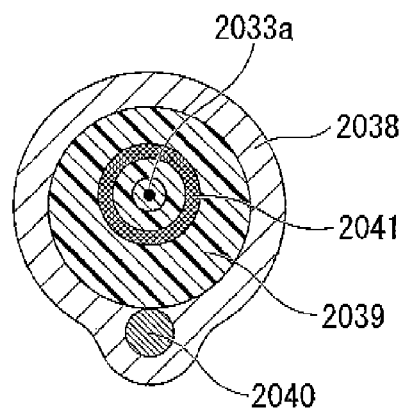
FIG. 44 is a cross-sectional diagram along line B-B in FIG. 42.

FIG. 42 is a cross-sectional diagram showing an optical connector according to the above embodiment. FIG. 44 is a cross-sectional diagram along line A-A in FIG. 42. FIG. 44 is a cross-sectional diagram along line B-B in FIG. 42. The reference numeral 2031 in the diagram refers to an optical connector. A fused connection portion 2034 connects a bare optical fiber 2032a of an embedded optical fiber 2032 (hereinafter, may be simply referred to as optical fiber 2032), which is cut in advance at a predetermined protruding length, and a bare optical fiber 2033a of the optical fiber cord 2033.

In addition, 2035 refers to a ferrule which stores the optical, fiber 2032 of the optical connector. 2036 refers to a connector housing which fixes the ferrule 2035. 2037 refers to a stop-ring which abuts one end of the connector housing 2036. 2038 refers to a cylindrical reinforcing tube which covers the stop-ring 2037 while one end of the reinforcing tube 2038 tightly contacts the flange 2037a of the stop-ring 2037. 2039 refers to a hot melt resin (hereinafter may also be referred to as a reinforcing material) which fills the space between the reinforcing tube 2038 and the fused connection portion 2034. 2040 refers to a reinforcing core material placed approximately parallel to the axis of the optical fiber cord 2033 and the optical fiber 2032 of the optical connector. One end of the reinforcing core material 2040 tightly contacts the stop-ring 2037. 2041 is a tensile-strength body which covers the bare fibers 2032a and 2033a which includes the fused connection portion 2034. 2042 refers to a boot which includes a cylindrical container.

In the peripheral portion of the stop-ring 2037, a plurality of grooves 2051 is formed parallel to one another in the peripheral direction. These grooves 2051 are filled with the hot melt resin 2039.

The dimensions of these grooves 2051 such as the width, the depth, and the interval are determined so that, when the reinforcing tube 2038 covers the stop-ring 2037, the stop-ring 2037 is strong enough to withstand a reactive force applied in the longitudinal direction. Normally, the dimensions of the grooves 2051 are set so that the strength of the stop-ring 2037 is the greatest. For example, when the stop-ring structure 2037 has a diameter of 4 mm and a length of 8 mm, and the reinforcing tube 2038 has a length of 34 mm, the width, the depth, and the interval of each groove 2051 are respectively set to 2 mm, 2 mm, and 1.5 mm.

Meanwhile, an optical fiber 2032 of the optical connector is fixed to the tip portion of the stop-ring 2037 with, for example, an adhesive. In this way, the position of the optical fiber 2032 of the optical connector can be fixed. Therefore, it is possible to prevent the optical fiber 2032 of the optical connector from sticking out of the stop-ring 2037 when an external force is applied to the optical fiber 2032 of the optical connector, which was a drawback in the related art.

The reinforcing tube 2038 includes a heat-shrinkable resin which shrinks when it is heated to a temperature greater than or equal to a predetermined temperature. For example, resin such as polyethylene (having a shrinkage temperature of 100° C. to 120° C.) is preferably used. This reinforcing tube 2038 covers a tip portion of the stop-ring 2037 from the flange 2037*a*.

The hot melt resin 2039 is a resin member obtained by providing a composite element (precursor) or raw material; heating it to a predetermined temperature or more; transforming it into any desired shape; cooling it to a preselected temperature or lower than the predetermined temperature; and curing it. Considering the workability and the like, the resin member may be melted at a temperature which is approximately equal to the shrinkage temperature of the reinforcing sleeve 2038. For instance, an EVA resin (having a melting temperature of 90° C. to 100° C.) may be used as this type of resin member.

The reinforcing core material 2040 is, for example, a rod-shaped tensile-strength body comprising stainless steel such as SUS304. The reinforcing core material 2040 relieves tensional force applied from outside to the bare optical fibers 2032*a* and 2033*a* including the fused connection portion 2034. In this way, the reinforcing core material 2040 prevents the optical fiber from bending due to the tensional force.

The tensile-strength body 2041 includes, for example, fiber having superior tensile strength such as aramid fiber. The tensile-strength body 2041 relieves the reactive force applied to the fused connection portion 2034 and the bare optical fibers 2032*a* and 2033*a* surrounding the fused connection portion 2034, when the reinforcing tube 2038 undergoes heat-shrinkage and when the hot melt resin 2039 hardens. In this way, the tensile-strength body 2041 protects the fused connection portion 2034 and the bare optical fibers 2032*a* and 2033*a*.

Figure 45:
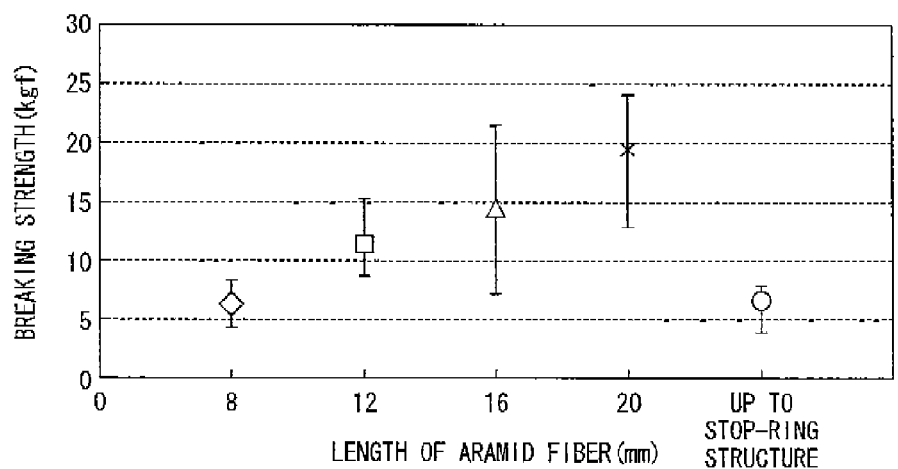
FIG. 45 is a diagram illustrating a relationship between the length of an aramid fiber and the breaking strength of an optical fiber.

FIG. 45 is a diagram indicating the breaking strength (kgf) of the optical fiber when the length between the core wire end portion 2033*b* of the optical fiber cord 2033 and the tip of the aramid fiber (i.e., the aramid fiber length) is varied. This optical fiber cord 2033 uses an aramid fiber as the tensile-strength body 2041.

According to FIG. 45, unless the aramid fiber reaches the stop-ring, the longer the aramid fiber is, the more resistant to breakage the aramid fiber becomes. However, when the aramid fiber reaches the stop-ring, the aramid fiber becomes less strong. Thus, in an exemplary embodiment, it is preferred that the length of the aramid fiber be roughly 8 min to 20 mm. More preferably, the length of the aramid fiber is approximately 20 mm.

Hereinafter, a manufacturing method of the optical connector 2031 is described.

Figure 46:
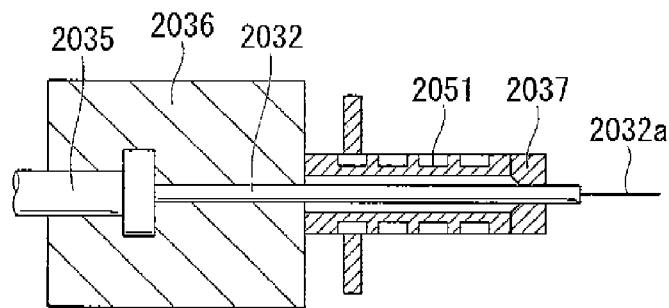
FIG. 46 is a processing diagram showing a manufacturing method of an optical connector according to an aspect of the present invention.
Figure 47:
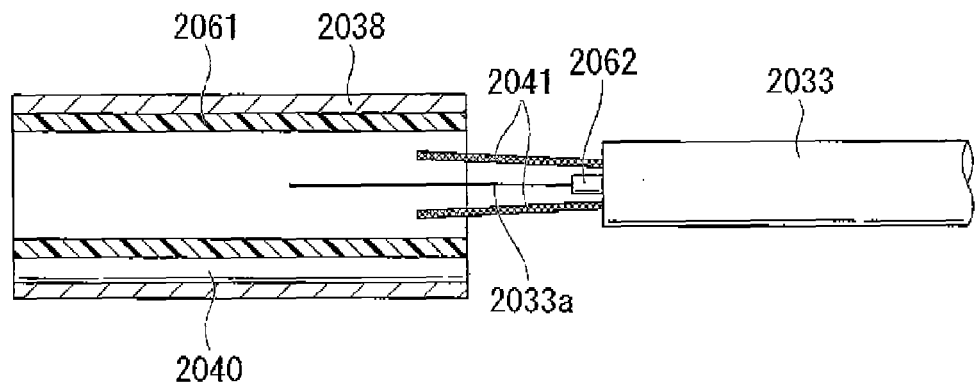
FIG. 47 is a processing diagram showing a manufacturing method of an optical connector according to an aspect of the present invention.

First, as shown in FIG. 46, one terminal surface (connection terminal surface) of the optical fiber 2032, which is already fixed to a center through-hole (optical fiber insertion hole) of the ferrule 2035 of the optical connector, is polished along with the ferrule. Next, a bare optical fiber 2032*a* is exposed by peeling off a covering of the other terminal (the terminal in the opposite side of the connection terminal surface) of the optical fiber 2032. Then, this bare optical fiber 2032*a* is cut to a predetermined protruding length in order to perform the fuse-splicing operation.

In addition, as shown in FIG. 37, the reinforcing core material 2040 is provided in the inner peripheral surface of the reinforcing tube 2038 so that the reinforcing core material 2040 is parallel to the axis. Then, a hot melt resin 2061 is applied or formed in the inner peripheral surface of the reinforcing tube 2038 including the reinforcing core material 2040. When it is possible to form the hot melt resin 2061 in a particular shape, the hot melt resin 2061 may be provided so as to fit the compact.

Figure 48:
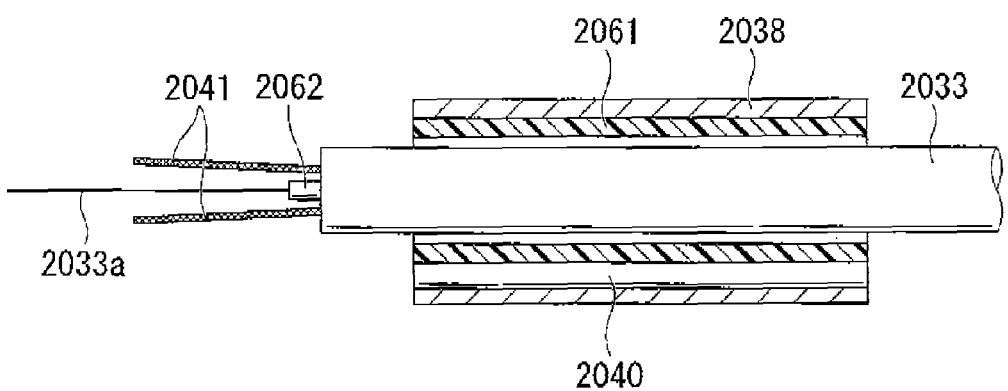
FIG. 48 is a processing diagram showing a manufacturing method of an optical connector according to an aspect of the present invention.

Meanwhile, the optical fiber core wire 2062 and the tensile-strength body 2041 are exposed by peeling off the covering of one terminal of the optical fiber cord 2033. Then, a bare optical fiber 2033*a* is provided by exposing the tip portion of the optical fiber core wire 2062. Next, as shown in FIG. 48, an optical fiber cord 2033 is inserted in this reinforcing tube 2038.

Figure 49:
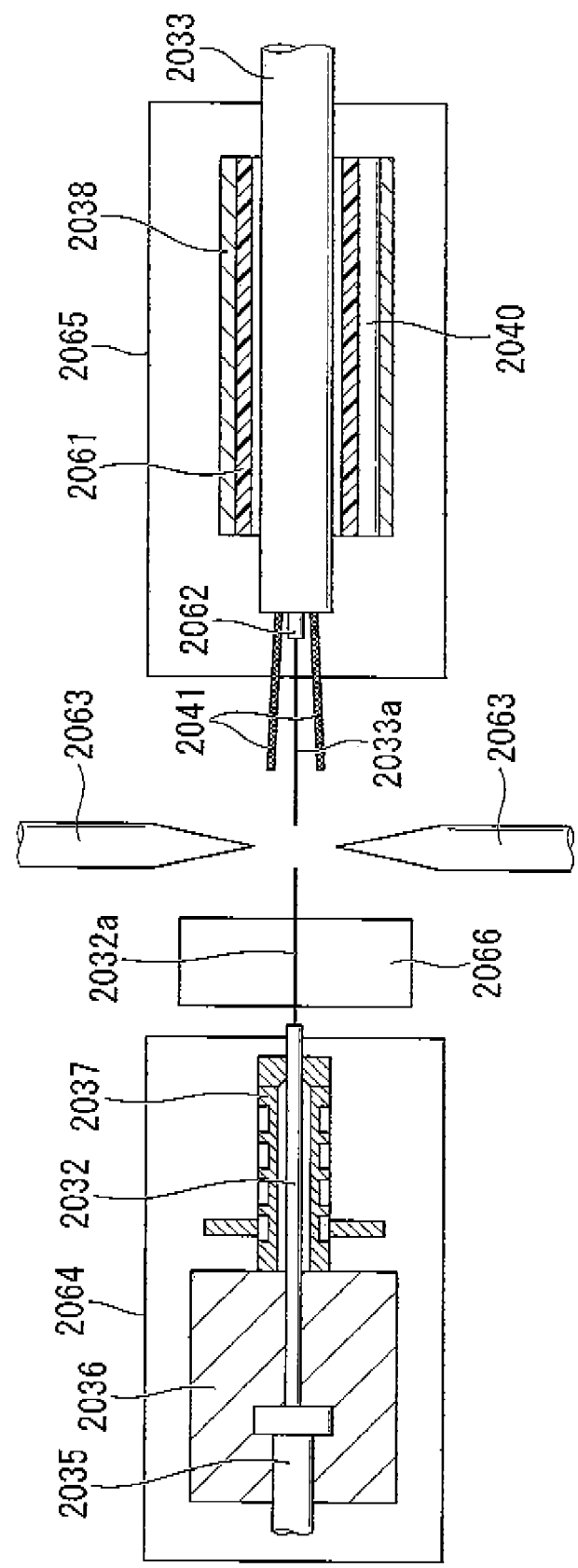
FIG. 49 is a processing diagram showing a manufacturing method of an optical connector according to an aspect of the present invention.

Next, as shown in FIG. 49, discharging electrodes 2063 and 2063 of the fusion-splicing apparatus are placed in opposite to one another. A predetermined distance is provided between the discharging electrodes. Holders 2064 and 2065 are prepared so that the holders can be attached to the fusion-splicing apparatus. A ferrule 2035, a connector housing 2036, and a stop-ring 2037 are fixed at a predetermined position of the holder 2064. In addition, a bare optical fiber 2032*a* of the optical fiber 2032 of the optical connector is placed in a V-shaped groove 2066 of the fusion-splicing apparatus. In this way, the position of the bare optical fiber 2032*a* is determined.

Furthermore, a reinforcing tube 2038 and an optical fiber cord 2033 are fixed at a predetermined position of the holder 2065. Thus, the position of the bare optical fiber 2033*a* is determined.

Next, the bare optical fibers 2032*a* and 2033*a* are abutted to one another by placing the holders 2064 and 2065 so that the holders face one another, and the discharging electrodes 2063, 2063 are placed in between the holders. Then, a predetermined voltage is applied to the discharging electrodes 2063 and 2063. Then, the abutting portion is fuse-spliced.

In this way, the bare optical fiber 2032*a* of the optical fiber 2032 of the optical connector and the bare optical fiber 2033*a* of the optical fiber cord 2033 axe fuse-spliced via the fused connection portion 2034.

Figure 50:
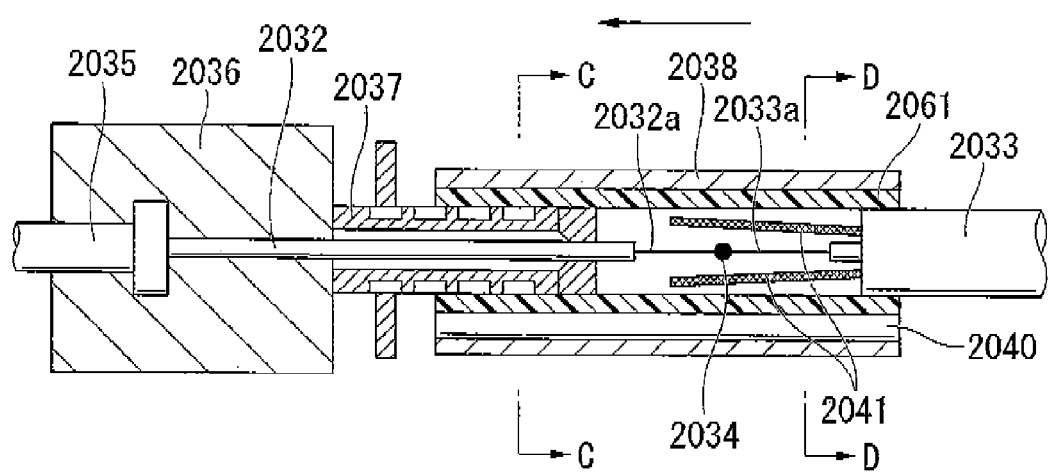
FIG. 50 is a processing diagram showing a manufacturing method of an optical connector according to an aspect of the present invention.
Figure 51:
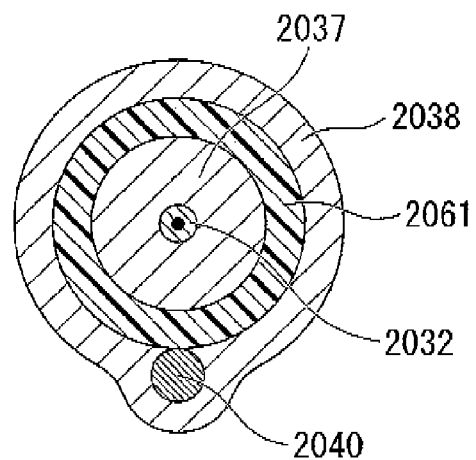
FIG. 51 is a cross-sectional diagram along line C-C of FIG. 50.
Figure 52:
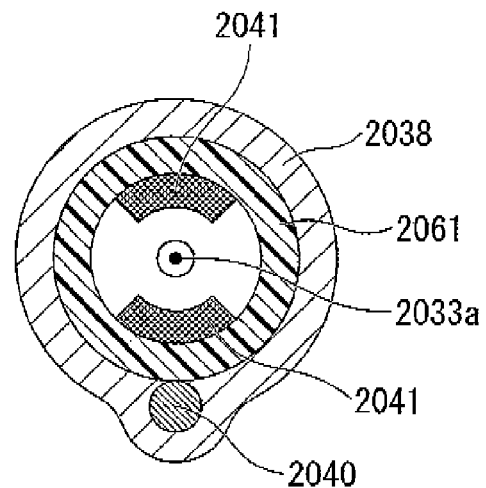
FIG. 52 is a cross-sectional diagram along line D-D of FIG. 50.

Next, as shown in FIGS. 50 to 52, the reinforcing tube 2038 is repositioned so as to cover the fused connection portion 2034, the bare optical fiber 2032*a*, and 2033*a*. Thus, the reinforcing tube 2038 contacts the flange 2037*a* of the stop-ring 2037. Here, by having the reinforcing tube 2038 contact the flange 2037; the length of the reinforcing tube 2038 can be adjusted easily.

Next, a heater is used to maintain the temperature above or equal to the contracting temperature of the reinforcing tube 2038 and above or equal to the melting temperature of the hot melt resin 2061. In this way, the reinforcing tube 2038 is contracted. At the same time, the hot melt resin 2061 is melted. Thus, the molten hot melt resin 2061 flows inside the groove 2051 of the stop-ring 2037 and inside the reinforcing tube 2038. The groove 2051 and the reinforcing tube 2038 are therefore filled tightly.

At this time, the air inside the reinforcing tube 2038 is pushed to the exterior portion. Thus, no bubble is left inside the reinforcing tube 2038.

Figure 53:
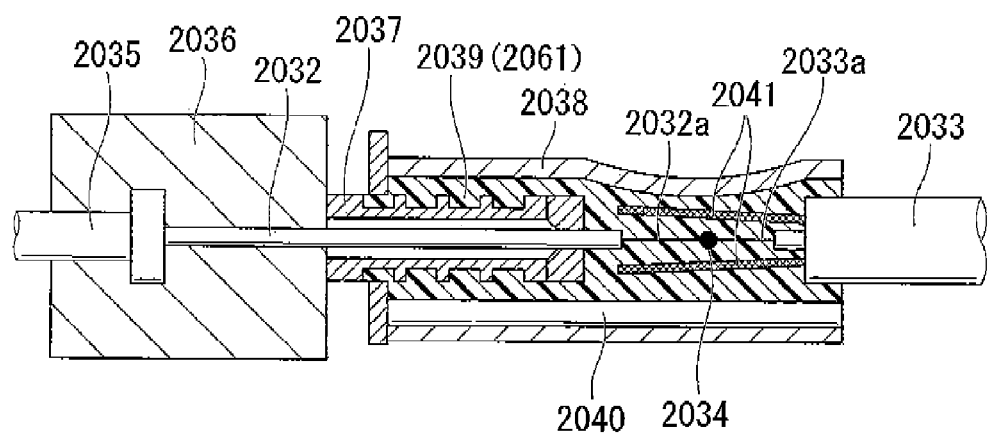
FIG. 53 is a processing diagram showing a manufacturing method of an optical connector according to an aspect of the present invention.

Next, the current object is taken out of the heater and is then self-cooled to a temperature lower than the contracting temperature of the reinforcing tube 2038 and the melting temperature of the hot melt resin 2061. An example of this temperature is 25° C. (room temperature). Consequently, as shown in FIG. 53, the reinforcing tube 2038 contracts, and the hot melt resin 2061 hardens. The reinforcing tube 2038, the hardened hot melt resin 2039, and the stop-ring 2037 are integrally and tightly bonded together.

Finally, the boot 2042 is provided as a covering, and the optical connector 2031 according to the above embodiment is obtained.

Figure 54:
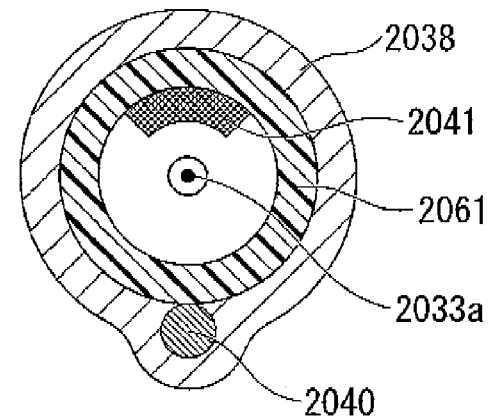
FIG. 54 is a cross-sectional diagram showing a variation of a tensile-strength body according to an aspect of the present invention before a thermal contraction.

FIG. 54 is a cross-sectional diagram showing a variation of a tensile-strength body 2041 according to the above embodiment before a thermal contraction. FIG. 54 differs from FIG. 52 in that the tensile-strength body 2041 is gathered at a position in the upper side of the fused connection portion 2034 so that the cross-section of the tensile-strength body 2041 is shaped like as a fan.

Figure 55:
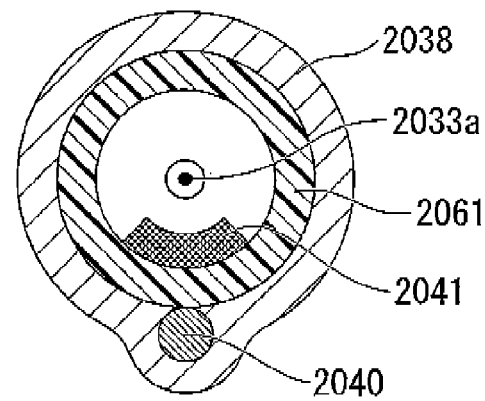
FIG. 55 is a cross-sectional diagram showing a variation of a tensile-strength body according to an aspect of the present invention before a thermal contraction.

FIG. 55 is a cross-sectional diagram showing a variation of the tensile-strength body 2041 according to the above embodiment before thermal contraction. FIG. 55 differs from FIG. 52 in that the tensile-strength body 2041 is gathered at a position in the lower side of the fused connection portion 2034 so that the cross-section of the tensile-strength body 2041 is shaped like a fan.

Figure 56:
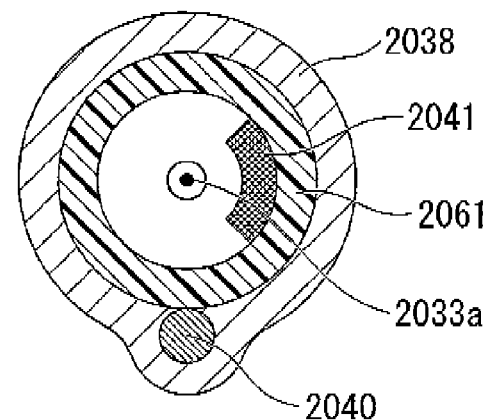
FIG. 56 is a cross-sectional diagram showing a variation of a tensile-strength body according to an aspect of the present invention before a thermal contraction.

FIG. 56 is a cross-sectional diagram showing a variation of a tensile-strength body 2041 according to the above embodiment before heat contraction. FIG. 56 differs from FIG. 52 in that the tensile-strength body 2041 is gathered on one side of the fused connection portion 2034 in the longitudinal direction so that the cross-section of the tensile-strength body is shaped like a fan.

Figure 57:
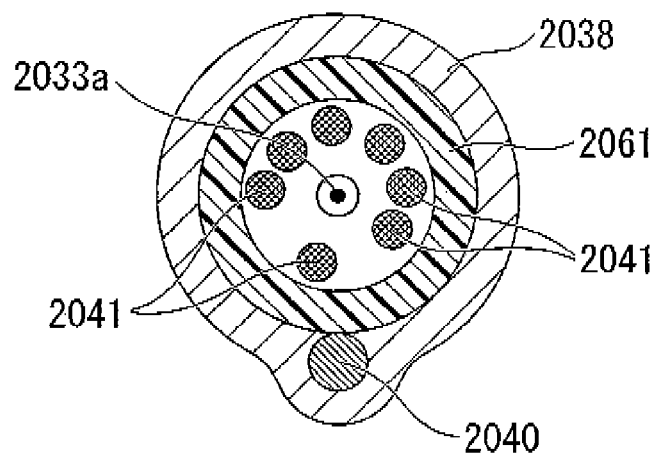
FIG. 57 is a cross-sectional diagram showing a variation of a tensile-strength body according to an aspect of the present invention before a thermal, contraction.

FIG. 57 is a cross-sectional diagram showing a variation of the tensile-strength body 2041 according to the above embodiment before thermal contraction. FIG. 57 differs from FIG. 52 in that the tensile-strength body 2041 is placed randomly around the fused connection portion 2034 so that the tensile-strength body 2041 is shaped like a circle.

In this way, the overall shape of the tensile-strength body 2041 and positioning may be altered in various ways. Regardless of the shape and the position of the tensile-strength body 2041, the tensile-strength body can relieve the reactive force applied to the fused connection portion 2034 and the bare optical fibers 2032a and 2033a surrounding the fused connection portion 2034 when the reinforcing tube 2038 undergoes thermal contraction and when the hot melt resin 2061 solidifies.

Figure 58:
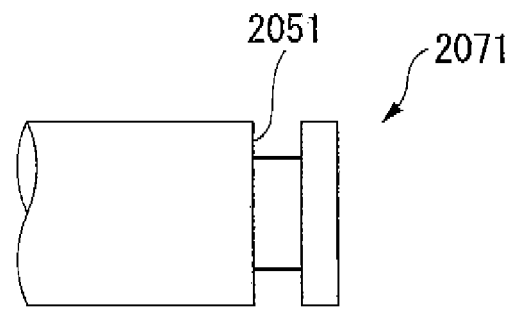
FIG. 58 is a side view showing a variation of a stop-ring according to an aspect of the present invention.

FIG. 58 is a side view showing a variation of the stop-ring 2037 according to the above embodiment. The stop-ring 2071 differs from the stop-ring 2037 shown in FIG. 42 in that a groove 2051 is formed in the tip portion of the stop-ring 2071 in the peripheral direction.

For example, when the stop-ring structure 2071 has a diameter of 4 mm and a length of 8 mm, and the reinforcing tube 2038 has a length of 34 mm, the circumferential groove 2051 may be set to have a width of 2 mm and a depth of 2 mm and to be formed 1.5 mm from the tip portion.

Figure 59:
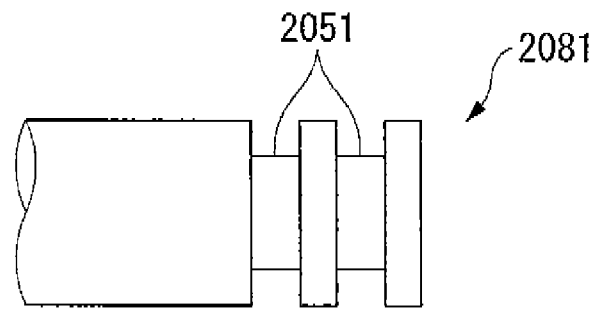
FIG. 59 is a side view showing a variation of a stop-ring according to an aspect of the present invention.

FIG. 59 is a side view showing a variation of the stop-ring 2037 according to the above embodiment of the present invention. The stop-ring 2081 differs from the stop-ring 2037 shown in FIG. 42 in that two grooves 2051 are formed at the tip portion of the stop-ring 2081 in the circumferential direction.

For example, when the stop-ring 2081 has a diameter of 4 mm and a length of 8 mm, and the reinforcing tube 2038 has a length of 34 mm, each of the grooves 2051 may be set to have a width of 2 mm and a depth of 2 mm, and an interval of 1.5 min.

Figure 60:
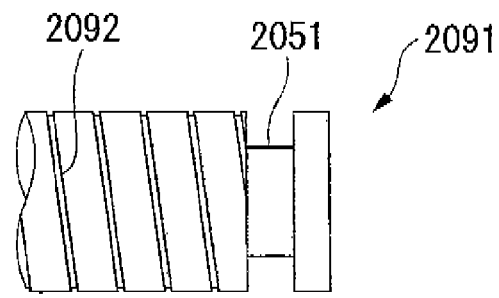
FIG. 60 is a side view showing a variation of a stop-ring according to an aspect of the present invention.

FIG. 60 is a side view showing a variation of the stop-ring 2037 according to the above embodiment. The stop-ring 2091 differs from the stop-ring 2037 shown in FIG. 42 in that a groove 2051 is formed on a tip portion of the stop-ring 2091. In addition, a spiral groove 2092 is formed on a body portion of the stop-ring 2091. With the circumferential groove 2051 and the spiral groove 2092 provided in the stop-ring 2091, the frictional coefficient between the stop-ring 2091 and the reinforcing tube 2038 increases even further. The tensile breaking strength is further improved as well.

Figure 61:
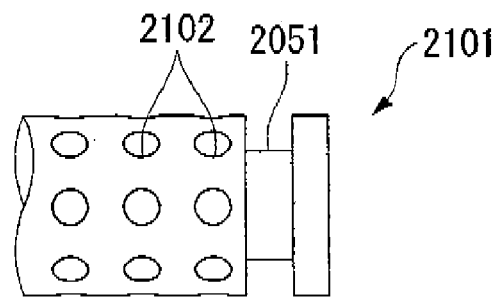
FIG. 61 is a side view showing a variation of a stop-ring according to an aspect of the present invention.

FIG. 61 is a side view illustrating a variation of the stop-ring 2037 according to the above embodiment. The stop-ring 2101 differs from the stop-ring 2037 shown in FIG. 42 in that a groove 2051 is formed on the tip portion of the ring-structure 2101 in the circumferential direction. In addition, a concave portion 2102 is formed on the peripheral surface of the body portion of the stop-ring 2101 in the longitudinal and vertical directions. The cross-section of the concave portion 2102 is arc-shaped, and the opening of the concave portion 2102 is circular.

In this way, the stop-ring 2101 includes a groove 2051 in the peripheral direction and also includes a concave portion 2102 in the body portion. As a result, the frictional coefficient between the stop-ring 2101 and the reinforcing tube 2038 increases even further. In addition, the tensile breaking strength increases even further.

Figure 62:
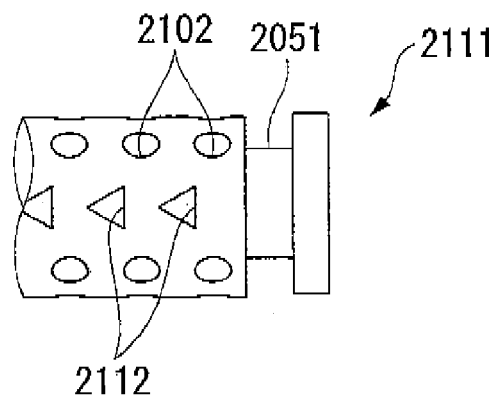
FIG. 62 is a side view showing a variation of a stop-ring according to an aspect of the present invention.

FIG. 62 is a side view illustrating a variation of the stop-ring 2037 according to the above embodiment. This stop-ring 2111 differs from the stop-ring 2037 shown in FIG. 42 in that a groove 2051 is formed on the tip portion of the zing-structure 2111 in the circumferential direction. In addition, a plurality of concave portions 2102 are formed in the peripheral surface of the body portion of the stop-ring 2111. The concave portions 2102 form a plurality of rows along the axial direction. The cross-section of the concave portion 2102 is arc-shaped, and the opening of the concave portion 2102 is circular. In addition, a plurality of concave portions 2112 are provided on the body portion of the stop-ring 2111. The concave portions 2112 form a plurality of rows in the axial direction. The row of the concave portions 2112 is provided in between the rows of the concave portions 2102.

In this way, the stop-ring 2111 includes a groove 2051 in the circumferential direction and concave portions 2102 and 2112 in the body portion. As a result, the frictional coefficient between the stop-ring 2111 and the reinforcing tube 2038 increases even further. In addition, the tensile breaking strength increases even further.

According to the optical connector 2031 based on the present embodiment described above, the reinforcing tube 2038 covers the fused connection portion 2034 and the bare optical fibers 2032a and 2033a. A solidified hot melt resin 2039 is tightly filled in between the reinforcing tube 2038 and the fused connection portion 2034. A reinforcing core material 2040 is placed inside this reinforcing tube 2038 parallel to the axis of the optical fiber. Thus, there will not be any gap between the fused connection portion 2034 of the optical fiber and the reinforcing tube 2038. Consequently, the fused connection portion 2034 and the reinforcing tube 2038 can be tightly fixed. In addition, the structure of the present embodiment makes it easier to handle the optical connector. Furthermore, the production cost is reduced.

Moreover, according to the present embodiment, the temperature is maintained above or equal to the contracting temperature of the reinforcing tube 2038, and above or equal to the melting temperature of the hot melt resin 2061. The reinforcing tube 2038 is contracted under these conditions. At the same time, the hot melt resin 2061 is melted. Consequently, the fused connection portion 2034 of the optical fiber, the reinforcing tube 2038, the solidified hot melt resin 2039, and the reinforcing core material 2040 can be integrated tightly.

Incidentally, in the present embodiment, the reinforcing tube 2038 is contracted, and the solidified resin 2039 and the stop-ring 2037 are integrally connected after the reinforcing tube 2038 was abutted to the flange 2037a of the stop-ring 2037. However, the optical connector may be structured so that a gap is provided between the reinforcing tube 2038 and the flange 2037a of the stop-ring 2037.

In addition, the shape and the number of the groove 2051 of the stop-ring, the pitch and the depth of the spiral groove 2092, and the shape, size, and the number of the concave portions 2102 and 2112 may be varied if necessary, and are not limited to the disclosures in FIGS. 58 to 62.

In addition, the concave portions 2102 and 2112 were provided in the present embodiment. Similar effects can be obtained by replacing these concave portions 2102 and 2112 with a convex portion.

Incidentally, the optical fiber cable according to the present invention may be an optical fiber cord.

While a preferred embodiment of the present invention has been described above, it should be understood that these are exemplary of the invention and are not to be considered as limiting the present invention. Additions, omissions, substitutions, and other modifications can be made without departing from the spirit or scope of the present invention. The invention is not to be considered as being limited by the foregoing description, and is only limited by the scope of the appended claims.

What is claimed is:

1. A connection method of an optical connector and an optical transmission element, using the optical connector including a connector housing, a stop-ring structure, and an optical fiber which penetrates the connector housing and the stop-ring structure and protrudes from an end part of the stop-ring structure towards a connection side, also using the optical transmission element including a tensile-strength fiber body, the connection method comprising:
    a fuse connection step of fuse-connecting a first end of the optical fiber of the optical connector with a second end of an optical fiber protruding from a transmission element terminal part of the optical transmission element;
    a covering step of inserting a fuse-connected optical fiber part and the tensile strength fiber body extending towards the stop-ring structure of the optical transmission element inside a reinforcing sleeve provided with a hot melt body in an inner peripheral surface of the reinforcing sleeve, the covering step also covering the transmission element terminal part of the optical transmission element and at least the end part of the stop-ring structure so that the transmission element terminal part and the end part of the stop-ring structure are bridged; and
    an integration step of integrating the fuse-connected optical fiber part, the tensile strength fiber body, the transmission element terminal part, and the stop-ring structure, by a hot melt resin melted from the hot melt body flowing into a gap inside the reinforcing sleeve and solidifying, due to heating and heat-releasing the reinforcing sleeve.

2. The connection method according to claim 1, wherein
    the stop-ring structure includes a penetration hole, through which the optical fiber running through the stop-ring structure penetrates; and
    the optical fiber running through the stop-ring structure can be bent and deformed inside the penetration hole.

3. The connection method according to claim 1, wherein a linear tensile strength part extending along a central axis of the reinforcing sleeve is dispersed in a circumferential direction along an entire circumference done or more of: the reinforcing sleeve, a boundary between the reinforcing sleeve and the hot melt resin body, or a peripheral part of the hot melt resin body along the boundary.

4. The connection method according to claim 1, wherein a tensile-strength body is embedded along a central axis of a sleeve body in the reinforcing sleeve or the hot melt resin body.

5. The connection method according to claim 4, wherein the tensile-strength body extends from one end of the reinforcing sleeve to another end of the reinforcing sleeve along a central axis of the reinforcing sleeve.

6. The connection method according to claim 1, wherein one or more of a concave part and/or a convex part is provided in an outer circumferential surface of the stop-ring structure.

7. A connector-attached optical transmission element comprising an optical connector being attached to a tip of an optical transmission element, wherein:
    the optical connector includes a connector housing, a stop-ring structure, and an optical fiber which penetrates the connector housing and the stop-ring structure and protrudes from an end part of the stop-ring structure towards a connection side;
    the optical transmission element includes a tensile-strength fiber body; a fused connection portion which fuse-connects a first end of the optical fiber of the optical connector and a second end of an optical fiber protruding from a transmission element terminal part of the optical transmission element; and a reinforcing sleeve through which a fuse-connected optical fiber part and a tensile strength fiber body extending towards the stop-ring structure of the optical transmission element are inserted, the reinforcing sleeve bridging the transmission element terminal part of the optical transmission element and at least the end part of the stop-ring structure; and
    a hot melt resin is filled inside the reinforcing sleeve, and the hot melt resin integrates the fuse-connected optical fiber part, the tensile strength fiber body, the transmission element terminal part, and the stop-ring structure.

8. The connector-attached optical transmission element according to claim 7, wherein
    the stop-ring structure includes a penetration hole, through which the optical fiber running through the stop-ring structure penetrates; and
    the optical fiber running through the stop-ring structure can be bent and deformed inside the penetration hole.

9. The connector-attached optical transmission element according to claim 7, wherein a linear tensile strength part extending along a central axis of the reinforcing sleeve is dispersed in a circumferential direction along an entire circumference of one or more of: the reinforcing sleeve, a boundary between the reinforcing sleeve and the hot melt resin body, or a peripheral part of the hot melt resin body along the boundary.

10. The connector-attached optical transmission element according to claim 7, wherein a tensile-strength body is embedded along a central axis of a sleeve body in the reinforcing sleeve or the hot melt resin body.

11. The connector-attached optical transmission element according to claim 10, wherein the tensile-strength body extends from one end of the reinforcing sleeve to another end of the reinforcing sleeve along a central axis of the reinforcing sleeve.

12. The connector-attached optical transmission element according to claim 7, wherein one or more of a concave part and/or a convex part is provided in an outer circumferential surface of the stop-ring structure.

13. An optical connector assembled to a tip of an optical transmission element including a tensile strength fiber body, the optical connector comprising:

a connector housing;

a stop-ring structure;

an optical fiber penetrating the connector housing and the stop-ring structure and protruding from an end part of the stop-ring structure towards a connection side; and a reinforcing sleeve including a hot melt resin in an inner peripheral surface of the reinforcing sleeve, wherein while a fused connection portion, which fuse-connects a first end of the optical fiber and a second end of an optical fiber protruding from a transmission element terminal part of the optical transmission element, is stored in the reinforcing sleeve, the reinforcing sleeve covers and bridges the transmission element terminal part of the optical transmission element and at least the end part of the stop-ring structure; and the reinforcing sleeve allows a fuse-connected optical fiber part, the tensile strength fiber body, the transmission element terminal part, and the stop-ring structure to be integrated by embedding the fuse-connected optical fiber part and the tensile strength fiber body extending towards the stop-ring structure of the optical transmission element into the hot melt resin body, the hot melt resin body being melted and solidified by heating and heat-releasing.

14. The optical connector according to claim 13, wherein the stop-ring structure includes a penetration hole, through which the optical fiber running through the stop-ring structure penetrates; and the optical fiber running through the stop-ring structure can be bent and deformed inside the penetration hole.

15. The optical connector according to claim 13, wherein a linear tensile strength part extending along a central axis of the reinforcing sleeve is dispersed in a circumferential direction along an entire circumference of one or more of: the reinforcing sleeve, a boundary between the reinforcing sleeve and the holt melt resin body, or a peripheral part of the hot melt resin body along the boundary.

16. The optical connector according to claim 13, wherein a tensile-strength body is embedded along a central axis of a sleeve body in the reinforcing sleeve or the hot melt resin body.

17. The optical connector according to claim 16, wherein the tensile-strength body extends from one end of the reinforcing sleeve to another end of the reinforcing sleeve along a central axis of the reinforcing sleeve.

18. The optical connector according to claim 13, wherein one or more of a concave part and/or a convex part is provided in an outer circumferential surface of the stop-ring structure.

19. A method of assembling an optical connector to a tip of an optical transmission element including a tensile strength fiber body, the method comprising:

a fuse connection step of fuse-connecting a first end of an optical fiber of the optical connector with a second end of an optical fiber protruding from a transmission element terminal part of the optical transmission element, the optical connector including a connector housing, a stop-ring structure, and the optical fiber which penetrates the connector housing and the stop-ring structure and protrudes from an end part of the stop-ring structure towards a connection side;

a covering step of inserting a fuse-connected optical fiber part and the tensile strength fiber body extending towards the stop-ring structure of the optical transmission element inside a reinforcing sleeve provided with a hot melt body in an inner peripheral surface of the reinforcing sleeve, the covering step also covering the transmission element terminal part of the optical transmission element and at least the end part of the stop-ring structure so that the transmission element terminal part and the end part of the stop-ring structure are bridged; and an integration step of integrating the fuse-connected optical fiber part, the tensile strength fiber body, the transmission element terminal part, and the stop-ring structure, by a hot melt resin melted from the hot melt body flowing into a gap inside the reinforcing sleeve and solidifying, due to heating and heat-releasing the reinforcing sleeve.

\* \* \* \* \*